United States Patent
Duck

(10) Patent No.: US 10,570,241 B2
(45) Date of Patent: Feb. 25, 2020

(54) POLYMERS, SUBSTRATES, METHODS FOR MAKING SUCH, AND DEVICES COMPRISING THE SAME

(71) Applicant: Avertica, Inc., Research Triangle Park, NC (US)

(72) Inventor: Nicholas Brendan Duck, Chapel Hill, NC (US)

(73) Assignee: Avertica Inc., Research Triangle Park, NC (US)

( * ) Notice: Subject to any disclaimer, the term of this patent is extended or adjusted under 35 U.S.C. 154(b) by 128 days.

(21) Appl. No.: 15/329,882

(22) PCT Filed: Jul. 30, 2015

(86) PCT No.: PCT/US2015/042871
§ 371 (c)(1),
(2) Date: Jan. 27, 2017

(87) PCT Pub. No.: WO2016/019128
PCT Pub. Date: Feb. 4, 2016

(65) Prior Publication Data
US 2017/0275410 A1    Sep. 28, 2017

Related U.S. Application Data

(60) Provisional application No. 62/031,896, filed on Aug. 1, 2014.

(51) Int. Cl.
*C08G 12/26* (2006.01)
*C08G 12/00* (2006.01)
*C08G 12/08* (2006.01)
*C08G 12/28* (2006.01)
*C08G 12/30* (2006.01)
*C08G 12/40* (2006.01)
*H01G 11/48* (2013.01)
(Continued)

(52) U.S. Cl.
CPC ............ *C08G 12/26* (2013.01); *C08G 12/00* (2013.01); *C08G 12/08* (2013.01); *C08G 12/28* (2013.01); *C08G 12/30* (2013.01); *C08G 12/40* (2013.01); *H01G 11/48* (2013.01); *H01M 6/181* (2013.01); *H01M 8/103* (2013.01); *H01M 10/0565* (2013.01); *H01M 2008/1095* (2013.01); *H01M 2300/0082* (2013.01)

(58) Field of Classification Search
CPC ............................... C08G 12/06; C08G 12/26
USPC ....................................................... 528/227
See application file for complete search history.

(56) References Cited

U.S. PATENT DOCUMENTS 5,015,699 A    5/1991    Cotts et al.

FOREIGN PATENT DOCUMENTS

RU          2 128 673 C1    9/1996
WO    WO 2007/021151 A1    2/2007
(Continued)

OTHER PUBLICATIONS

Cai et al. "Tuning the bandgaps of polyazomethines containing triphenylamine by different linkage sites of dialdhyde monomers" *Electrochimica Acta* 76:229-241 (2012).
(Continued)

*Primary Examiner* — Duc Truong
(74) *Attorney, Agent, or Firm* — Myers Bigel, P.A.

(57) ABSTRACT

The present invention relates generally to substrates for making polymers and methods for making polymers. The present invention also relates generally to polymers and devices comprising the same.

18 Claims, 57 Drawing Sheets

(51) Int. Cl.
*H01M 6/18* (2006.01)
*H01M 8/103* (2016.01)
*H01M 10/0565* (2010.01)
*H01M 8/1018* (2016.01)

(56) References Cited

FOREIGN PATENT DOCUMENTS

WO  WO 2014/124122 A1  8/2014
WO  WO 2014/124130 A1  8/2014

OTHER PUBLICATIONS

International Search Report at the Written Opinion of the International Searching Authority corresponding to International Patent Application No. PCT/US2015/042871 (9 pages) (dated Nov. 26, 2015).

Xiang et al. "Schiff base polymers derived from 2,5-diformylfuran" *Polymer International* 62:1517-1523 (2013).

US 10,570,241 B2

POLYMERS, SUBSTRATES, METHODS FOR MAKING SUCH, AND DEVICES COMPRISING THE SAME

RELATED APPLICATIONS

This application is a 35 U.S.C. § 371 national stage application of International Application No. PCT/US2015/042871, filed on Jul. 30, 2015, which claims the benefit of and priority to U.S. Provisional Patent Application Ser. No. 62/031,896, filed Aug. 1, 2014, the disclosures of each of which are hereby incorporated by reference herein in their entirety.

FIELD

The present invention relates generally to substrates for making polymers and methods for making polymers. The present invention also relates generally to polymers and devices comprising the same.

BACKGROUND

Conjugated polymeric systems have been an area of research as some can provide conductive and light emitting and absorbing properties and thus have utility in electronics, molecular electronics and optoelectronics. Conjugated polymers have been made from various monomers and by various methods to yield a variety of polymers each with unique physical and electrical properties. These polymers include poly acetylenes, poly(pyrrole)s, polyanilines, polyazines, poly(p-phenylene vinylene), polycarbazoles, polyindoles, polyazepines poly(thiophene)s, poly(3,4-ethylenedioxythiophene), poly(p-phenylene sulfide), poly(fluorene)s, polyphenylenes, polypyrenes, polyazulenes, polynaphthalenes and polybenzimidazoles. These are generally linear polymers with variable chain lengths that are described in the literature.

Polyarylenes are a group of aromatic conjugated polymers that are branched and dendritic. Polyarylenes are made by the reaction of alkynes or with aromatic halides in the presence of metal catalysts. These are generally granular, globular or have a coil morphology. Variations of these polymers include polymers made with branched side chains or dendritic structures and polymers with branched monomers incorporated with more than one site for polymer extension. These later polymers result in branched polymers, where the conjugated backbone bifurcates. Each has unique electronic, optical and magnetic properties. However, because all of these reactions are unidirectional, all of the polymers eventually terminate, forming powders or microspheres and do not form a networked solid material.

The present invention addresses previous shortcomings in the art by providing polymers, substrates for making the polymers, methods for making such polymers, and devices comprising the same.

SUMMARY

Embodiments according to the invention are directed to substrates, polymers, methods, and devices. In some embodiments, a substrate of the present invention may be used to prepare a polymer of the present invention. Thus, in some embodiments provided is a substrate as described herein, Pursuant to these embodiments, provided herein is a polymer as described herein.

Also provided herein are methods for preparing a polymer of the present invention. Some embodiments include methods of preparing a polyazine heteropolymer. In some embodiments, a method of preparing a polyazine heteropolymer includes reacting (a) a first organic compound comprising at least two aldehyde and/or ketone groups, (b) a second organic compound comprising at least two aldehyde and/or ketone groups, and (c) a multiamine to form the polyazine heteropolymer.

In a further aspect of the present invention, provided is a device, such as, but not limited to, an electrochemical device, comprising a polymer of the present invention.

The foregoing and other aspects of the present invention will now be described in more detail with respect to other embodiments described herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

DETAILED DESCRIPTION

Figure 1A:
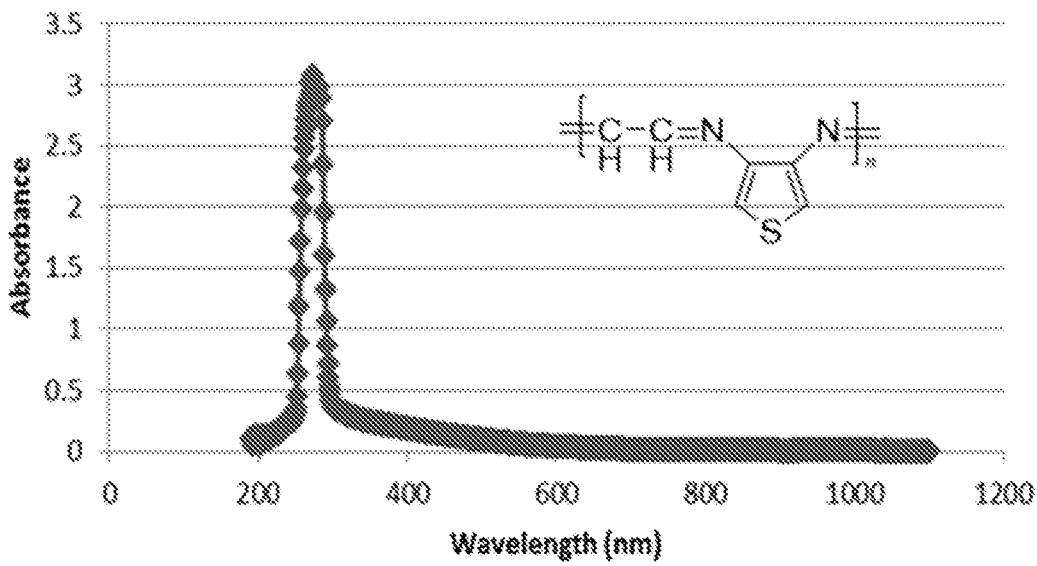
FIGS. 1A-D show absorbance spectra for polymers prepared by reacting 3,4-diaminothiophene with (A) glyoxol, (B) 4,4-biphenyl dicarboxaldehyde, (C) 2,5-thiophene dicarboxaldehyde, or (D) benzene-1,3,5-tricarboxaldehyde.

The present invention will now be described more fully hereinafter. This invention may, however, be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety for the teachings relevant to the sentence and/or paragraph in which the reference is presented. In case of a conflict in terminology, the present specification is controlling.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination.

Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the transitional phrase "consisting essentially of" (and grammatical variants) is to be interpreted as encompassing the recited materials or steps "and those that do not materially affect the basic and novel characteristic(s)" of the claimed invention. See, In re Herz, 537 F.2d 549, 551-52, 190 U.S.P.Q. 461, 463 (CCPA 1976) (emphasis in the original); see also MPEP § 2111.03. Thus, the term "consisting essentially of" as used herein should not be interpreted as equivalent to "comprising."

The term "about," as used herein when referring to a measurable value, such as an amount or concentration and the like, is meant to refer to variations of up to ±20% of the specified value, such as, but not limited to, ±10%, ±5%, ±1%, ±0.5%, or even ±0.1% of the specified value, as well as the specified value. For example, "about X" where X is the measurable value, can include X as well as a variation of ±20%, ±10%, ±5%, ±1%, ±0.5%, or ±0.1% of X. A range provided herein for a measurable value may include any other range and/or individual value therein.

It will be understood that when an element or layer is referred to as being "on," "connected to," or "coupled with" another element or layer, it can be directly on, connected, or coupled with the other element or layer or intervening, elements or layers may be present. In contrast, when an element is referred to as being "directly on," "directly connected to," or "directly coupled with" another element or layer, there are no intervening elements or layers present.

"Moiety" or "moieties," as used herein, refer to a portion of a molecule, such as a portion of a substrate (i.e., compound), typically having a particular functional or structural feature. For example, a moiety may comprise a linking group (a portion of a molecule connecting at least two other portions of the molecule). In some embodiments, a moiety may be a reactive portion of a substrate.

"Substituted" as used herein to describe a chemical structure, group, or moiety, refers to the structure, group, or moiety comprising one or more substituents. As used herein, in cases in which a first group is "substituted with" a second group, the second group is attached to the first group whereby a moiety of the first group (typically a hydrogen) is replaced by the second group. The substituted group may contain one or more substituents that may be the same or different.

"Substituent" as used herein references a group that replaces another group in a chemical structure. Typical substituents include nonhydrogen atoms (e.g., halogens), functional groups (such as, but not limited to, amino, sulfhydryl, carbonyl, hydroxyl, alkoxy, carboxyl, silyl, silyloxy, phosphate and the like), hydrocarbyl groups, and hydrocarbyl groups substituted with one or more heteroatoms. Exemplary substituents include, but are not limited to, alkyl, lower alkyl, halo, haloalkyl, alkenyl, alkynyl, cycloalkyl, cycloalkylalkyl, heterocyclo, heterocycloalkyl, aryl, arylalkyl, lower alkoxy, thioalkyl, hydroxyl, thio, mercapto, amino, imino, halo, cyano, nitro, nitroso, azido, carboxy, sulfide, sulfone, sulfoxy, phosphoryl, silyl, silylalkyl, silyloxy, boronyl, and modified lower alkyl.

"Alkyl" as used herein alone or as part of another group, refers to a linear ("straight chain"), branched chain, and/or cyclic hydrocarbon containing from 1 to 30 or more carbon atoms. In some embodiments, the alkyl group may contain 1, 2, or 3 up to 4, 5, 6, 7, 8, 9, 10, 11, 12, 13, 14, 15, 16, 17, 18, 19, 20, 21, 22, 23, 24, 25, 26, 27, 28, 29, or 30 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Lower alkyl" as used herein, is a subset of alkyl and refers to a straight or branched chain hydrocarbon group containing from 1 to 4 carbon atoms. Representative examples of lower alkyl include, but are not limited to, methyl, ethyl, n-propyl, iso-propyl, n-butyl, iso-butyl, tert-butyl, and the like. The term "alkyl" or "loweralkyl" is intended to include both substituted and unsubstituted alkyl or loweralkyl unless otherwise indicated and these groups may be substituted with groups such as, but not limited to, polyalkylene oxides (such as PEG), halo (e.g., haloalkyl), alkyl, haloalkyl, alkenyl, alkynyl, cycloalkyl, cycloalkylalkyl, aryl, arylalkyl, heterocyclo, heterocycloalkyl, hydroxyl, alkoxy (thereby creating a polyalkoxy such as polyethylene glycol), alkenyloxy, alkynyloxy, haloalkoxy, cycloalkoxy, cycloalkylalkyloxy, aryloxy, arylalkyloxy, heterocyclooxy, heterocyclolalkyloxy, mercapto, alkyl-S(O)$_m$, haloalkyl-S(O)$_m$, alkenyl-S(O)$_m$, alkynyl-S(O)$_m$, cycloalkyl-S(O)$_m$, cycloalkylalkyl-S(O)$_m$, aryl-S(O)$_m$, arylalkyl-S(O)$_m$, heterocyclo-S(O)$_m$, heterocycloalkyl-S(O)$_m$, amino, carboxy, alkylamino, alkenylamino, alkynylamino, haloalkylamino, cycloalkylamino, cycloalkylalkylamino, arylamino, arylalkylamino, heterocycloamino, heterocycloalkylamino, disubstituted-amino, acylamino, acyloxy, ester, amide, sulfonamide, urea, alkoxyacylamino, aminoacyloxy, nitro or cyano, where m=0, 1, 2 or 3.

"Alkenyl" as used herein alone or as part of another group, refers to linear ("straight chain"), branched chain, and/or cyclic containing from 1 to 30 or more carbon atoms (or in loweralkenyl 1 to 4 carbon atoms) which include 1 to 10 or more double bonds in the hydrocarbon chain. In some embodiments, the alkenyl group may contain 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms. Representative examples of alkenyl include, but are not limited to, methylene (=CH$_2$), vinyl (—CH=CH$_2$), allyl (—CH$_2$CH=CH$_2$), 2-butenyl, 3-butenyl, 4-pentenyl, 3-pentenyl, 2-hexenyl, 3-hexenyl, 2,4-heptadiene, and the like. The term "alkenyl" or "loweralkenyl" is intended to include both substituted and unsubstituted alkenyl or loweralkenyl unless otherwise indicated and these groups may be substituted with groups such as those described in connection with alkyl and loweralkyl above.

"Conjugated," as used herein, refers to a moiety or compound comprising at least two double bonds with a single bond between the two double bonds. Thus, a conjugated compound comprises two double bonds that alternate with a single bond. For example, a diene may be conjugated. Conjugated dienes comprise double bonds on adjacent carbons; that is, the two double bonds are separated by one single bond. In a conjugated diene, there are four adjacent triagonal, sp$^2$-hybridized carbons. Each carbon bears a p orbital comprising one electron. Not only does the pair of p orbitals of each double bond overlap to form pi-bonds, but there is also some overlap across the formal carbon-carbon single bond.

Examples of conjugated double bonds are depicted below:

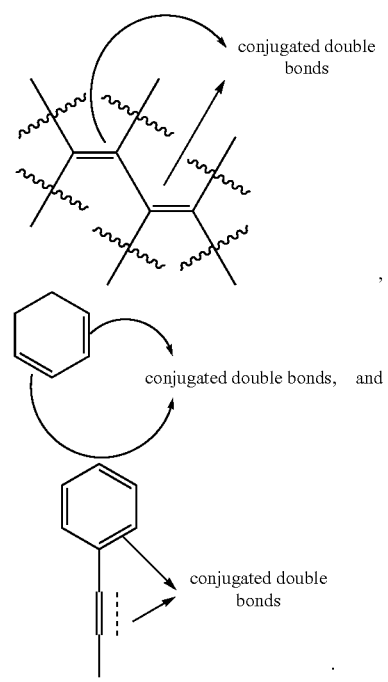

A further example of a conjugated moiety and/or compound is one that comprises two or more nitrogen atoms within the conjugated system as illustrated below:

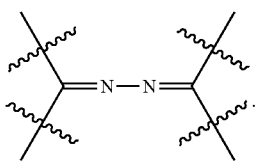 [SMILES: *C(*)=NN=C(*)*]

In certain embodiments, a conjugated moiety or compound may be aromatic. The term "aryl" is used herein to refer to an aromatic moiety or compound. "Aryl" may be a single aromatic ring or multiple aromatic rings that are fused together, linked covalently, or linked to a common group, such as, but not limited to, a methylene or ethylene moiety. The common linking group also may be a carbonyl, as in benzophenone, or oxygen, as in diphenylether, or nitrogen, as in diphenylamine. The term "aryl" specifically encompasses heterocyclic aromatic compounds. The aromatic ring(s) may comprise phenyl, naphthyl, tetrahydronaphthyl, biphenyl, azulenyl, indanyl, indenyl, diphenylether, diphenylamine, pyridyl, pyrimidinyl, imidazolyl, thienyl, furyl, pyrazinyl, pyrrolyl, pyranyl, isobenzofuranyl, chromenyl, xanthenyl, indolyl, isoindolyl, indolizinyl, triazolyl, pyridazinyl, indazolyl, purinyl, quinolizinyl, isoquinolyl, quinolyl, phthalazinyl, naphthyridinyl, quinoxalinyl, isothiazolyl, benzo[b]thienyl, and benzophenone, among others. In particular embodiments, the term "aryl" means a cyclic aromatic comprising about 5 to about 50 or more carbon atoms, and includes 5- and 6-membered hydrocarbon and heterocyclic aromatic rings.

In some embodiments, a substrate of the present invention may comprise a conjugated moiety and/or may be conjugated. In some embodiments, a substrate of the present invention may comprise an aromatic moiety and/or may be aromatic.

"Multiamine," as used herein, refers to a compound comprising two or more amines. A multiamine may comprise 2, 3, 4, 5, 6, 7, or more amines. A multiamine may comprise two or more terminal and/or pendant amine groups that may be primary amine groups. In some embodiments, a multiamine comprises two amines and thus is a diamine. In some embodiments, a multiamine comprises three amines and thus is a triamine. Exemplary multiamines include, but are not limited to, hydrazine, triaminobenzene, ethylenediamine, 3,4-diaminothiophene, 1,3,5-benzene triamine, 1,4-benzene diamine, safranin O diamine, phenosafranin diamine, 2,4 diamino-6-phenyl-1,3,5-triazine, 2,4-diamino-6-hydroxy-pyrimidine, 2,6-diamino-3,5-difluoropyridine, acriflavin diamine, 3,6 diamino acridine, 4,4'-diamino-2,2'-stilbenedisulfonic acid, 2,5-diaminobenzenesulfonic acid, (S,S)-1,2-Bis(4-hydroxyphenyl)-1,2-ethanediamine, 1,2,4,5-benzenetetramine, 1,2,3,4-benzenetetramine, and any combination thereof.

"Monocarbonyl compound," as used herein, refers to a compound comprising only one carbonyl group. A monocarbonyl compound can comprise an aldehyde (i.e., a monoaldehyde) or a ketone (i.e., a monoketone). In some embodiments, a monocarbonyl compound has the following structure

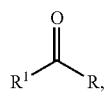

wherein
R is a conjugated and/or aromatic moiety; and
$R^1$ is selected from the group consisting of hydrogen, alkyl, and an alkylene.

According to some embodiments of the present invention, provided herein are substrates that may be used to prepare a conjugated polymer. "Substrate," as used herein, refers to a compound that can be polymerized to form a polymer. Substrate and compound are used interchangeably herein. A substrate may be polymerized using chemical oxidative polymerization, enzymatic oxidative polymerization, and/or a condensation reaction. In some embodiments, a substrate and/or a polymer may be acted on by an enzyme. For example, a substrate may be oxidized by an enzyme. In other embodiments, a substrate may not be acted on by an enzyme. In some embodiments, the enzyme may be an oxidase. "Oxidase," as used herein, refers to an enzyme that oxidizes a substrate. Exemplary oxidases include, but are not limited to, phenol oxidase, a polyphenol oxidase, a catechol oxidase, a tyrosinase, a laccase, monophenol monooxygenase, phenolase, monophenol oxidase, cresolase, monophenolase, tyrosine-dopa oxidase, monophenol monooxidase, monophenol dihydroxyphenylalanine:oxygen oxidoreductase, N-acetyl-6-hydroxytryptophan oxidase, dihydroxy-L-phenylalanine oxygen oxidoreductase, o-diphenol:$O_2$ oxidoreductase, catecholase, o-diphenol oxidase, monophenol oxidase, cresolase, and any combination thereof.

In some embodiments, a substrate and/or polymer may be polymerized using an oxidizing agent. Exemplary oxidizing agents include, but are not limited to, ammonium persulfate, iron (III) chloride, hydrogen peroxide, urea peroxide, melamine peroxide, sodium perborate, potassium perborate, sodium percarbonate, potassium percarbonate, potassium persulfate, sodium persulfate, ferric nitrate, diammonium cerium nitrate, iron sulfate, ozone, potassium periodate, and any combination thereof.

A substrate may be a synthetic substrate or a natural substrate, either of which may be polymerized using chemical oxidative polymerization and/or enzymatic oxidative polymerization. "Synthetic," as used herein in reference to a substrate, refers to a substrate that is not a natural substrate of an oxidase. Thus, a synthetic substrate is not found in nature as a substrate for an oxidase and thus is an unnatural substrate. In some embodiments, a synthetic substrate may be synthetically prepared, and optionally one or more compounds may be obtained or derived from nature and used to synthetically prepare a synthetic substrate.

"Natural," as used herein in reference to a substrate, refers to a substrate that is a natural substrate of an oxidase. Thus, a natural substrate is found in nature as a substrate for an oxidase. In some embodiments, a natural substrate may be synthetically prepared, and optionally one or more compounds may be obtained or derived from nature and used to synthetically prepare a natural substrate.

"Organic," as used herein, refers to a compound, substrate, and/or polymer comprising carbon. In some embodiments, an organic substrate may comprise a metal, such as, but not limited to copper, gold, aluminum, lithium, calcium, sodium, tungsten, zinc, iron, platinum, tin, magnesium, lead, titanium, potassium, silver, rubidium, and any combination thereof. In certain embodiments, an organic substrate is exposed, contacted, and/or doped with a metal and/or metal containing compound such that the metal becomes incorporated with the substrate and/or forms a complex with the substrate.

In certain embodiments, a substrate of the present invention is multifunctional. "Multifunctional," as used herein in reference to a substrate, refers to an organic substrate that comprises at least two moieties that are configured to provide polymerization in more than one direction. A multifunctional organic substrate may comprise 2, 3, 4, 5, or more moieties that may be the same and/or different. In some embodiments, a multifunctional substrate may be a synthetic substrate. In other embodiments, a multifunctional substrate may be a natural substrate. Exemplary multifunctional organic substrates include, but are not limited to, those shown in Scheme 1.

Scheme 1: Exemplary multifunctional organic substrates comprising two moieties for polymerization.

1.

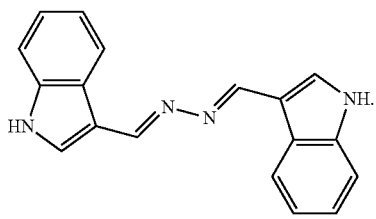

2.

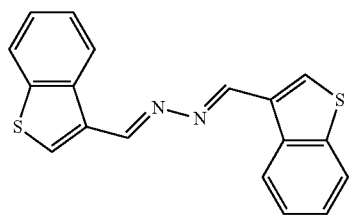

3.

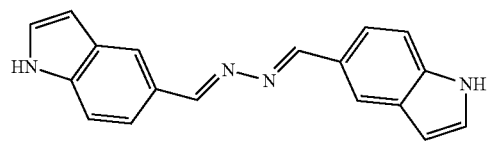

4.

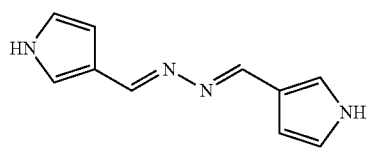

In some embodiments, a multifunctional organic substrate comprises at least two reactive moieties. In certain embodiments, a multifunctional organic substrate comprises at least three reactive moieties. "Reactive moiety" and "reactive moieties," as used herein, refer to moieties that can be oxidized by an oxidase and/or an oxidizing agent. Exemplary reactive moieties include, but are not limited to, an indole, a pyrrole, a catechol, a tyrosyl, a catecholamine, thianaphthene, derivatives thereof, and any combination thereof. In certain embodiments, a substrate comprises one or more reactive moieties selected from the group consisting of a 6-hydroxyindole, a 5-hydroxyindole, a 5,6-dihydroxyindole, derivatives thereof, and any combination thereof. "Derivative" and grammatical variations thereof, as used herein, refer to a compound that is formed from, or can be regarded as formed from, a structurally related compound. In some embodiments, a derivative may be attached to and/or a portion of a compound. Thus, a derivative may refer to a moiety attached to a parent compound and thus one or more of groups of the moiety (generally hydrogen atoms) may be removed in order to attach the moiety to the parent compound. For example, substrate 1 of Scheme 1 shows two indole derivatives that are each separately attached to the parent compound.

In certain embodiments, a reactive moiety may comprise a conjugated moiety. A substrate of the present invention may comprise one or more, such as 2, 3, 4, or more, reactive moieties each of which may comprise a conjugated moiety. In some embodiments, a reactive moiety may comprise an aromatic moiety. A substrate of the present invention may comprise one or more, such as 2, 3, 4, or more, reactive moieties each of which may comprise an aromatic moiety.

As those skilled in the art will recognize, a polymerization reaction may occur or involve one or more reactive sites within a moiety. Thus, a reactive moiety may have at least 2, 3, 4, 5, 6, 7, 8, 9, 10, or more reactive sites. For example, as shown in Scheme 2, for 5,6-dihydroxyindole, polymerization may occur or take place at the C2, C3, C4, and/or C7 position, and a bond may be created between at least one of these reactive sites and at least one reactive site of another reactive moiety.

Scheme 2: Chemical structure of 5,6-dihydroxyindole.

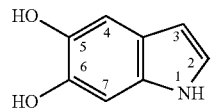

A reactive site within a moiety of a substrate of the present invention may be modified and/or blocked with a substituent, such as, but not limited to an alkyl. This may cause a polymerization reaction to occur or involve one or more different reactive sites within a reactive moiety of a substrate.

A substrate of the present invention may comprise two or more reactive moieties that may be joined by a linker or linking group. "Linker" or "linking group" as used herein refers to a moiety that serves as a point of attachment for two or more reactive moieties that may be same and/or different. Two or more reactive moieties may be bound covalently to a linker or may be fused to a linker. A linker may be a conjugated moiety, and in some embodiments a linker may be an aromatic moiety. In certain embodiments, a method of the present invention may result in a linker becoming conjugated. For example, polymerization of a substrate using either an oxidase or an oxidizing agent may result in a conjugated linker.

In some embodiments, a substrate of the present invention is monomeric. "Monomeric," as used herein in reference to a substrate, refers to a substrate that has not been linked or bound to another substrate. Thus, the substrate is not oligomeric or polymeric. While a substrate may have one or more of the same moieties within the substrate, a monomeric substrate does not comprise two or more substrates that have been linked together. For example, the substrates provided in Scheme 1 are monomeric as they have not been linked to another substrate.

In some embodiments, a substrate of the present invention comprises a substrate as described herein. In certain embodiments, a substrate of the present invention comprises a substrate provided in Scheme 1 and/or a substrate described in the examples provided herein. A substrate of the present invention may be used to prepare a polymer of the present invention. In some embodiments, a substrate, which may be a multifunctional organic substrate that may be synthetic, may comprise a conjugated moiety having two or more reactive moieties attached. The conjugated moiety may comprise a —C═N—N═C— unit and/or an aryl. "Unit" as used herein is used interchangeably with the term "segment". The two or more reactive moieties may be the same and/or different and may comprise an indole derivative, a pyrrole derivative, a catechol derivative, a tyrosyl derivative, a thianaphthene derivative, and/or a catecholamine derivative. In some embodiments, the substrate may comprise three reactive moieties. In some embodiments, a reactive moiety may be attached to the conjugated moiety via a linker that may be conjugated.

In some embodiments, a substrate of the present invention may be glyoxal, benzene-1,3-dicarboxaldehyde, 2,5-furan dicarboxaldehyde, 4,4-biphenyl dicarboxaldehyde, 2,5-thiophene dicarboxaldehyde, 3,4-dimethyl-2,5-pyrrole dicarboxaldehyde, benzene-1,3,5-tricarboxaldehyde, 1,4-diacetyl benzene, 1,3,5-triacetyl benzene, and any combination thereof.

In some embodiments, a polymer of the present invention comprises a polymer as described herein. In certain embodiments, a polymer of the present invention comprises a polymer described in the examples provided herein, such as, but not limited to, a polymer provided in Table 1. A method of the present invention may be used to prepare a polymer of the present invention. In some embodiments, a substrate of the present invention may be used in a method of the present invention to prepare a polymer of the present invention.

A polymer of the present invention may be networked.

"Networked," as used herein in reference to a polymer of the present invention, refers to a cross-linked polymer (i.e., a polymer comprising one or more polymer chains that are linked together either directly through covalent attachment and/or through a moiety or group), wherein the polymer chains of the cross-linked polymer are interconnected at two or more locations within the polymer chains. In some embodiments, the cross-links (i.e., the linkages connecting the one or more polymer chains) in a networked polymer of the present invention comprise a conjugated moiety. In certain embodiments, a cross-linked and/or networked polymer of the present invention may comprise a —C═N—N═C— unit and/or a —C═N—R—N═C— unit, where R is a conjugated moiety and/or an aryl. In some embodiments, one or more cross-links of a cross-linked and/or networked polymer of the present invention may comprise a —C═N—N═C— unit and/or a —C═N—R—N═C— unit, where R is a conjugated moiety and/or an aryl.

According to some embodiments of the present invention, provided is a method of preparing a polyazine polymer comprising reacting an organic substrate comprising at least two aldehyde and/or ketone groups with a multiamine to form an organic polyazine polymer. The method may further comprise oxidizing said organic polyazine polymer to form a cross-linked polyazine polymer. The oxidizing step may be carried out by enzymatic oxidative polymerization with an oxidase and/or by chemical oxidative polymerization with an oxidizing agent. The organic substrate may be a natural or synthetic substrate.

In some embodiments, the organic substrate may be a dialdehyde and/or a trialdehyde and the multiamine may be a diamine and/or a triamine. Exemplary reaction schemes between a diamine and a dialdehyde are shown in Scheme 3, where R is a conjugated moiety and/or an aryl and n is a number from 2 to 1,000,000.

Scheme 3: Exemplary diamine and dialdehyde reactions (R is a conjugated moiety and/or aryl and n is a number from 2 to 1,000,000).

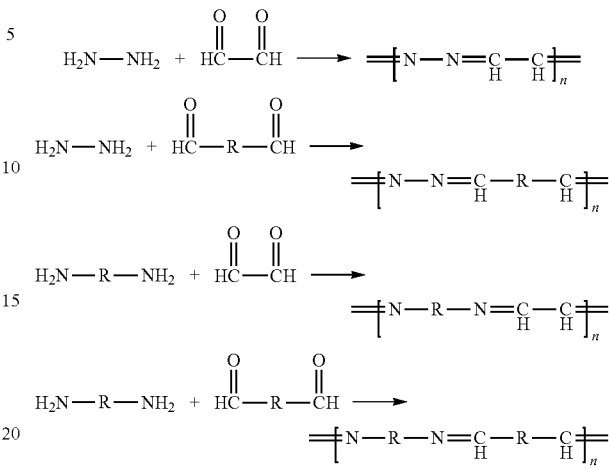

Thus, a polyazine polymer, which may be cross-linked and/or networked, may comprise a unit having a structure of one or more of:

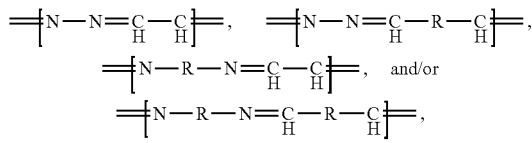

wherein R is a conjugated moiety and/or an aryl.

Further exemplary reaction schemes between a dialdehyde and/or trialdehyde and a diamine and/or triamine are shown in Scheme 4, where R and R' are each independently a conjugated moiety and/or an aryl and n is a number from 2 to 1,000,000.

Scheme 4: Exemplary diamine and/or triamine and dialdehyde and/or trialdehyde reactions (R and R' are each independently a conjugated moiety and/or an aryl and n is a number from 2 to 1,000,000).

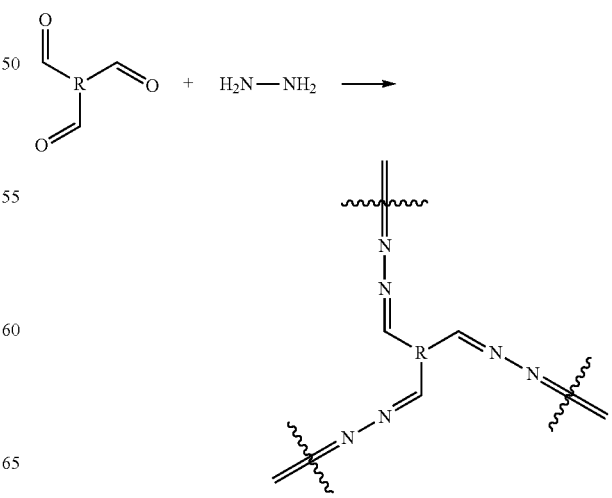

-continued
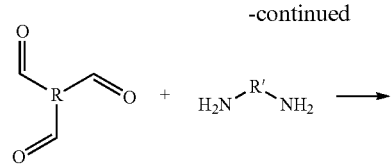
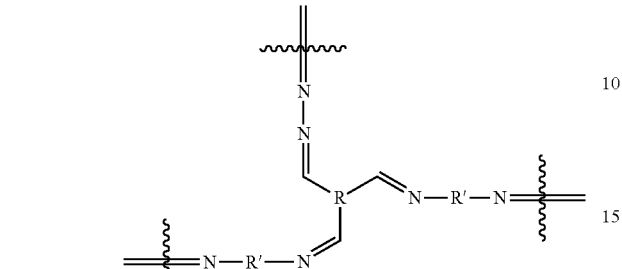
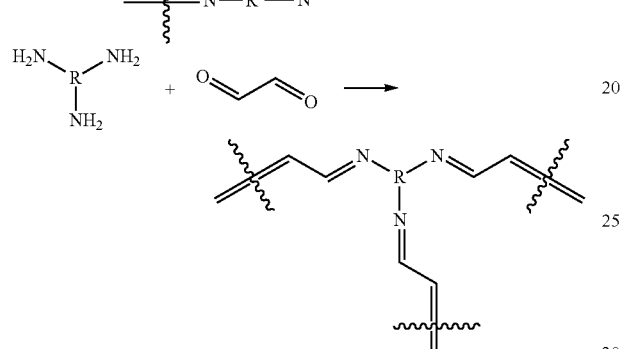
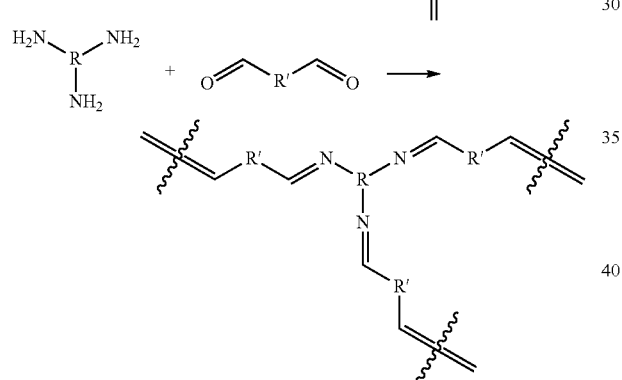
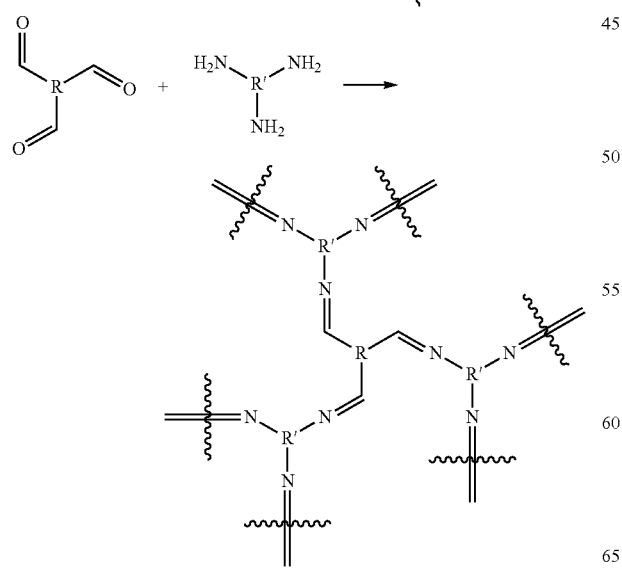
Thus, a polyazine polymer, which may be cross-linked and/or networked, may comprise a unit having a structure of one or more of:
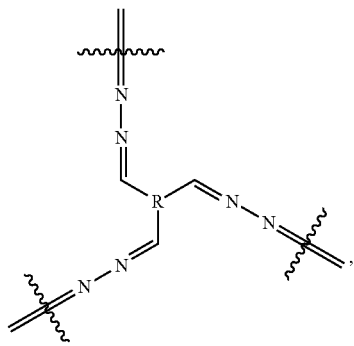
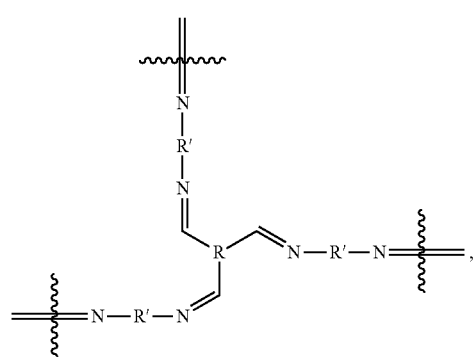
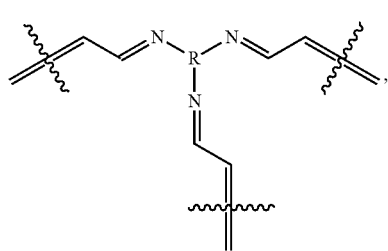
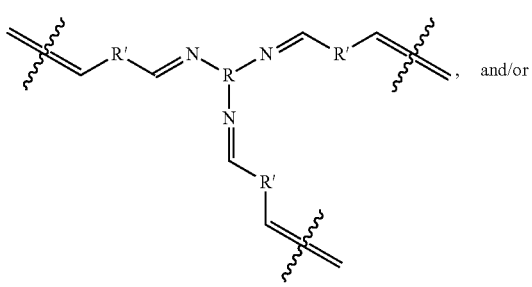, and/or -continued

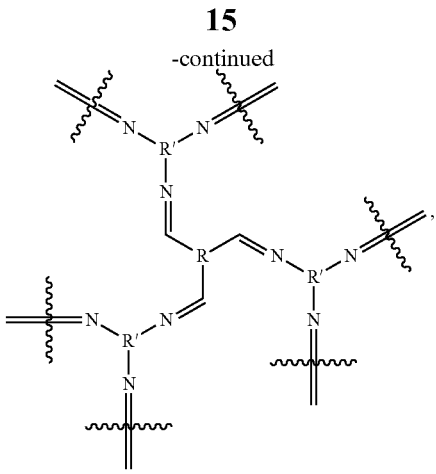

wherein R and R' are each independently a conjugated moiety and/or an aryl.

An organic substrate comprising at least two aldehyde and/or ketone groups may comprise a conjugated moiety. In some embodiments, an organic substrate comprising at least two aldehyde and/or ketone groups may comprise an aromatic moiety. Optionally, the at least two aldehyde and/or ketone groups may be attached and/or bound to the aromatic moiety. In some embodiments, an organic substrate may have the structure of Formula (I):

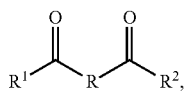 (I)

wherein

R is a conjugated and/or aromatic moiety; and $R^1$ and $R^2$ are each independently selected from the group consisting of hydrogen, alkyl, and alkenyl. An organic polymer prepared using a substrate having a structure of Formula (I) may have a structure comprising $(RC(R^1)NNCR^2)_n RC(O)R^1$, $(RC(R^1)NNCR^2)_n RC(O)R^2$, or $(RC(R^1)NNCR^2)_n CNN$, wherein n is a number from 2 to 1,000,000 and $R^1$ and $R^2$ are each independently selected from the group consisting of hydrogen, alkyl, and alkenyl. As one of ordinary skill in the art will recognize, an organic substrate (i.e., an organic compound) comprising at least two aldehyde and/or ketone groups will have at least two carbonyl functional groups, and if one of the substituents of the carbon of one of the carbonyl groups is a hydrogen, then it is an aldehyde group. Alternatively, if neither of the substituents of the carbon of one of the carbonyl groups is a hydrogen, then it is a ketone group. For example, in the structure of Formula (I), when $R^1$ is hydrogen, $R^1$ and the adjacent carbonyl functional group are an aldehyde group and when $R^2$ is alkyl or alkenyl, $R^2$ and the adjacent carbonyl functional group are a ketone group.

An organic substrate according to some embodiments may comprise at least three aldehyde and/or ketone groups, and may in some embodiments react with a multiamine to form a networked organic polyazine polymer. In some embodiments, an organic substrate may have the structure of Formula (II):

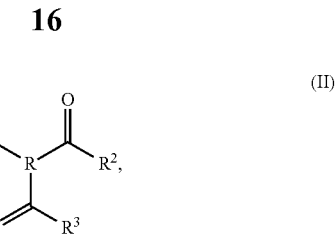 (II)

wherein

R is a conjugated and/or aromatic moiety; and $R^1$, $R^2$, and $R^3$ are each independently selected from the group consisting of hydrogen, alkyl, and alkenyl. An organic polymer prepared using a substrate having a structure of Formula (II) may have a structure comprising $((RC(R^1)NNCR^1)(RC(R^2)NNCR^2)(RC(R^3)NNCR^3))_n RC(O)R^1$, $((RC(R^1)NNCR^1)(RC(R^2)NNCR^2)(RC(R^3)NNCR^3))_n RC_n RC(O)R^2$, $((RC(R^1)NNCR^1)(RC(R^2)NNCR^2)(RC(R^3)NNCR^3))_n RC_n RC(O)R^3$, or $((RC(R^1)NNCR^1)(RC(R^2)NNCR^2)(RC(R^3)NNCR^3))_n RC_n CNN$, wherein n is a number from 2 to 1,000,000 and $R^1$, $R^2$, and $R^3$ are each independently selected from the group consisting of hydrogen, alkyl, and alkenyl.

In certain embodiments, an organic substrate may comprise an indole, a pyrrole, a phenol, a thiophene, a furan, a thianaphthene, an acetylene, a catechol, a tyrosyl, a catecholamine, a phenyl, a benzene, a naphthalene, a biphenyl, derivatives thereof, and any combination thereof. In some embodiments, an organic substrate comprises an indole or a derivative thereof and/or a pyrrole or a derivative thereof that may be substituted with at least two aldehyde and/or ketone groups.

In some embodiments, a method of preparing a polyazine polymer may comprise reacting an organic substrate comprising at least two aldehyde and/or ketone groups with a multiamine to form an organic polyazine polymer and reacting the organic polyazine polymer with a second organic substrate comprising at least two aldehyde and/or ketone groups and a multiamine to form a second organic polyazine polymer. In some embodiments, the second organic substrate is different than the first organic substrate and thus a heteropolymer may be formed. "Heteropolymer" as used herein refers to an organic polymer comprising two or more different polymeric units. The method may further comprise oxidizing the second organic polyazine polymer to form a cross-linked polyazine polymer.

In some embodiments, a polyazine heteropolymer may be provided. Some embodiments include a method of preparing a polyazine heteropolymer. In some embodiments, a method of preparing a polyazine heteropolymer may comprise reacting a first organic substrate, a second organic substrate, and a multiamine to form the polyazine heteropolymer. In some embodiments, the first organic substrate and the second organic substrate may be combined together and subsequently reacted with a multiamine to form the polyazine heteropolymer. In some embodiments, the first organic substrate may comprise at least two aldehyde and/or ketone groups and/or the second organic substrate may comprise at least two aldehyde and/or ketone groups.

Any suitable reaction conditions may be used to prepare a polyazine heteropolymer of the present invention. For example, any suitable reaction time, temperature, and/or solvent may be used to prepare a polyazine heteropolymer of the present invention. In some embodiments, the reaction may be carried out at room temperature for a period of time sufficient to form the polyazine heteropolymer. In some embodiments, the reaction may be carried out for a period of time sufficient to have a majority of the reactants react to form the polyazine heteropolymer. In some embodiments, the solvent may be a polar aprotic solvent, a polar protic solvent and/or a non-polar solvent. In some embodiments, the reaction may be a condensation reaction.

In some embodiments, the first organic substrate and/or the second organic substrate may be thermoplastic. In some embodiments, the first organic substrate and/or the second organic substrate may melt into liquid at about 250° C. to about 300° C. (e.g., at about 275° C.) and/or may be resolidified. In some embodiments, a polyazine heteropolymer of the present invention may be thermoplastic. In some embodiments, the first organic substrate, the second organic substrate, and/or the polyazine heteropolymer may be extrudable and/or may be formed into a defined structure of any shape and/or size.

Some embodiments include a method of preparing a thermoplastic polyazine heteropolymer. In some embodiments, at least one of the first organic substrate and the second organic substrate may be thermoplastic and the first organic substrate and a second organic substrate may be reacted with a multiamine to form a thermoplastic polyazine heteropolymer. In some embodiments, one of the first organic substrate and the second organic substrate is thermoplastic and the other is not thermoplastic, and the method may provide a thermoplastic polyazine heteropolymer. Thus, in some embodiments, thermoplasticity may be provided and/or conferred to a polyazine heteropolymer of the present invention according to a method of the present invention.

Some embodiments include modulating the bandgap of a polyazine heteropolymer. "Modulate," "modulating," and grammatical variations thereof as used herein refer to an increase or reduction in the bandgap of a polyazine heteropolymer compared to the bandgap of the polyazine heteropolymer prepared according to a different method. In some embodiments, the bandgap of a polyazine heteropolymer may be increased by about 5%, 10%, 15%, 20%, 25%, or more compared to the bandgap of the polyazine heteropolymer prepared according to a different method. In some embodiments, the bandgap of a polyazine heteropolymer may be reduced by about 0.5%, 10%, 15%, 20%, 25%, or more compared to the bandgap of the polyazine heteropolymer prepared according to a different method.

In some embodiments, a method of preparing a polyazine heteropolymer may comprise modulating the bandgap of the polyazine heteropolymer. Some embodiments include modulating the polyazine heteropolymer bandgap by modulating a concentration ratio of said first organic substrate to said second organic substrate. For example, to increase or decrease the bandgap of a polyazine heteropolymer a greater amount or concentration of a first organic polymer may be used in the method of preparing the polyazine heteropolymer with a second organic polymer compared to an amount or concentration of the first organic polymer used to prepare the same polyazine heteropolymer using the second organic polymer. Thus, in some embodiments, the bandgap of a polyazine heteropolymer may be modified or tuned based on the amount or concentration of the first organic substrate and/or second organic substrate used to prepare the polyazine heteropolymer.

Prior to or concurrently with one or more steps in a method of preparing a polyazine polymer, such as, but not limited to, a cross-linked polyazine polymer, a metal may be added to the substrate and/or reaction mixture. Thus, a substrate, organic polyazine polymer, and/or cross-linked polyazine polymer may be doped with a metal, ionic liquid, ionomer, and/or the like. In some embodiments, doping a substrate, organic polyazine polymer, and/or cross-linked polyazine polymer with a metal may increase the electrical properties of the organic polyazine polymer and/or cross-linked polyazine polymer. In certain embodiments, the oxidizing step is carried out with a reagent, such as, but not limited to, iron (III) chloride, ammonium persulfate, hydrogen peroxide, urea peroxide, melamine peroxide, sodium perborate, potassium perborate, sodium percarbonate, potassium percarbonate, potassium persulfate, sodium persulfate, ferric nitrate, diammonium cerium nitrate, iron sulfate, ozone, potassium periodate, and any combination thereof, that may oxidize the organic polyazine polymer and/or dope the organic polyazine polymer and/or cross-linked polyazine polymer.

In some embodiments, a method of preparing a cross-linked polyazine polymer may comprise reacting a monocarbonyl compound with the organic polyazine polymer and a multiamine prior to the oxidizing step. Reaction of the organic polyazine polymer with a multiamine and monocarbonyl compound can result in a capped organic polyazine polymer, meaning that the monocarbonyl compound may be added onto the end of one or more of the polymer chains. In some embodiments, a monocarbonyl compound has the structure

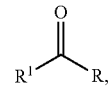

wherein

R is a conjugated and/or aromatic moiety; and $R^1$ is selected from the group consisting of hydrogen, alkyl, and alkenyl.

A substrate of the present invention and/or a method of the present invention may provide a conjugated organic polymer, which may be cross-linked and/or networked. In some embodiments, a substrate of the present invention and/or a method of the present invention may provide an organic polyazine polymer, which may be cross-linked and/or networked. A polyazine polymer of the present invention may itself be novel and/or may have novel electrical and/or light emitting and/or light absorbing properties. In some embodiments, a polyazine polymer of the present invention does not include a 2,5-furan azadiene polymer, a 2,5-thiophene azadiene polymer, benzene-1,4-dicarboxaldehyde, and/or a 1,4-benzene azadiene polymer. A polymer of the present invention (e.g., a polyazine polymer, cross-linked polyazine polymer, etc.) may have an energy band gap of less than about 3 eV, such as, but not limited to, an energy band gap of about 0 to about 2.75 eV, about 1 to about 2.5 eV, or about 1.5 to about 2 eV.

According to further embodiments of the present invention, provided is an electrochemical device comprising a polymer of the present invention, such as, but not limited to, a polyazine polymer and/or a cross-linked polyazine polymer. An electrochemical device according to embodiments of the invention may comprise a working electrode, a counter electrode, and a polymer of the present invention (e.g., a polyazine polymer and/or cross-linked polyazine polymer), wherein said working electrode is in operative communication with said counter electrode, and the polymer is in operative communication with said working electrode or said counter electrode. In certain embodiments, the polymer may be conjugated, and may optionally comprise a metal. The polymer may have an energy band gap of less than about 3 eV.

In some embodiments, a polymer of the present invention (e.g., a polyazine polymer and/or cross-linked polyazine polymer) is disposed on at least a portion of a working electrode. The polymer may be directly or indirectly in contact with at least a portion of a working electrode. In certain embodiments, a polymer of the present invention (e.g., a polyazine polymer and/or cross-linked polyazine polymer) may be interposed between a working electrode and a counter electrode. In some embodiments, an electrochemical device comprises a polymer of the present invention (e.g., polyazine polymer and/or cross-linked polyazine polymer) that may be in the form of a coating in contact with or on a working electrode and/or a counter electrode.

An electrochemical device of the present invention encompasses all types of devices to perform electrochemical reactions, including, but not limited to, photovoltaic reactions. Exemplary electrochemical devices include, but are not limited to, a battery; a fuel cell; a solar cell; a light emitting diode including an organic light emitting diode; a light emitting electrochemical cell; a transistor; a photoconductor drum; a memory device; a capacitor including a supercapacitor, an ultracapacitor, and/or an electric double-layer capacitor; a radio frequency identification device (RFID); or a device formed of a combination thereof; and any combination thereof. In some embodiments, light emitting diode comprises a polymer of the present invention (e.g., polyazine polymer and/or cross-linked polyazine polymer).

The present invention is explained in greater detail in the following non-limiting Examples.

EXAMPLES

Example 1

The polyazine polymers of Table 1 were synthesized with the reactants provided in Table 1 using the following method. 0.1 grams of each respective dialdehyde, trialdehyde, diacetyl, or triacetyl were dissolved in 7 ml of water, ethanol or acetonitrile and the pH adjusted to pH 5.0. For glyoxal, which was a 40% solution, 250 microliters of the glyoxal solution was added to 7 ml of water. 0.1 grams of the each respective multiamine was dissolved in 7 ml of water or ethanol and the pH adjusted to 5.0. For hydrazine, which was a 65% hydrazine monohydrate solution, 180 microliters of the hydrazine solution was added to 7 ml of water. For 2,5 diaminosulfonic acid, the powder was first solubilized at high pH in water, then the pH was adjusted to pH 5.0. 100 microliters of each respective aldehyde or acetyl compound was mixed with 100 microliters of each multiamine in a 96 well microtiter plate in a grid format with the amines along the x-axis and the aldehydes along the y-axis. Four microtiter plates were used to complete all the sample combinations. Some polymers appeared quickly but the reactions were allowed to proceed for 24 hours. The solvents used for each aldehyde and acetyl compound are provided in Table 2 and the solvents used for each multiamine compound are provided in Table 3.

Figure 1B:
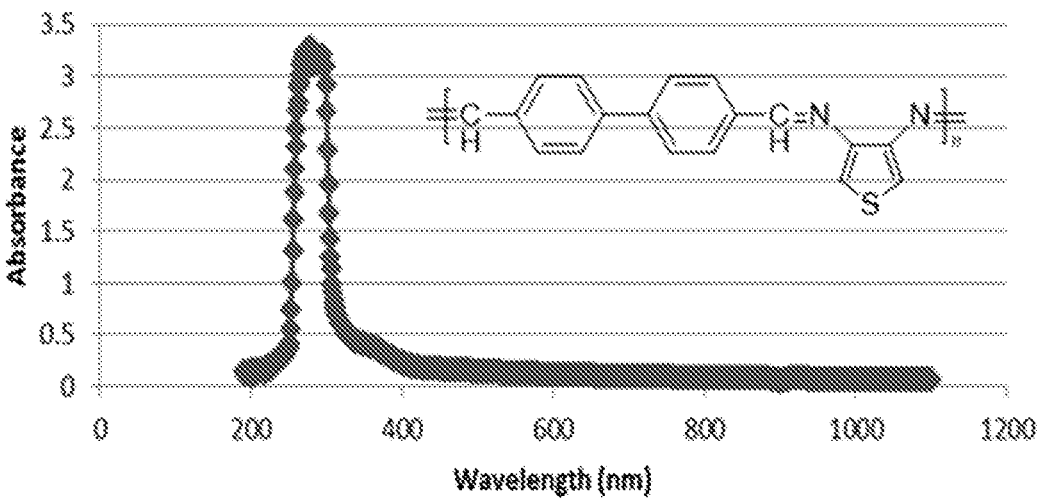
Figure 1C:
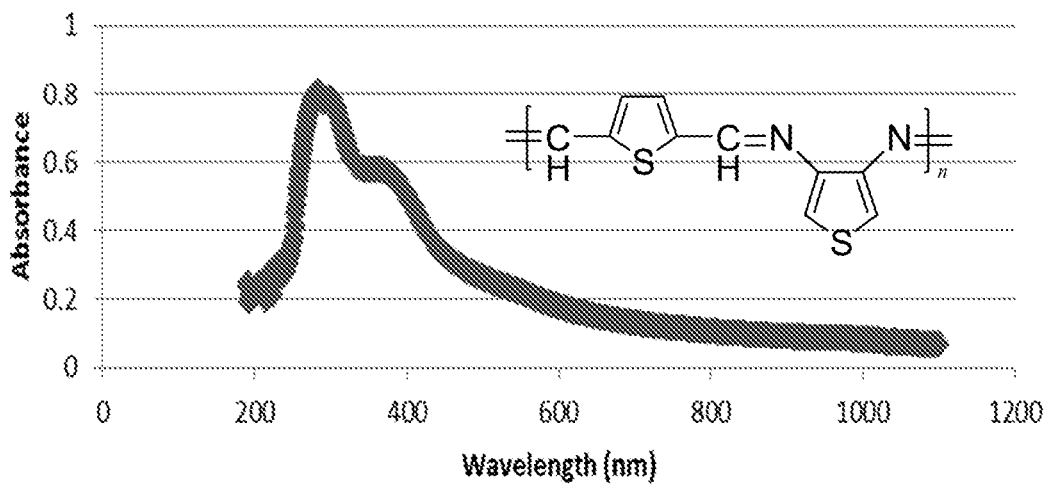
Figure 1D:
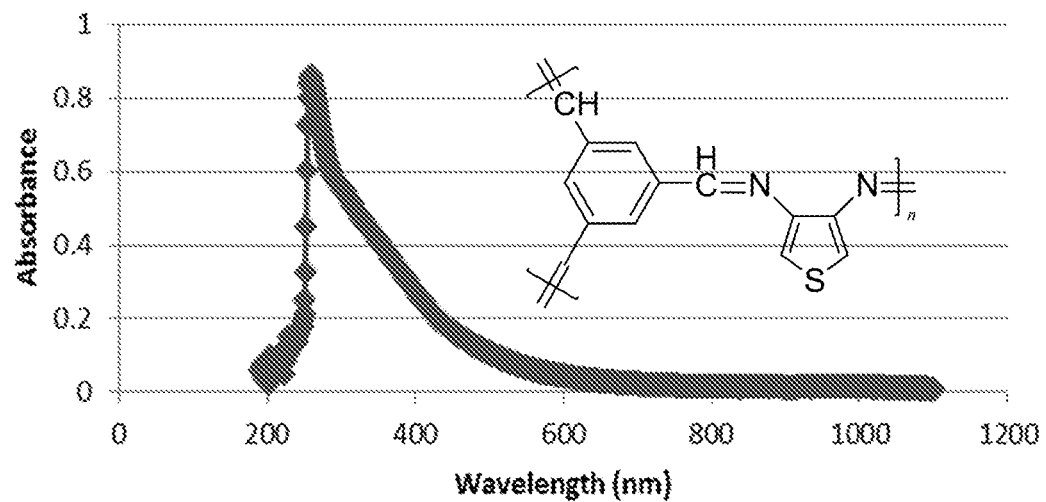
Figure 2A:
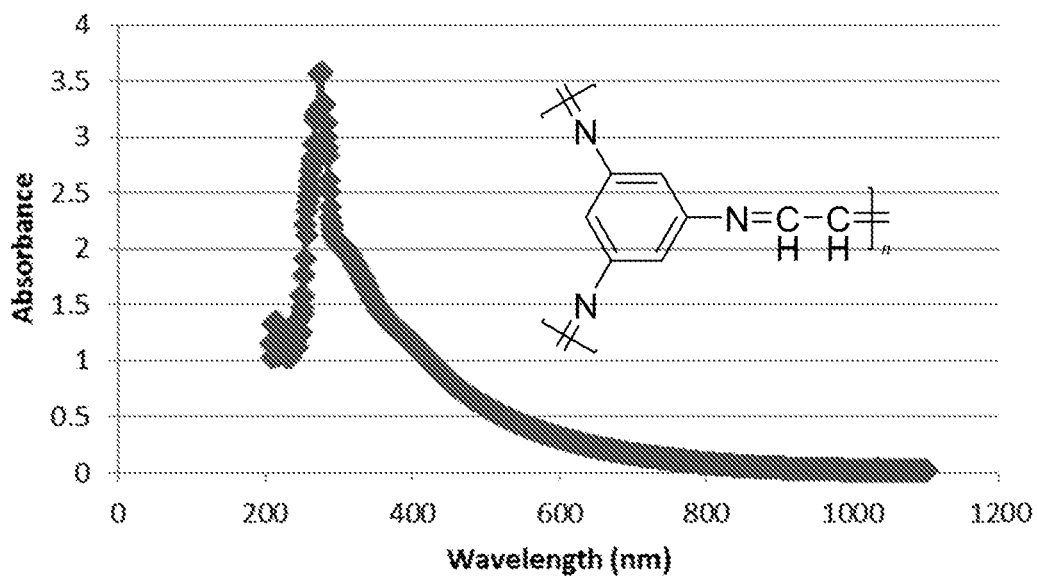
FIGS. 2A-H show absorbance spectra for polymers prepared by reacting 1,3,5-benzene triamine with (A) glyoxol, (B) 2,5-furan dicarboxaldehyde, (C) benzene-1,3-dicarboxaldehyde, (D) 4,4-biphenyl dicarboxaldehyde, (E) 2,5-thiophene dicarboxaldehyde, (F) 3,4-dimethyl-2,5-pyrrole dicarboxaldehyde, (G) benzene-1,3,5-tricarboxaldehyde, or (H) 1,4-diacetyl benzene.
Figure 2B:
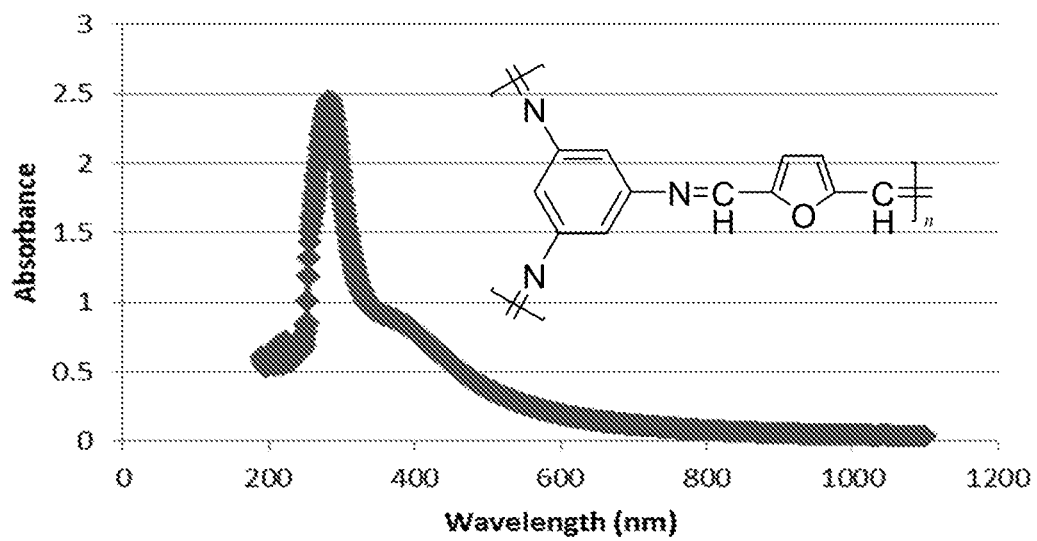
Figure 2C:
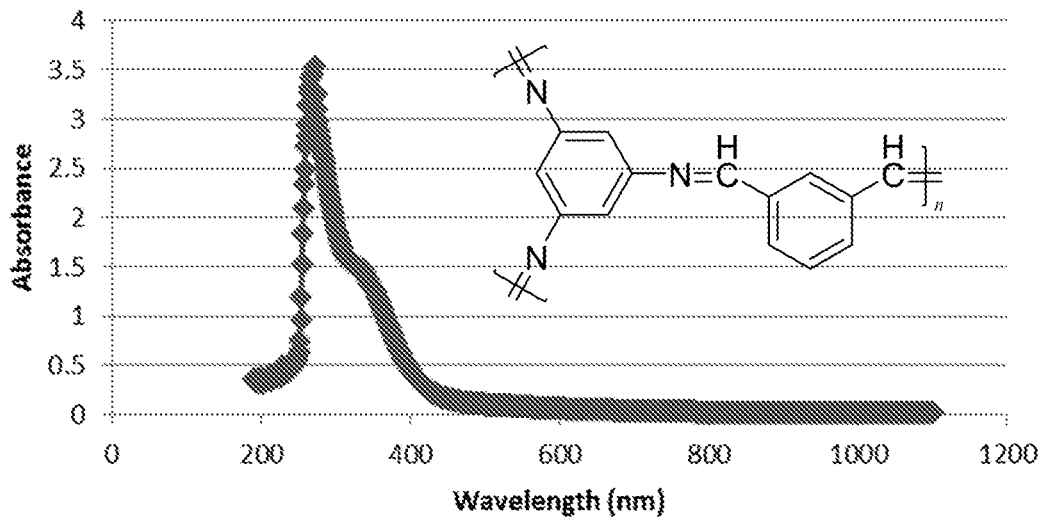
Figure 2D:
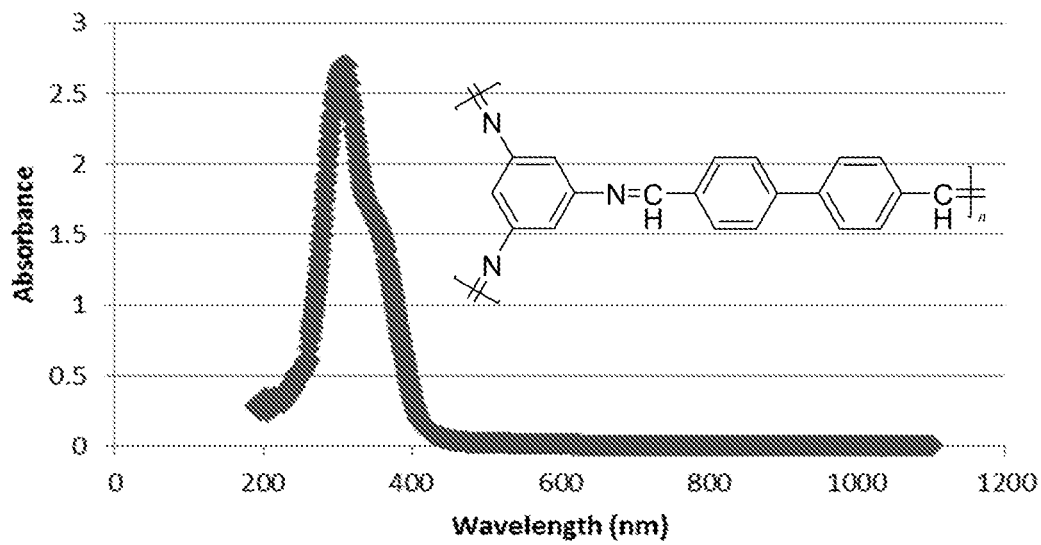
Figure 2E:
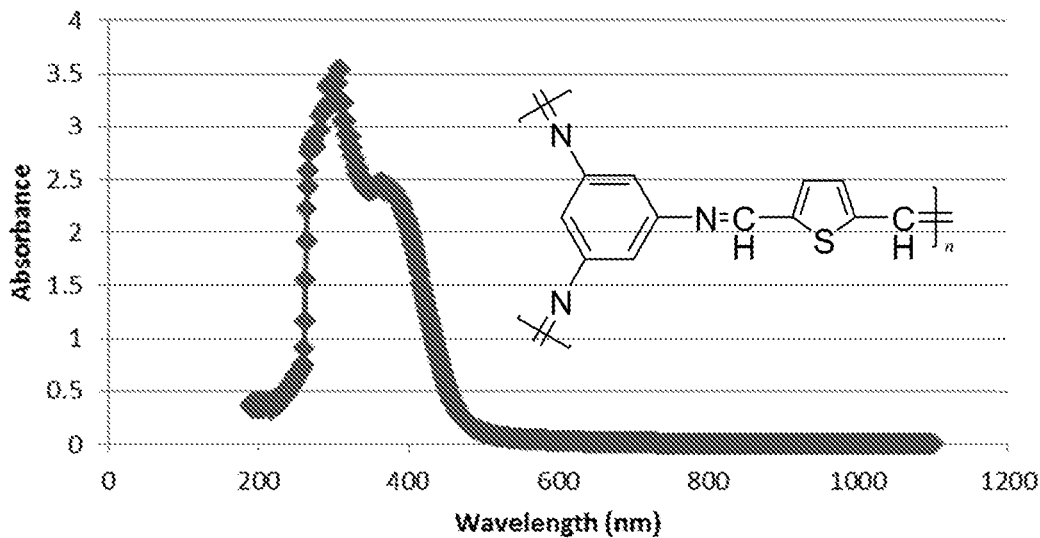
Figure 2F:
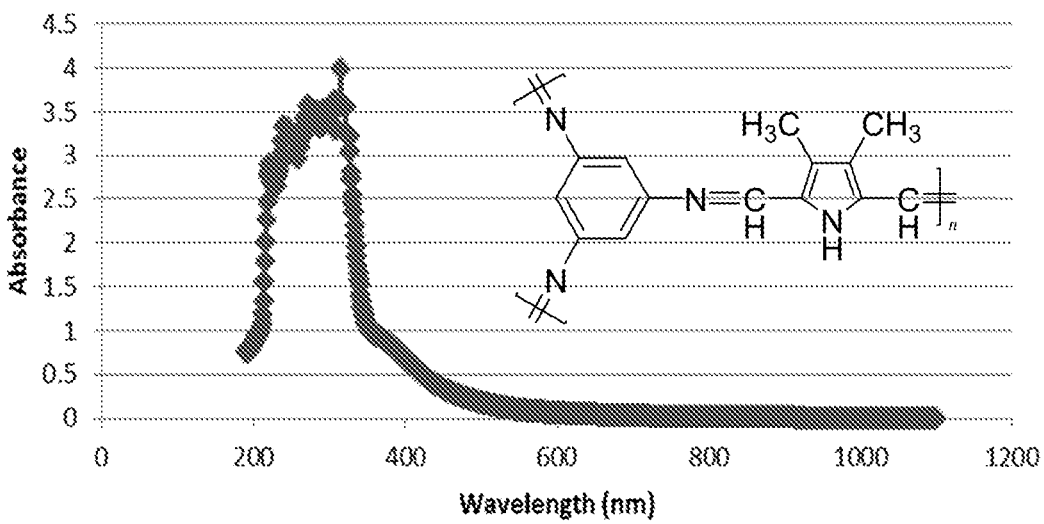
Figure 2G:
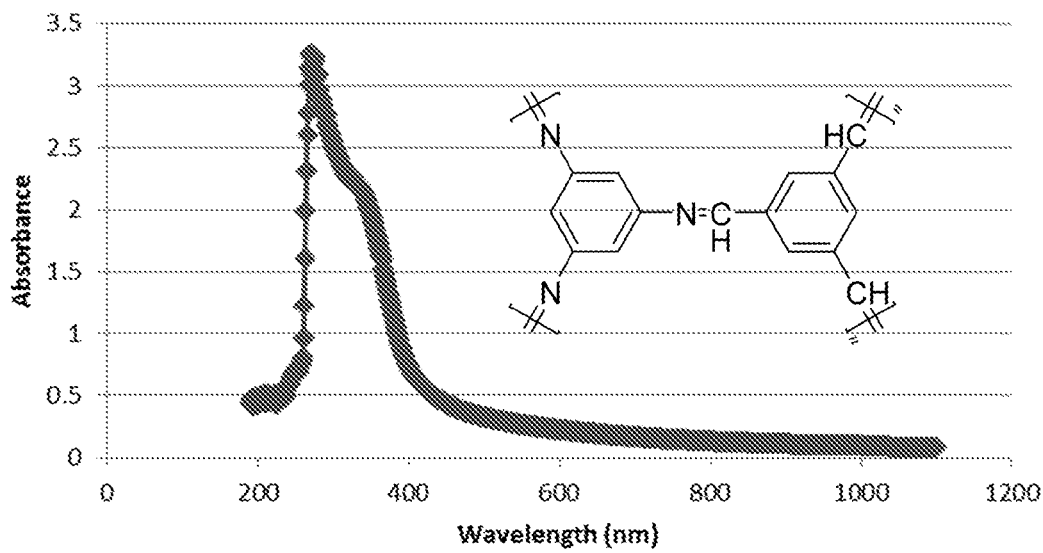
Figure 2H:
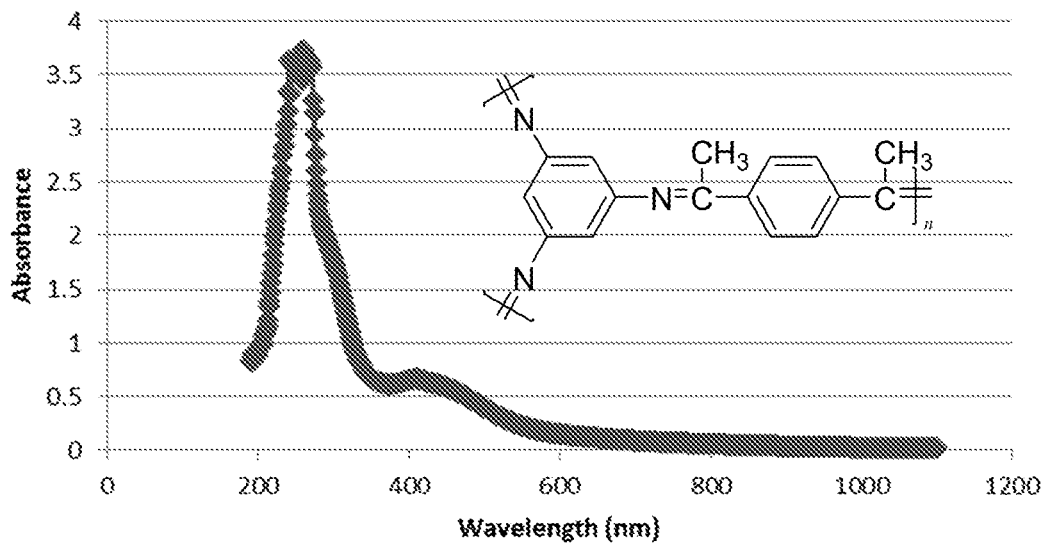
Figure 3A:
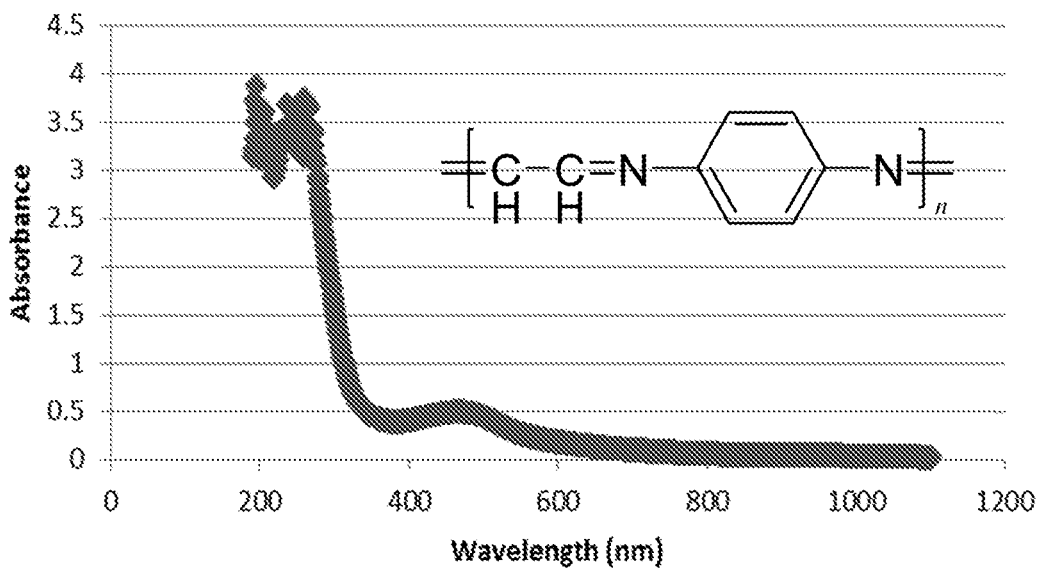
FIGS. 3A-H show absorbance spectra for polymers prepared by reacting 1,4-benzene diamine with (A) glyoxol, (B) 2,5-furan dicarboxaldehyde, (C) benzene-1,3-dicarboxaldehyde, (D) 4,4-biphenyl dicarboxaldehyde, (E) 2,5-thiophene dicarboxaldehyde, (F) 3,4-dimethyl-2,5-pyrrole dicarboxaldehyde, (G) benzene-1,3,5-tricarboxaldehyde, or (H) 1,4-diacetyl benzene.
Figure 3B:
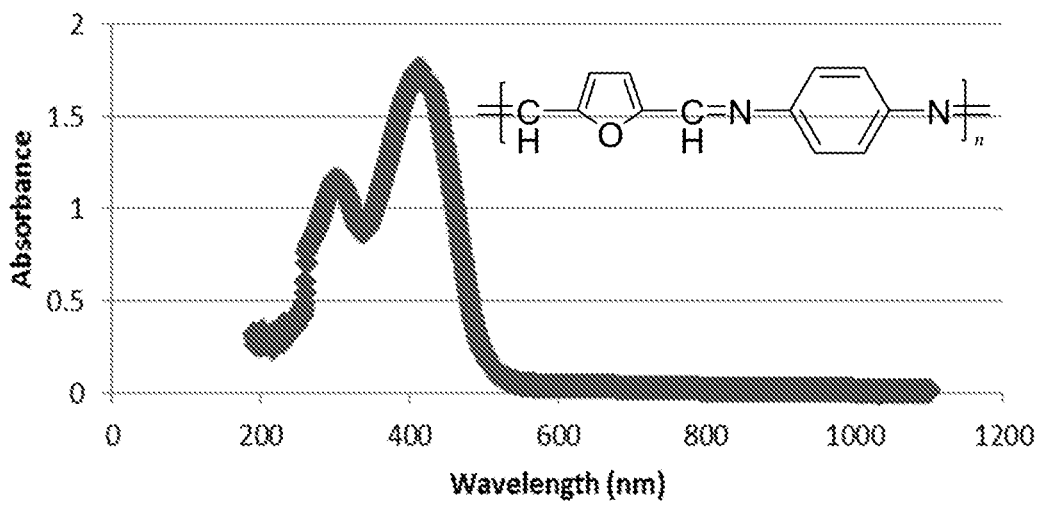
Figure 3C:
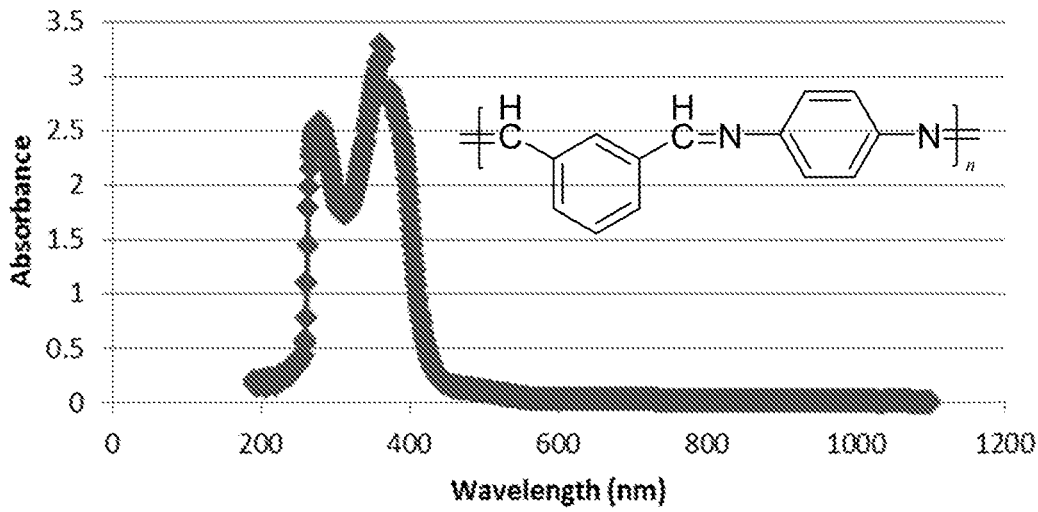
Figure 3D:
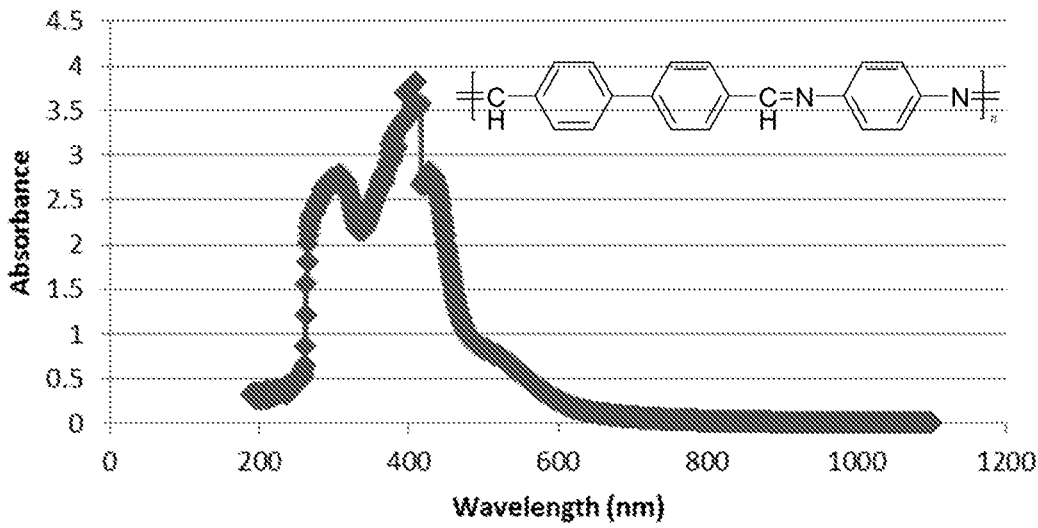
Figure 3E:
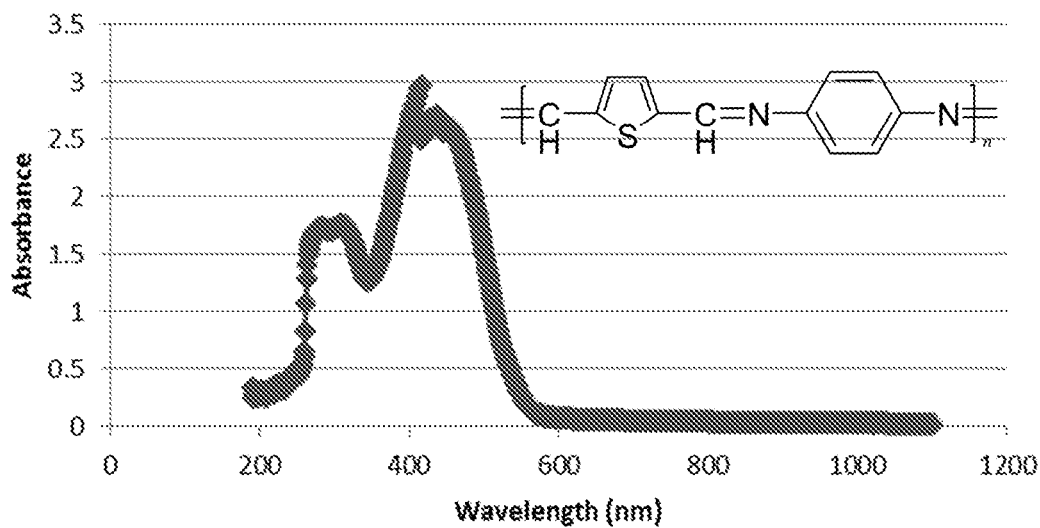
Figure 3F:
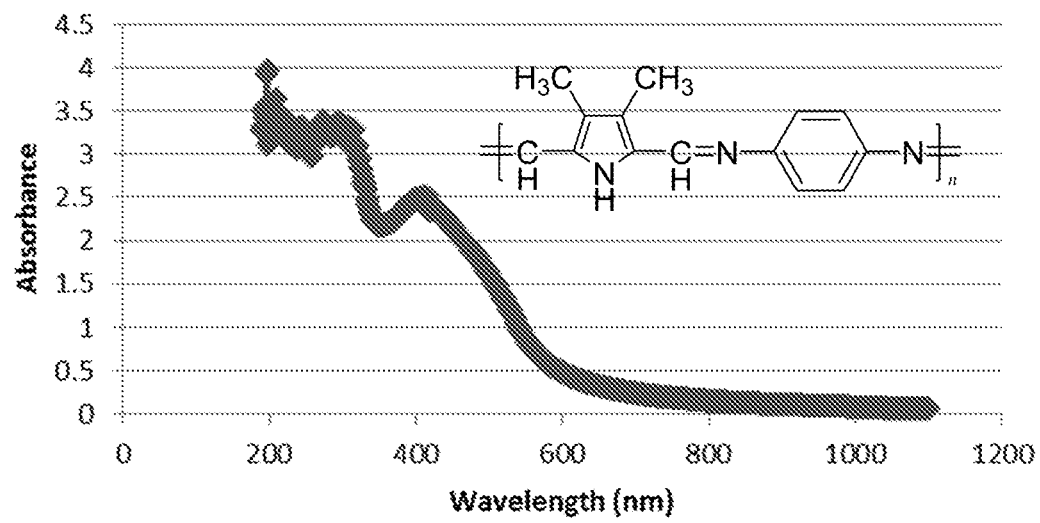
Figure 3G:
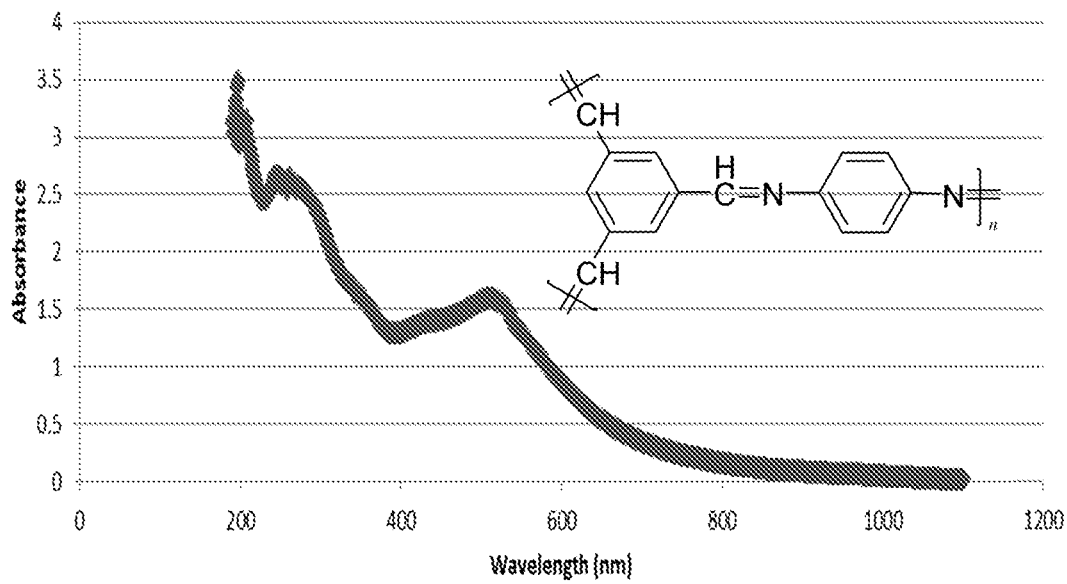
Figure 3H:
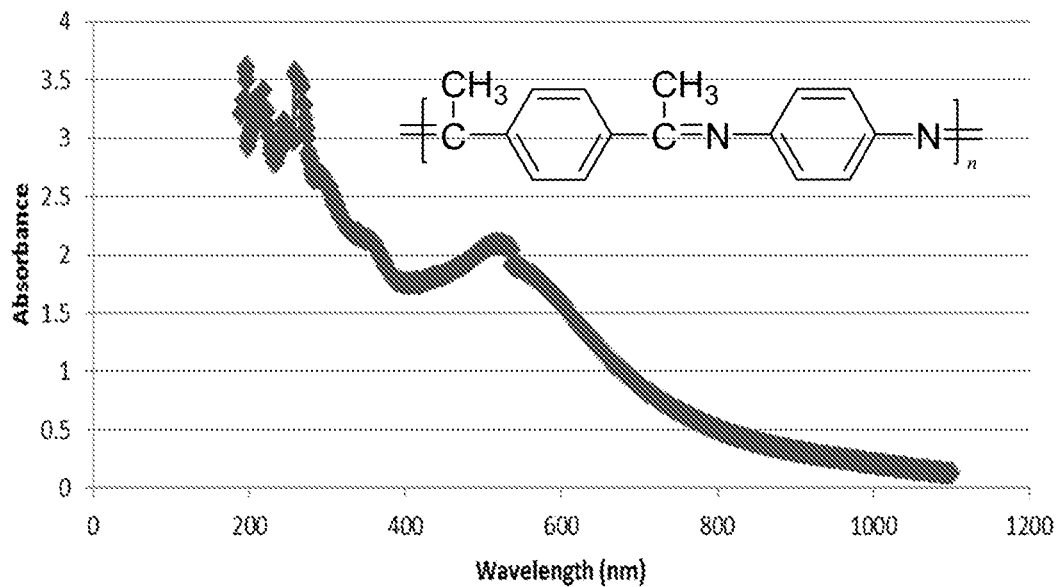
Figure 4A:
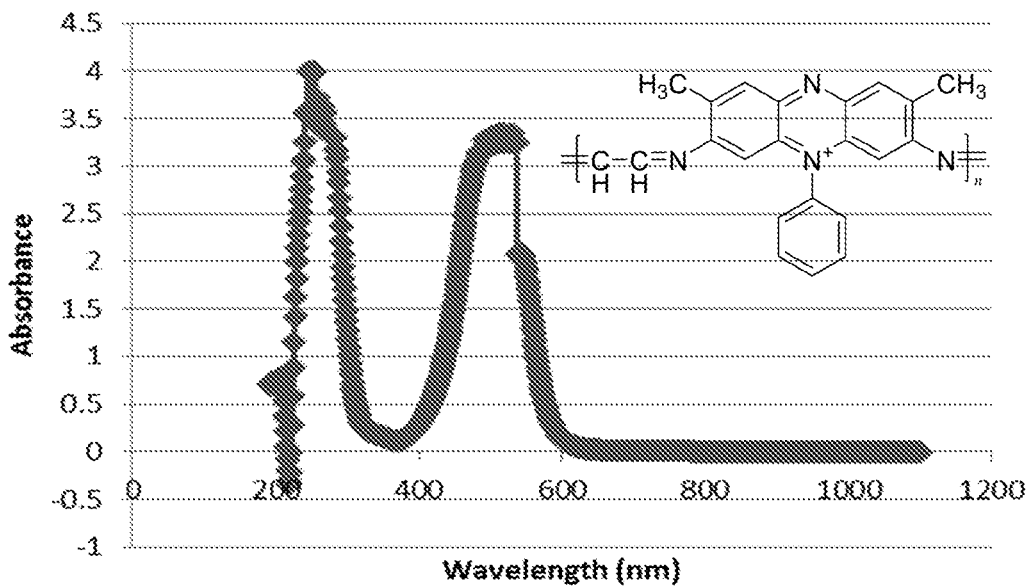
FIGS. 4A-H show absorbance spectra for polymers prepared by reacting safranin O diamine with (A) glyoxol, (B) 2,5-furan dicarboxaldehyde, (C) benzene-1,3-dicarboxaldehyde, (D) 4,4-biphenyl dicarboxaldehyde, (E) 2,5-thiophene dicarboxaldehyde, (F) 3,4-dimethyl-2,5-pyrrole dicarboxaldehyde (spectrum taken in DMF), (G) 3,4-dimethyl-2,5-pyrrole dicarboxaldehyde (spectrum taken in water) or (H) 1,4-diacetyl benzene.
Figure 4B:
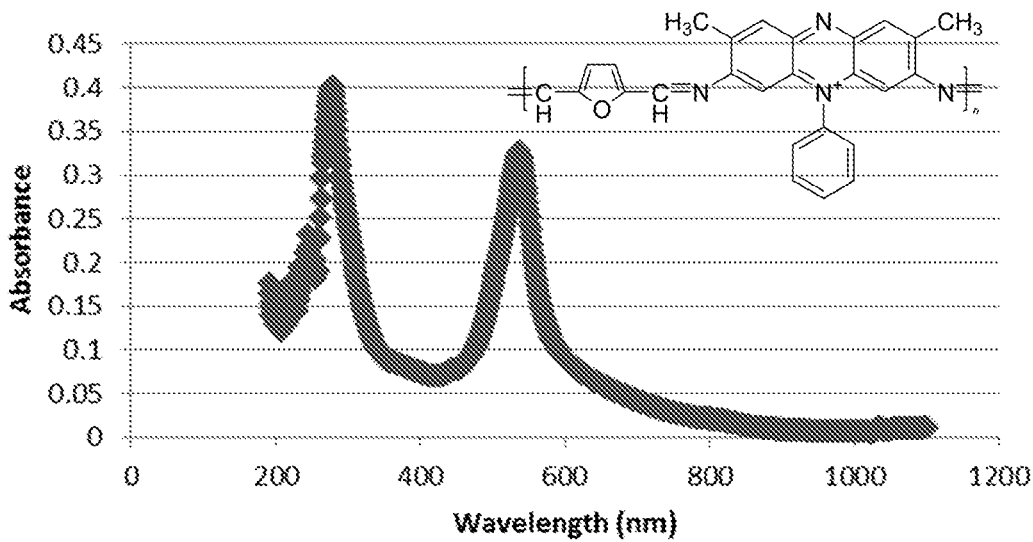
Figure 4C:
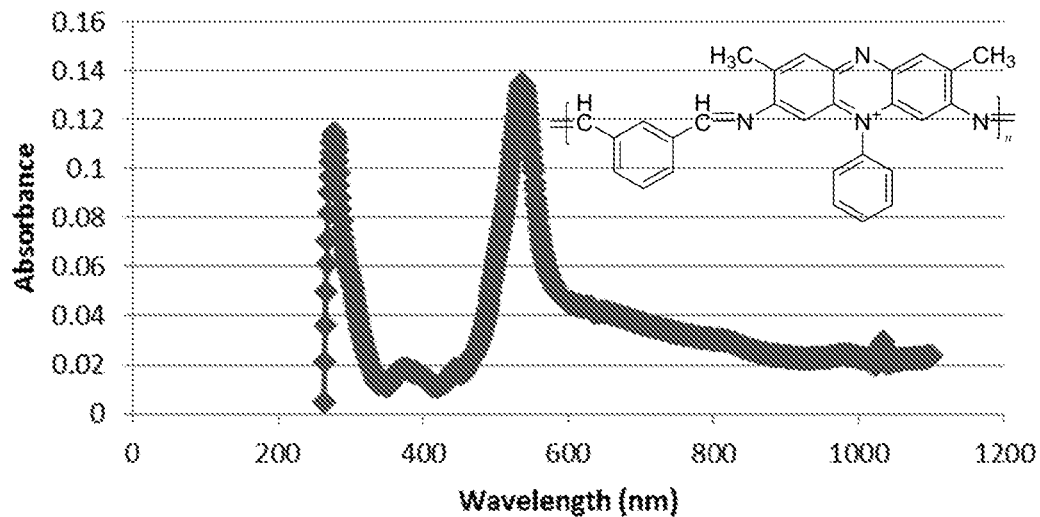
Figure 4D:
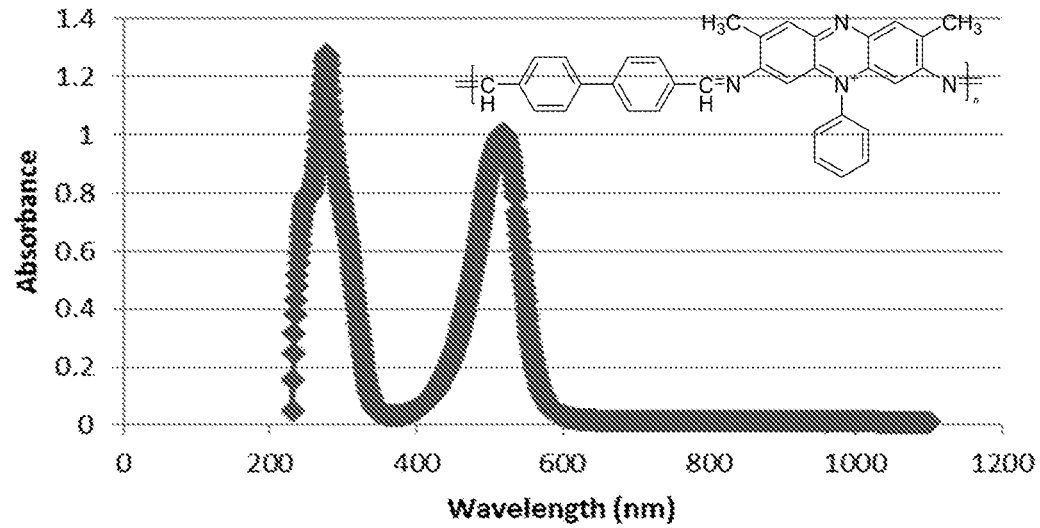
Figure 4E:
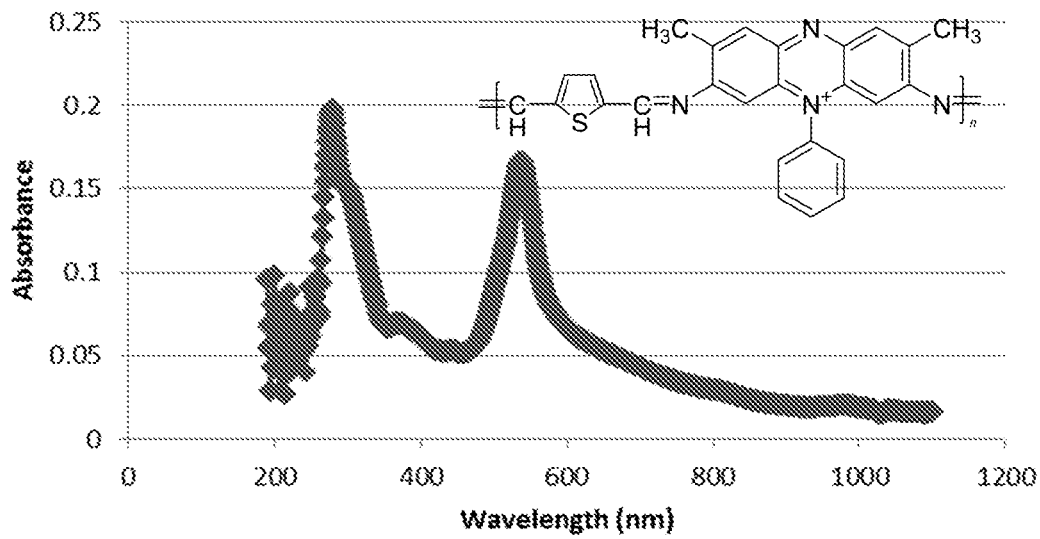
Figure 4F:
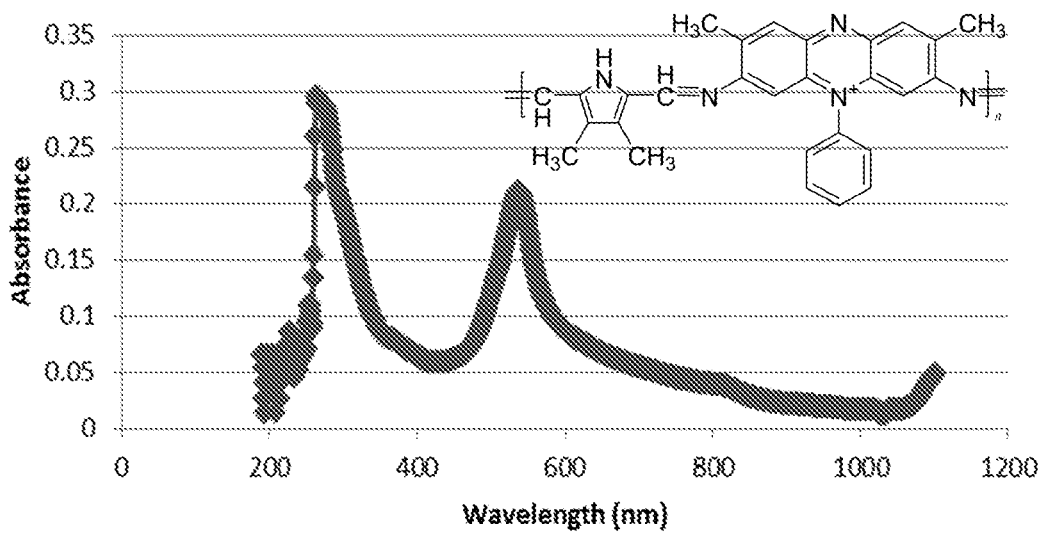
Figure 4G:
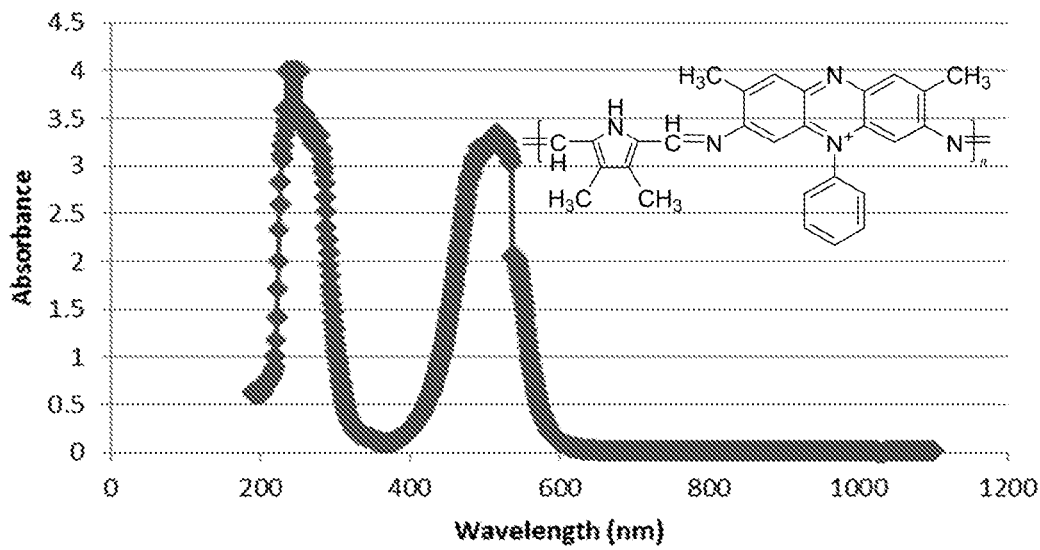
Figure 4H:
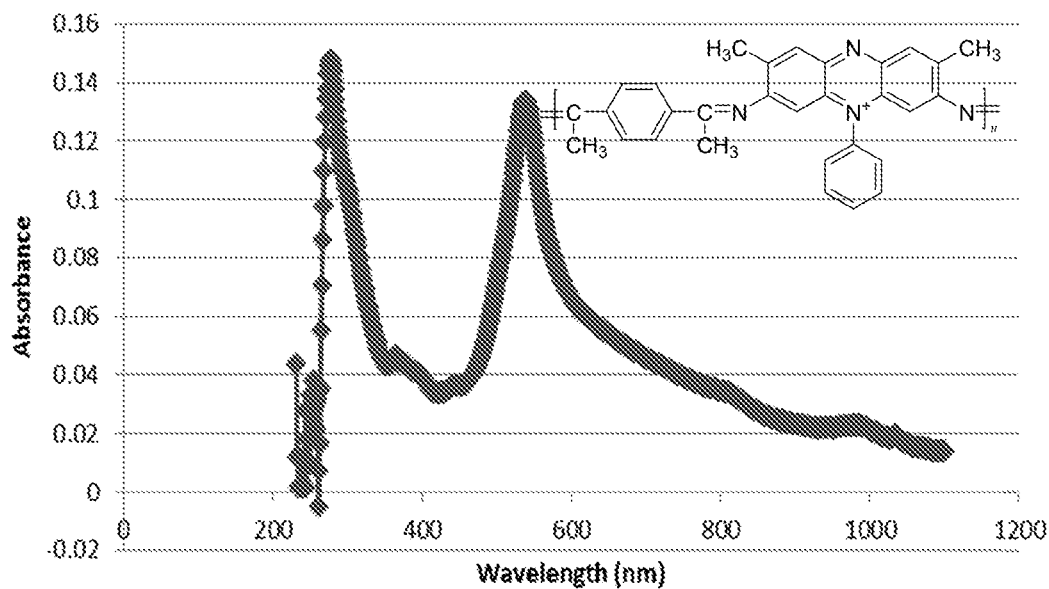
Figure 5A:
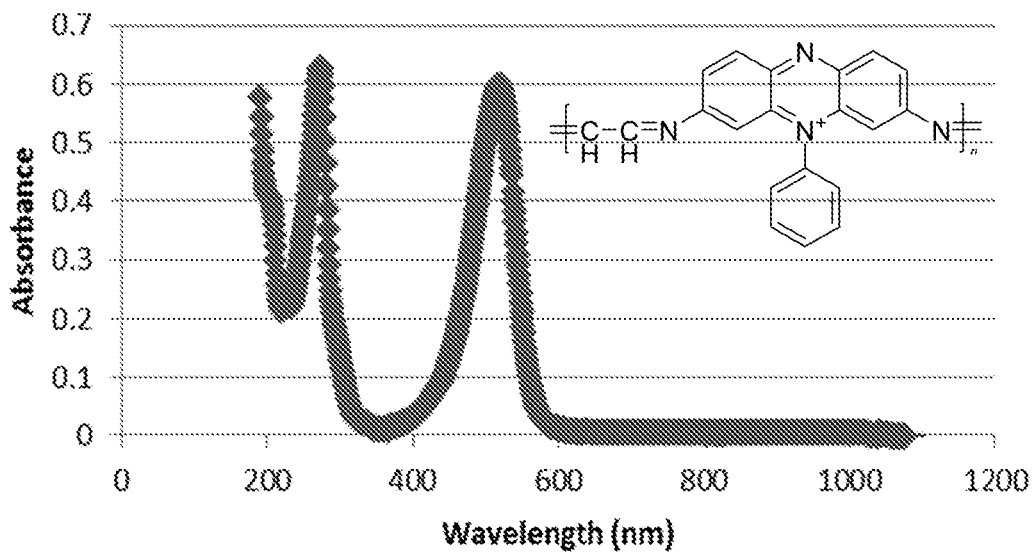
FIGS. 5A-H show absorbance spectra for polymers prepared by reacting phenosafranin diamine with (A) glyoxol, (B) 2,5-furan dicarboxaldehyde, (C) benzene-1,3-dicarboxaldehyde, (D) 4,4-biphenyl dicarboxaldehyde, (E) 2,5-thiophene dicarboxaldehyde, (F) 3,4-dimethyl-2,5-pyrrole dicarboxaldehyde, (G) benzene-1,3,5-tricarboxaldehyde, or (H) 1,4-diacetyl benzene.
Figure 5B:
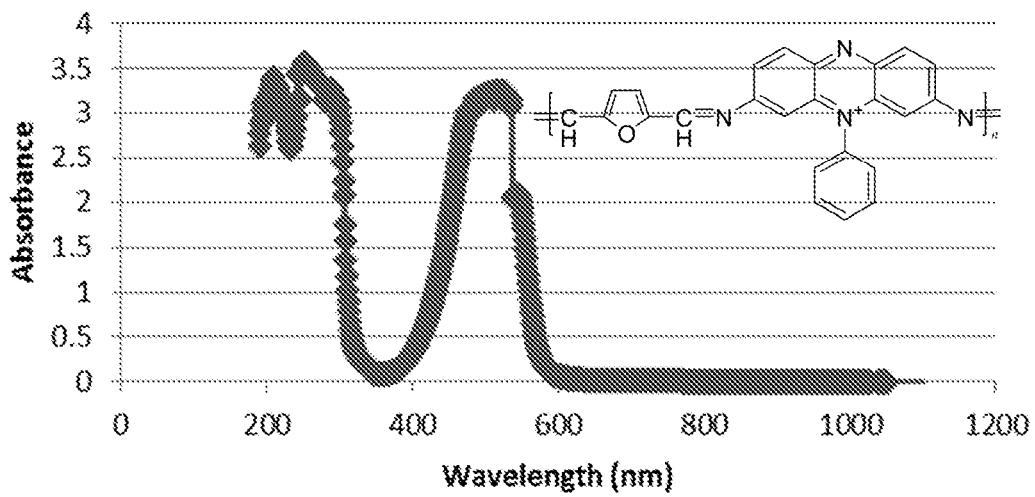
Figure 5C:
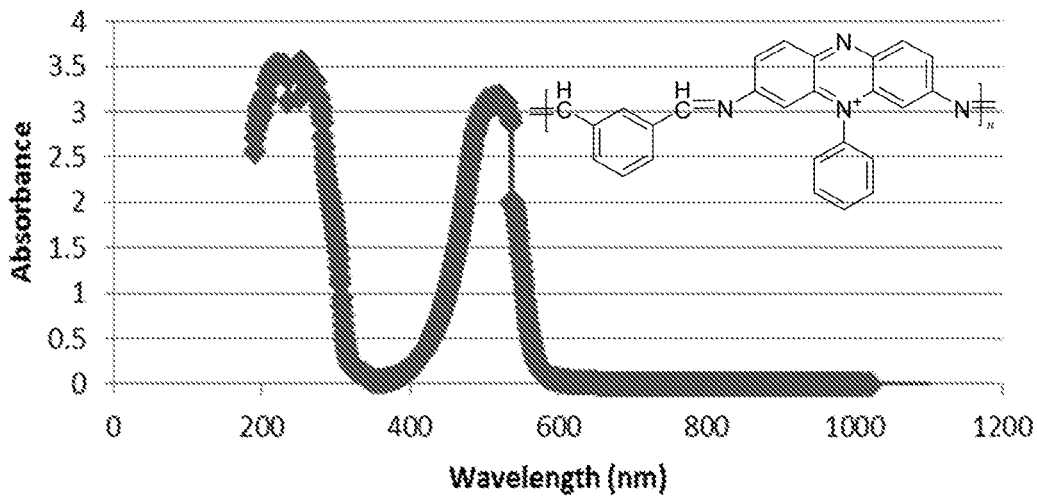
Figure 5D:
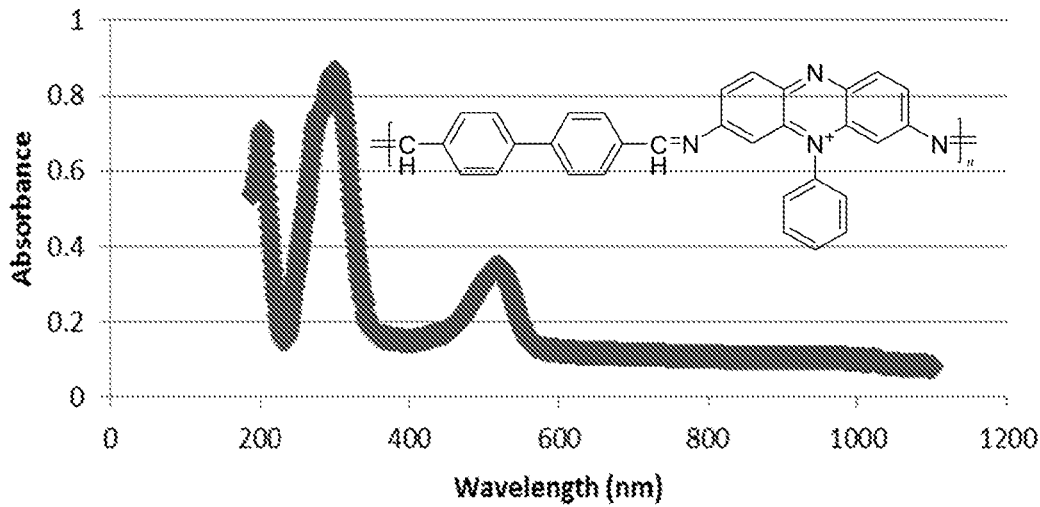
Figure 5E:
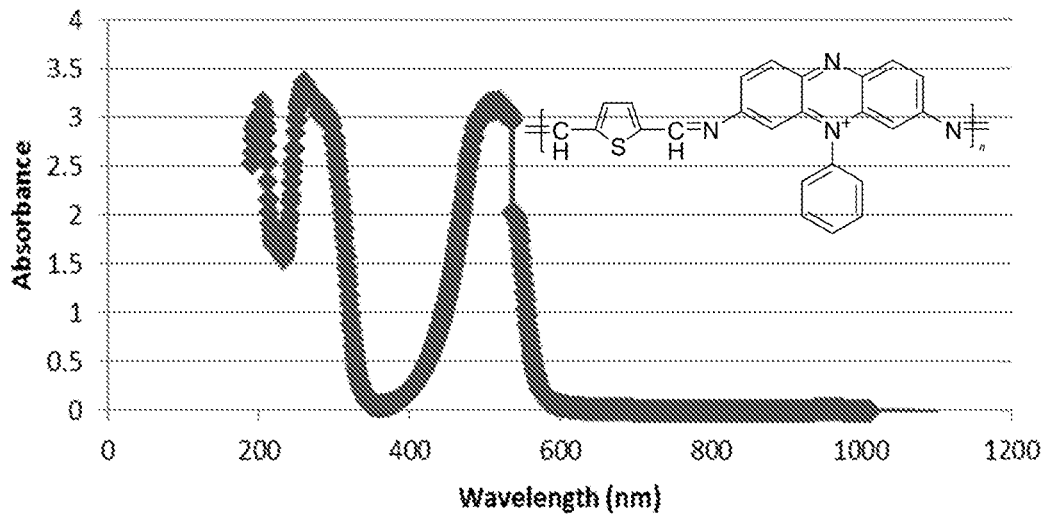
Figure 5F:
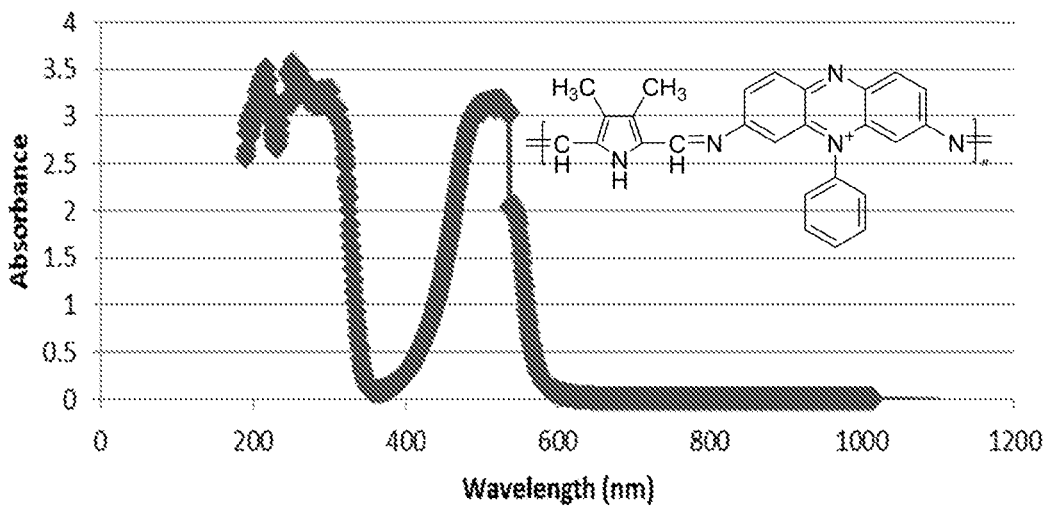
Figure 5G:
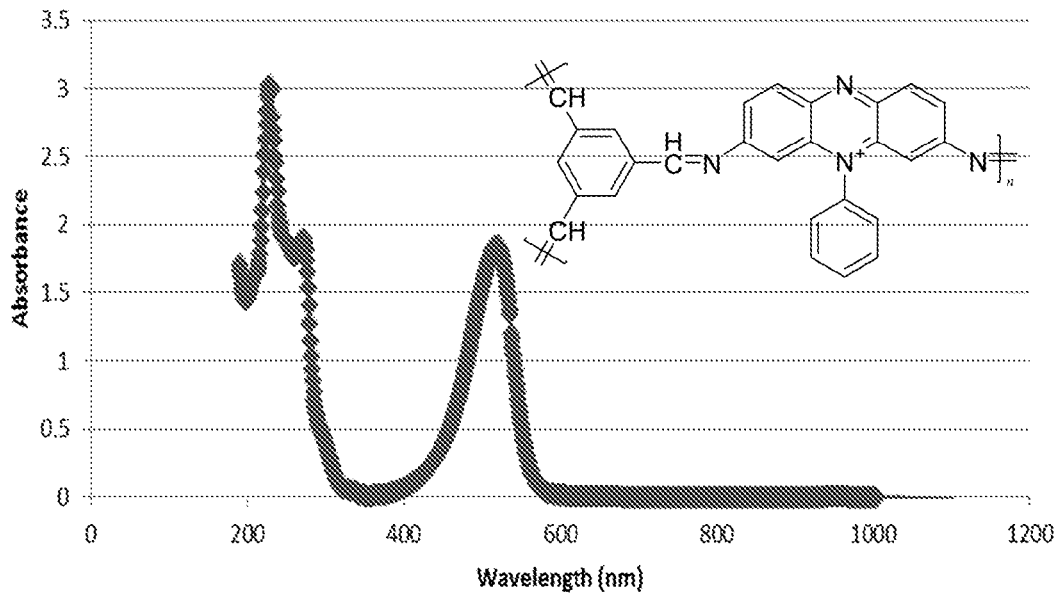
Figure 5H:
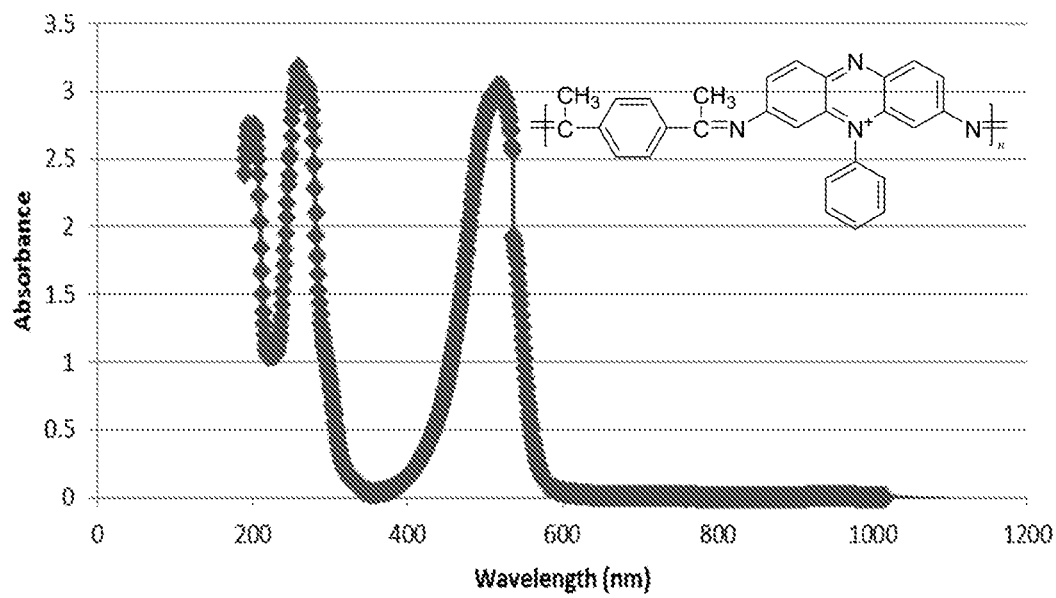
Figure 6A:
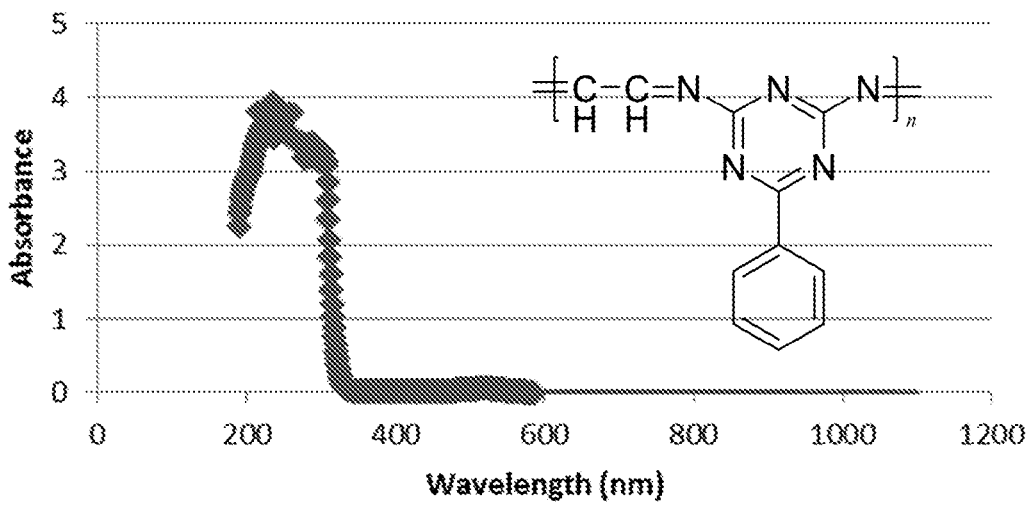
FIGS. 6A-G show absorbance spectra for polymers prepared by reacting 2,4 diamino-6-phenyl-1,3,5-triazine with (A) glyoxol, (B) 2,5-furan dicarboxaldehyde, (C) benzene-1,3-dicarboxaldehyde, (D) 4,4-biphenyl dicarboxaldehyde, (E) 2,5-thiophene dicarboxaldehyde, (F) 3,4-dimethyl-2,5-pyrrole dicarboxaldehyde, or (G) benzene-1,3,5-tricarboxaldehyde.
Figure 6B:
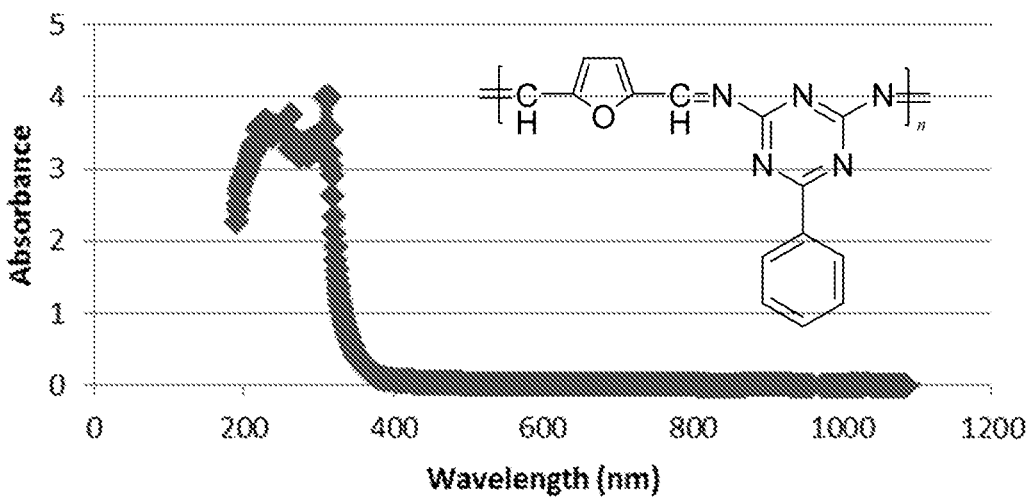
Figure 6C:
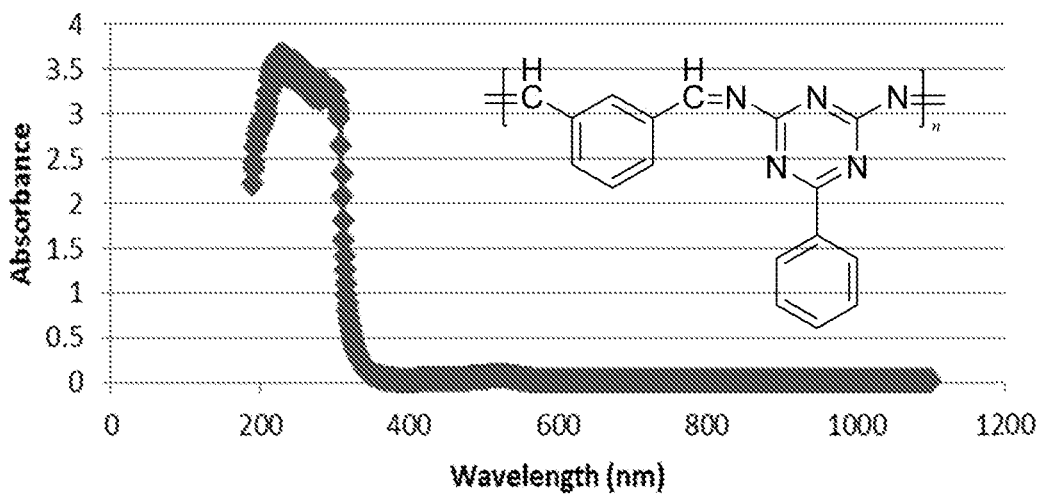
Figure 6D:
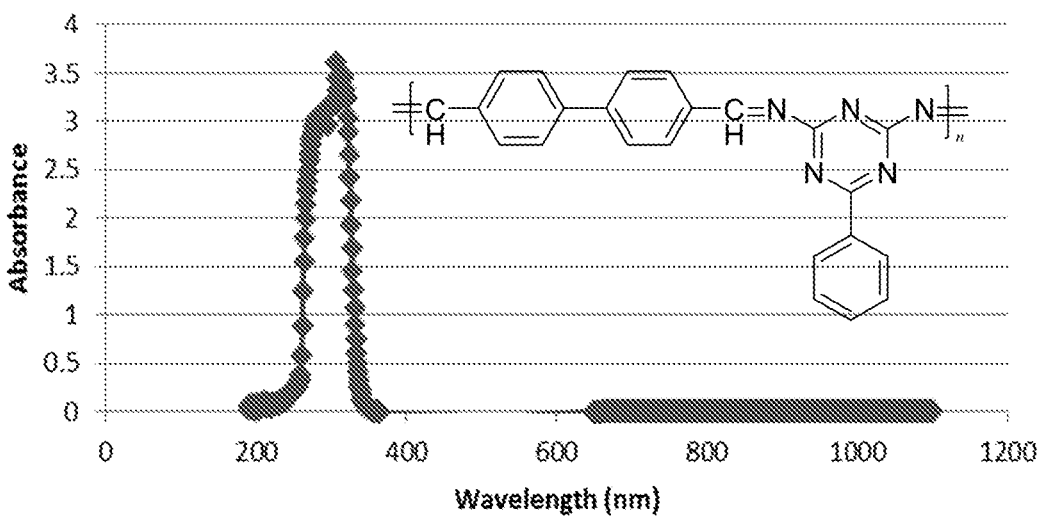
Figure 6E:
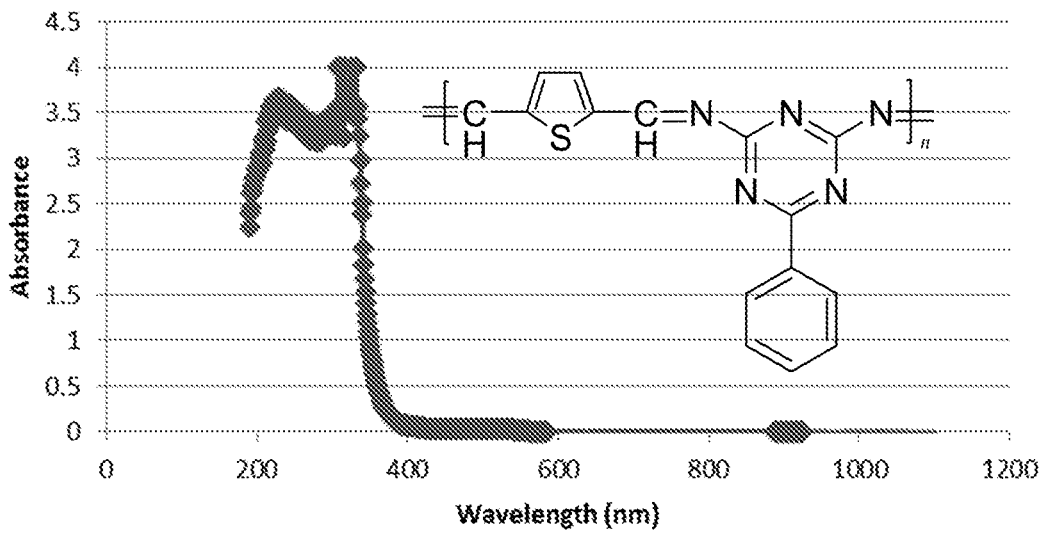
Figure 6F:
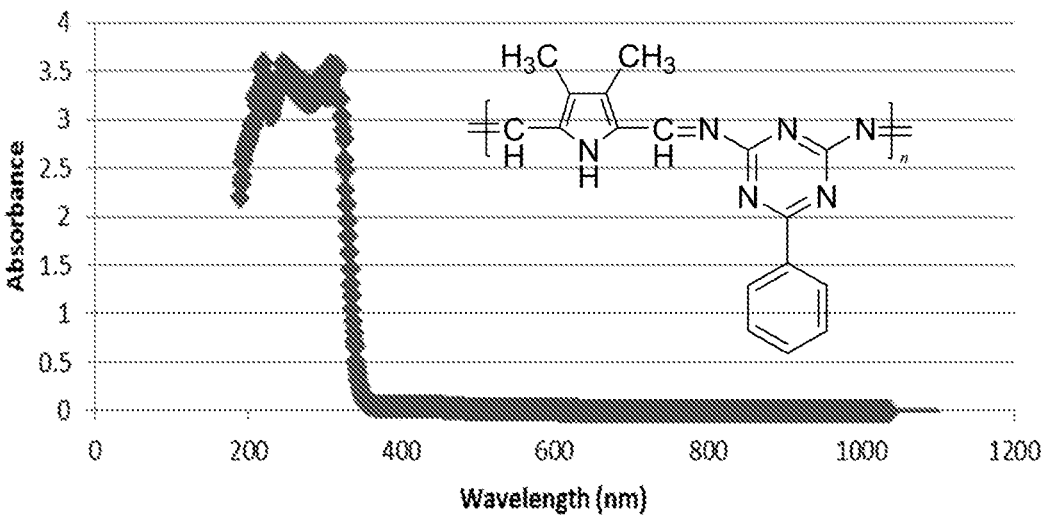
Figure 6G:
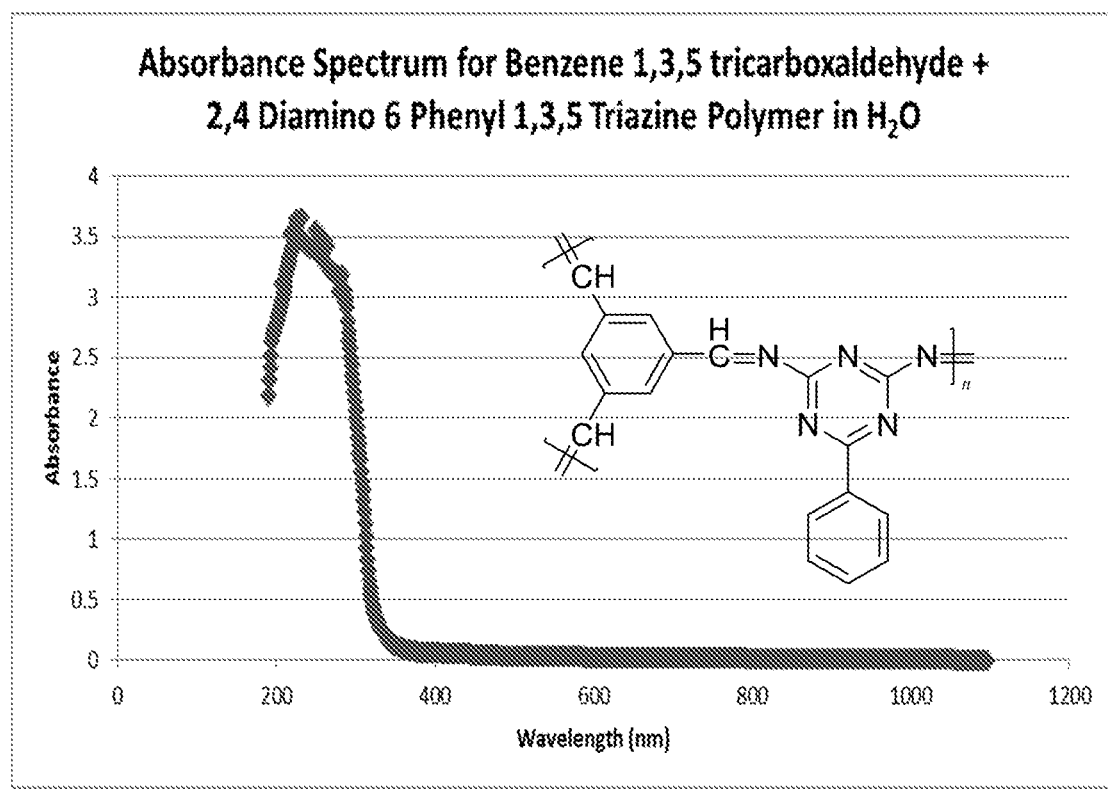
Figure 7A:
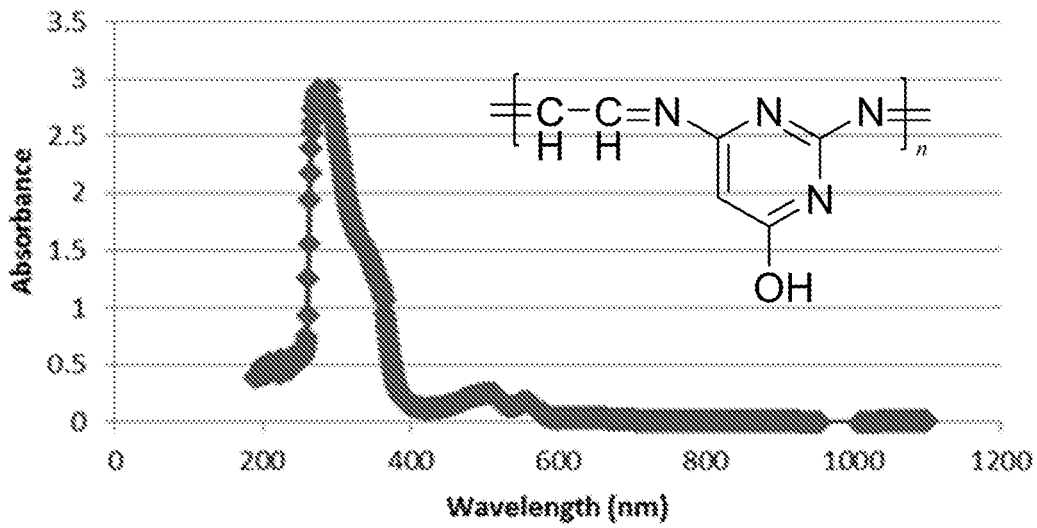
FIGS. 7A-F show absorbance spectra for polymers prepared by reacting 2,4-diamino-6-hydroxy-pyrimidine with (A) glyoxol, (B) 2,5-furan dicarboxaldehyde, (C) benzene- 1,3-dicarboxaldehyde, (D) 2,5-thiophene dicarboxaldehyde, (E) 3,4-dimethyl-2,5-pyrrole dicarboxaldehyde, or (F) benzene-1,3,5-tricarboxaldehyde.
Figure 7B:
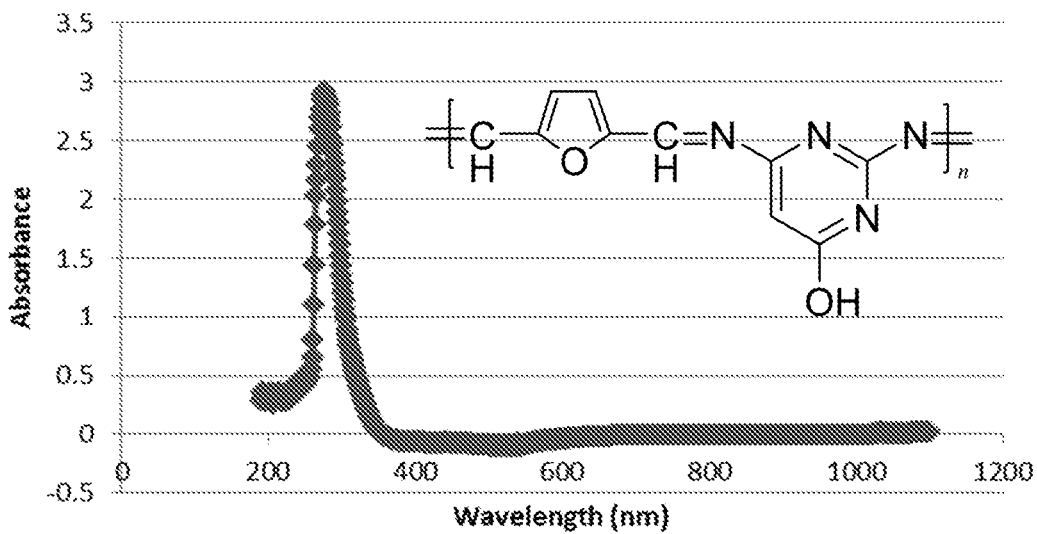
Figure 7C:
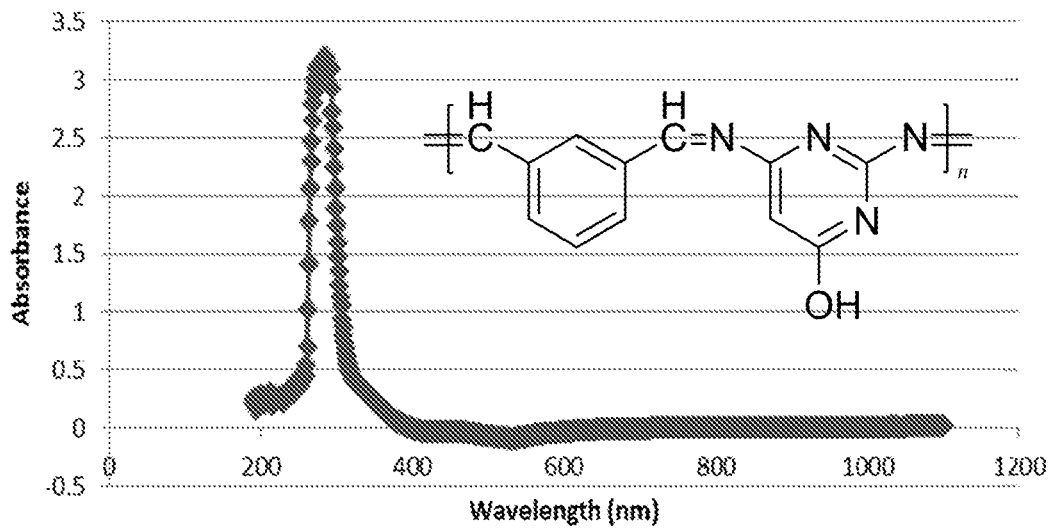
Figure 7D:
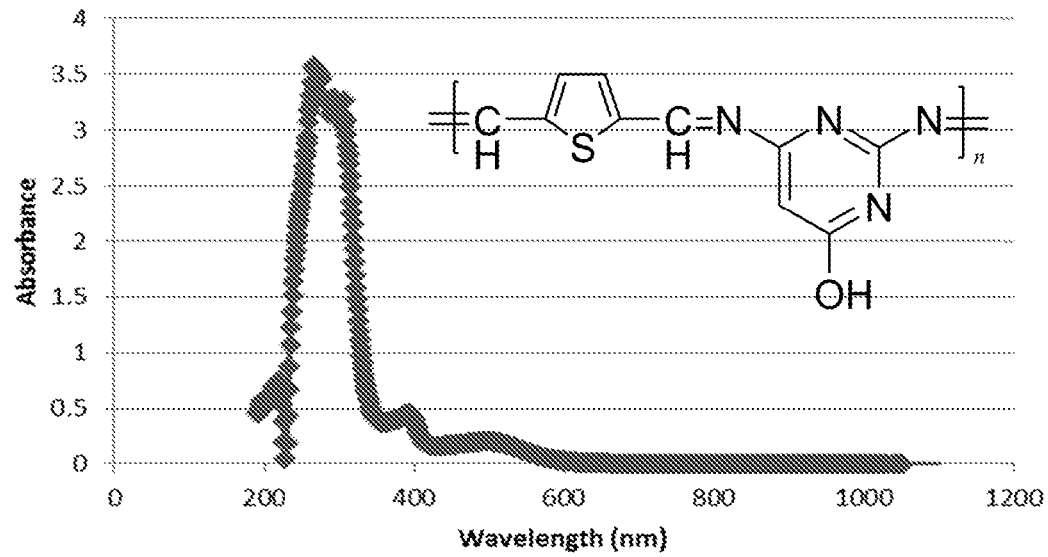
Figure 7E:
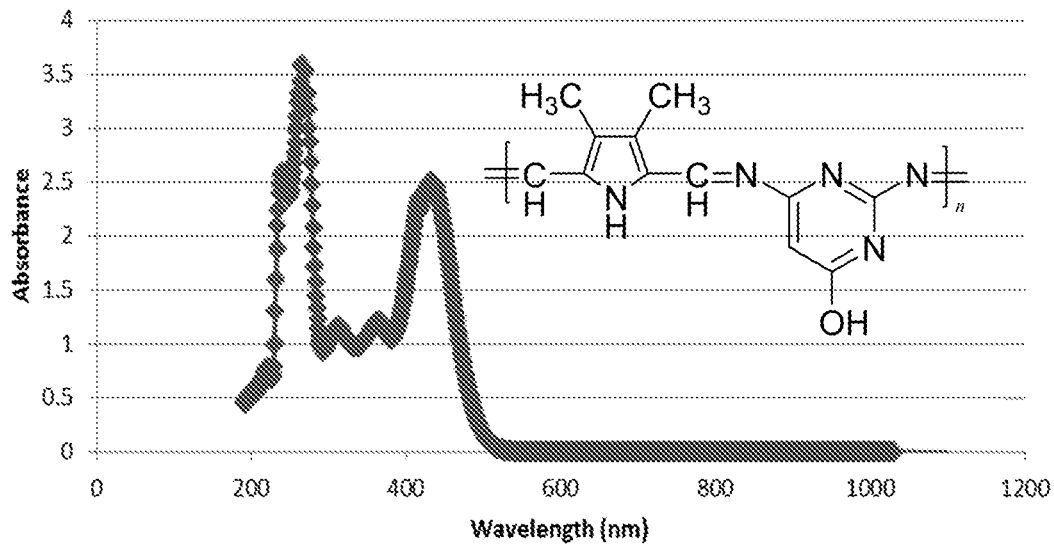
Figure 7F:
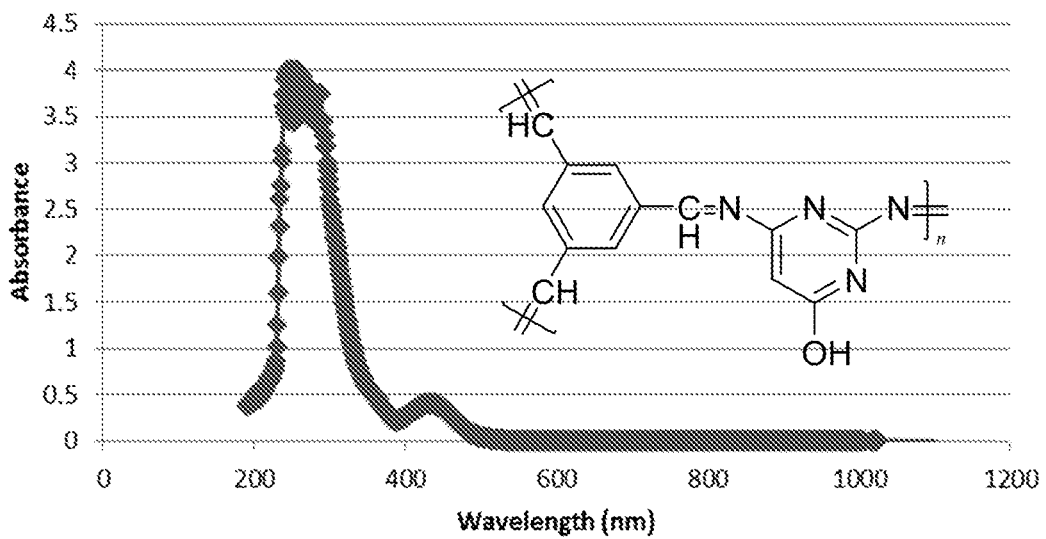
Figure 8A:
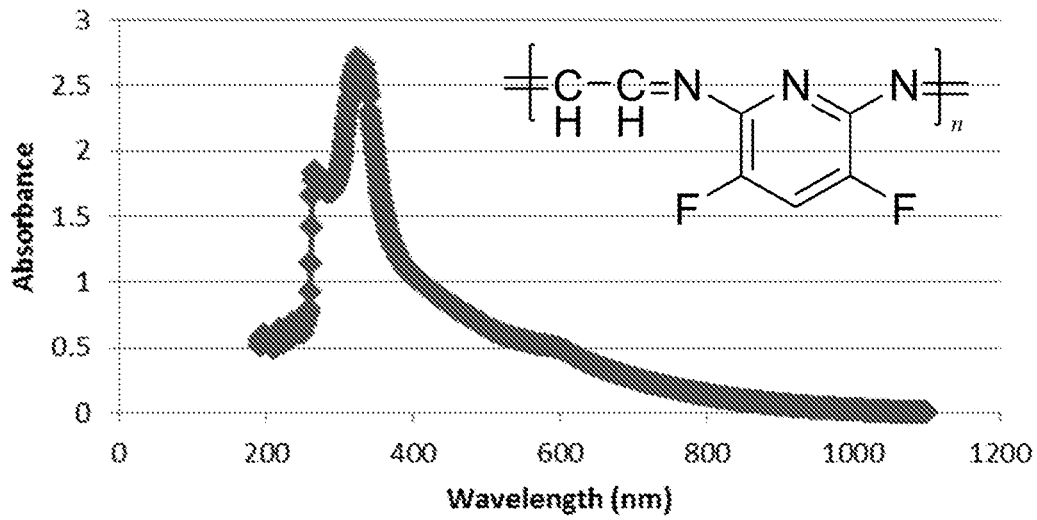
FIGS. 8A-G show absorbance spectra for polymers prepared by reacting 2,6-diamino-3,5-difluoropyridine with (A) glyoxol, (B) 2,5-furan dicarboxaldehyde, (C) benzene-1,3-dicarboxaldehyde, (D) 4,4-biphenyl dicarboxaldehyde, (E) 2,5-thiophene dicarboxaldehyde, (F) 3,4-dimethyl-2,5-pyrrole dicarboxaldehyde, or (G) benzene-1,3,5-tricarboxaldehyde.
Figure 8B:
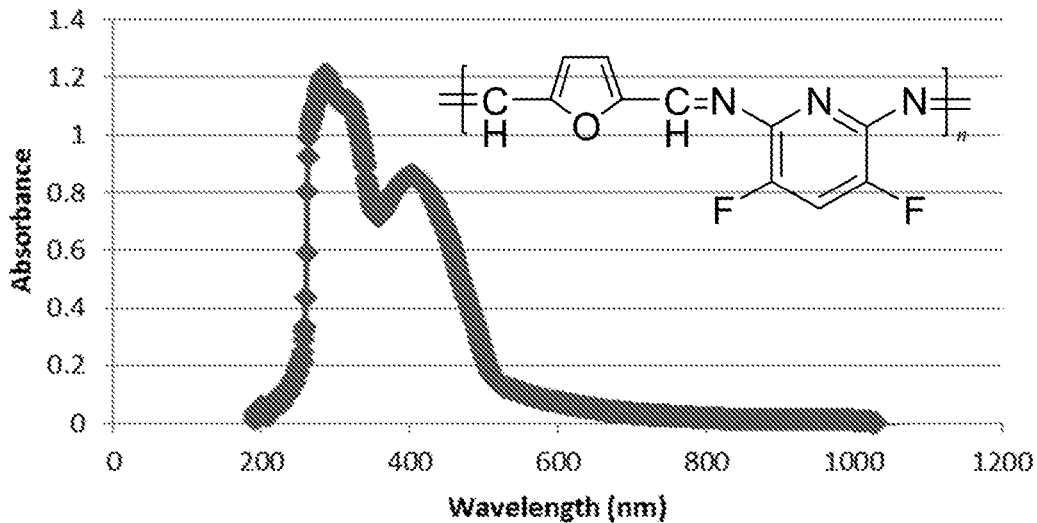
Figure 8C:
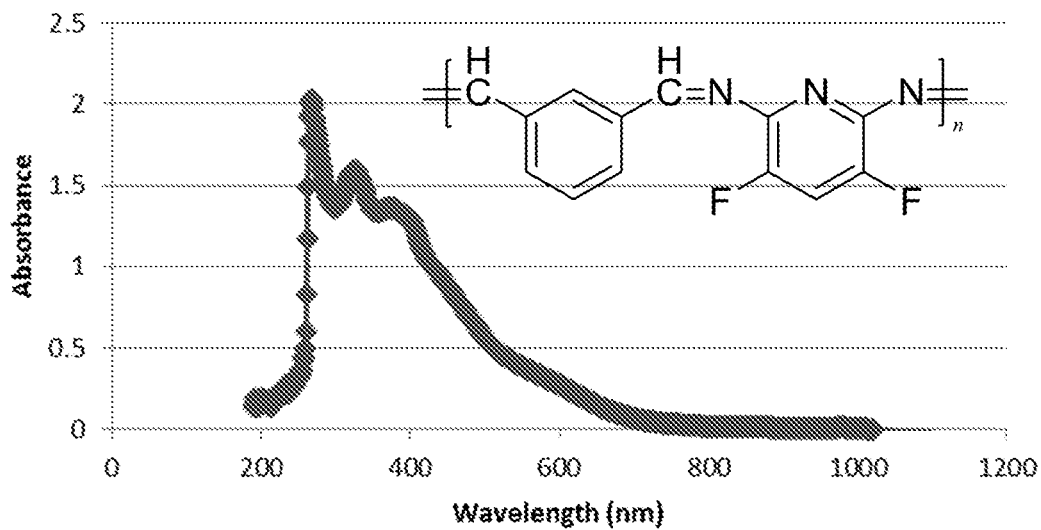
Figure 8D:
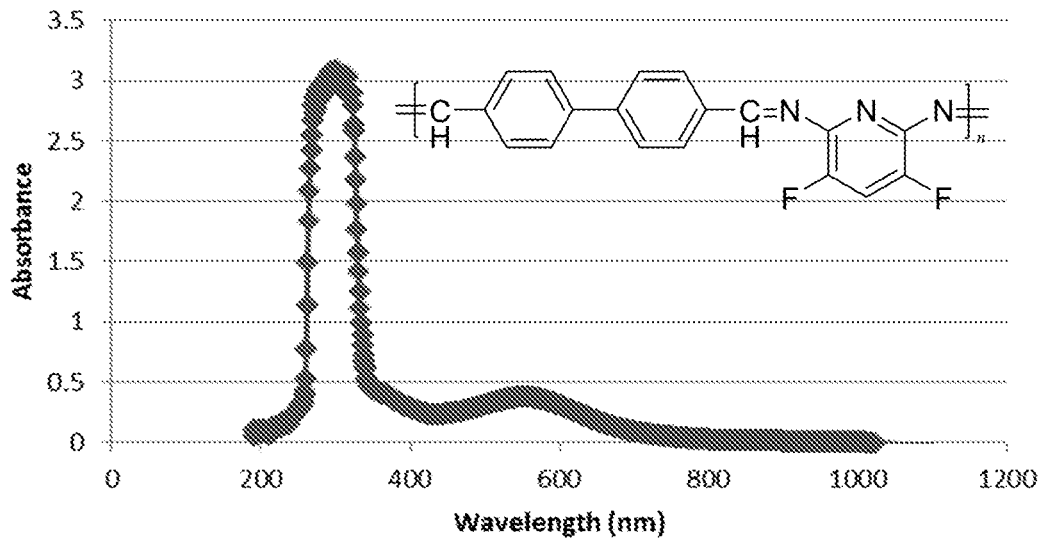
Figure 8E:
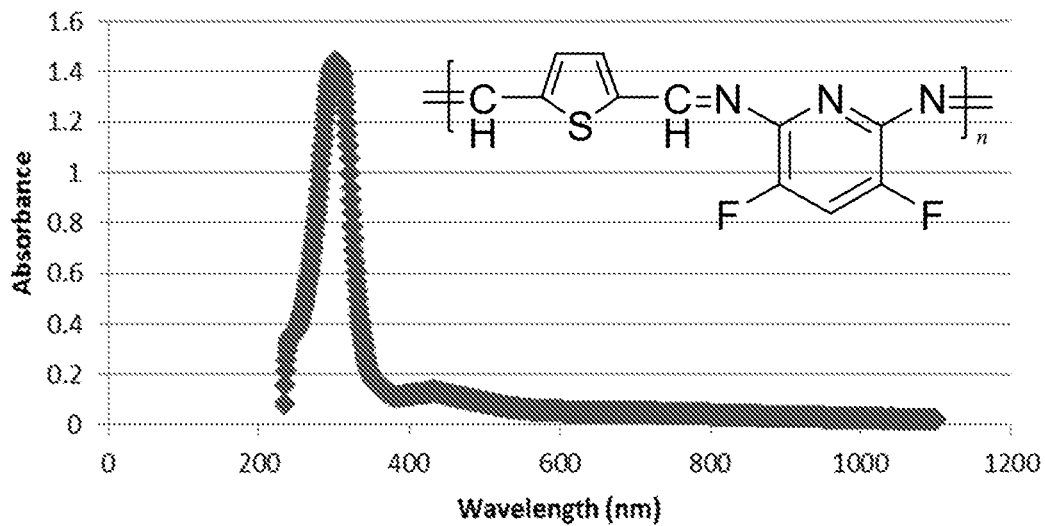
Figure 8F:
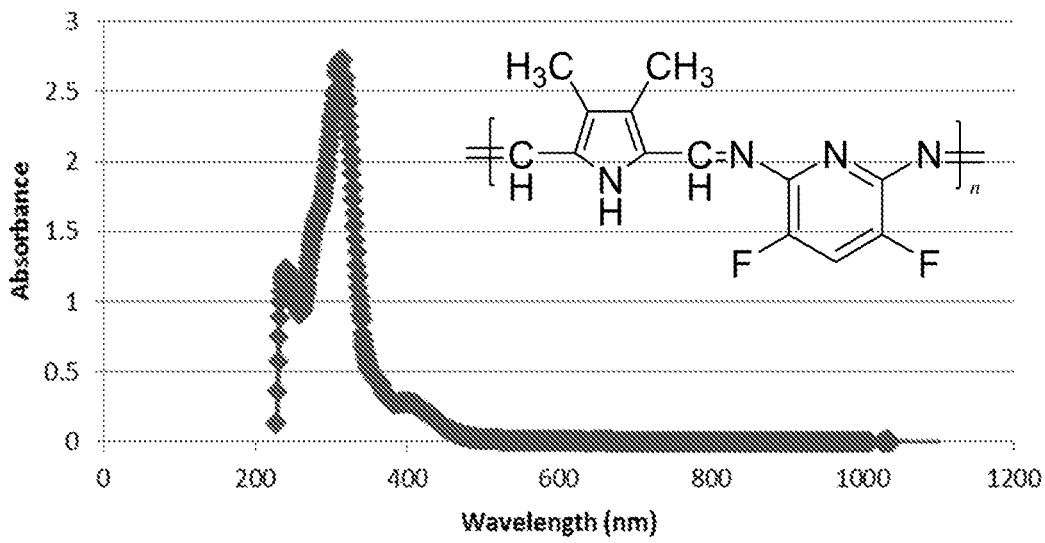
Figure 8G:
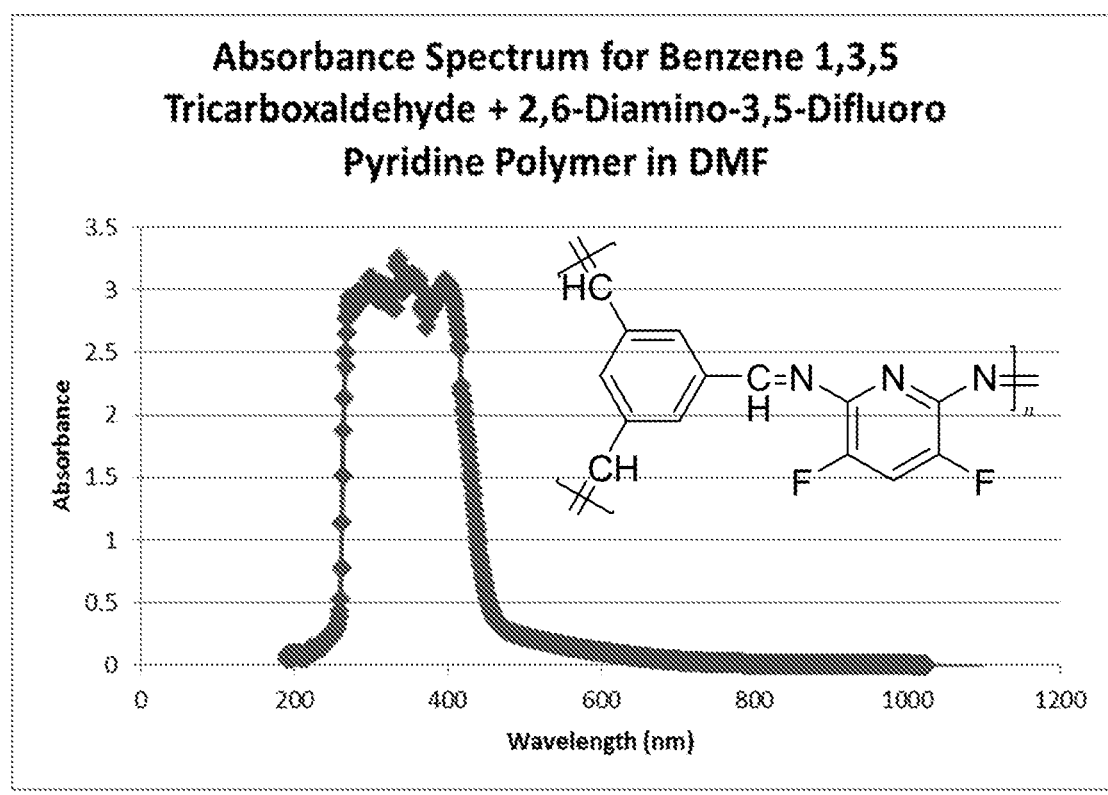
Figure 9A:
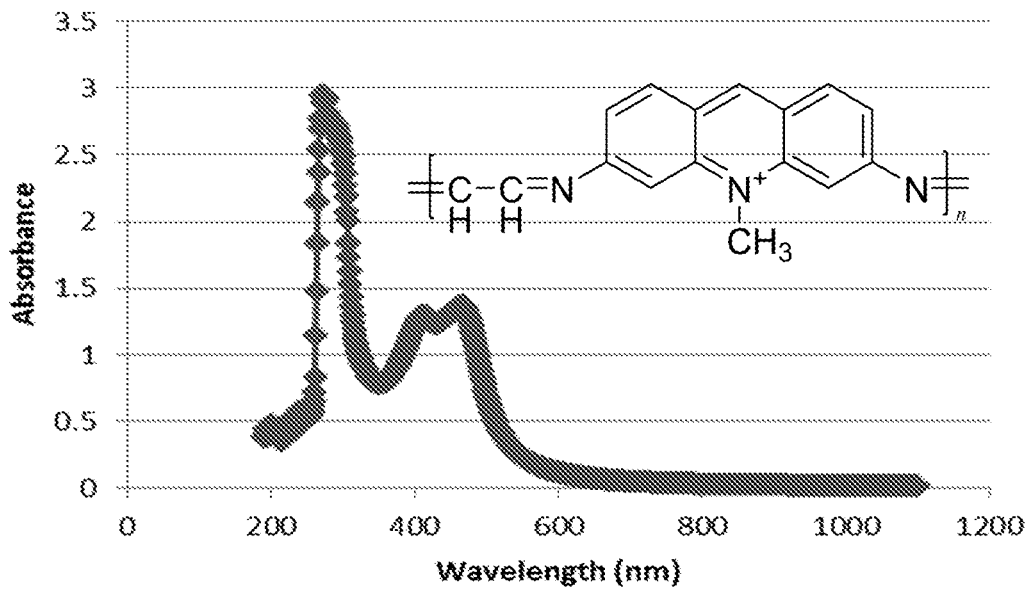
FIGS. 9A-H show absorbance spectra for polymers prepared by reacting acriflavin diamine with (A) glyoxol, (B) 2,5-furan dicarboxaldehyde, (C) benzene-1,3-dicarboxaldehyde, (D) 4,4-biphenyl dicarboxaldehyde, (E) 2,5-thiophene dicarboxaldehyde, (F) 3,4-dimethyl-2,5-pyrrole dicarboxaldehyde, (G) benzene-1,3,5-tricarboxaldehyde, or (H) 1,4-diacetyl benzene.
Figure 9B:
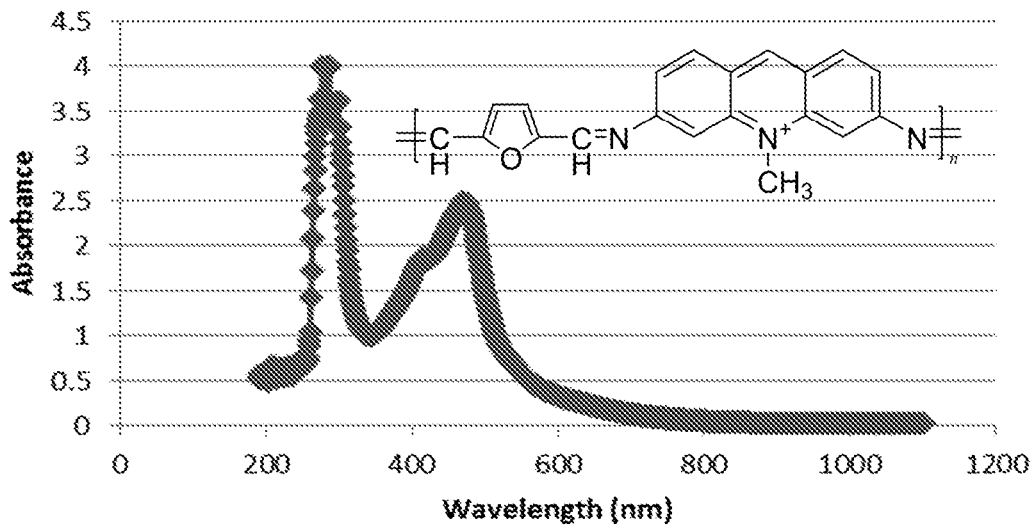
Figure 9C:
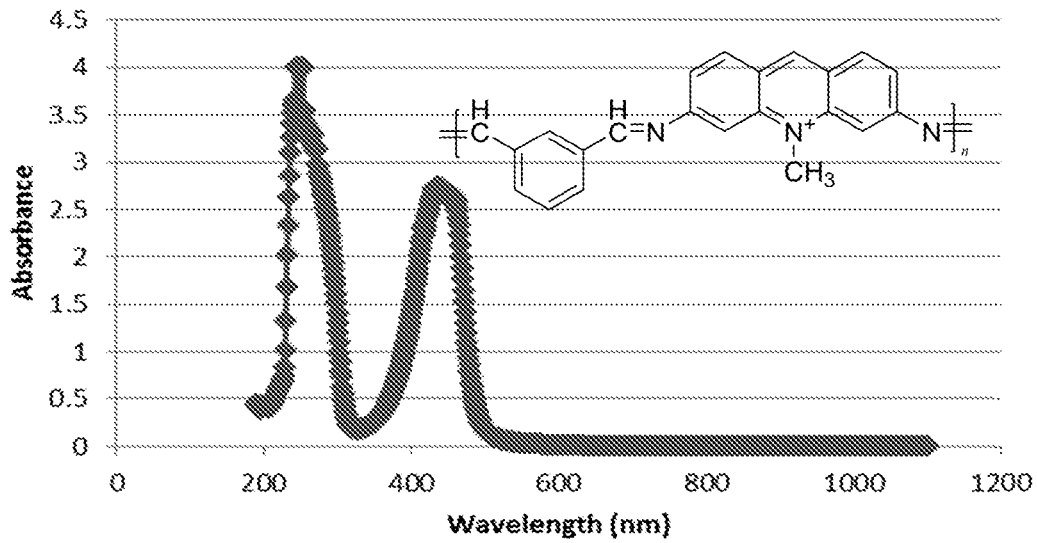
Figure 9D:
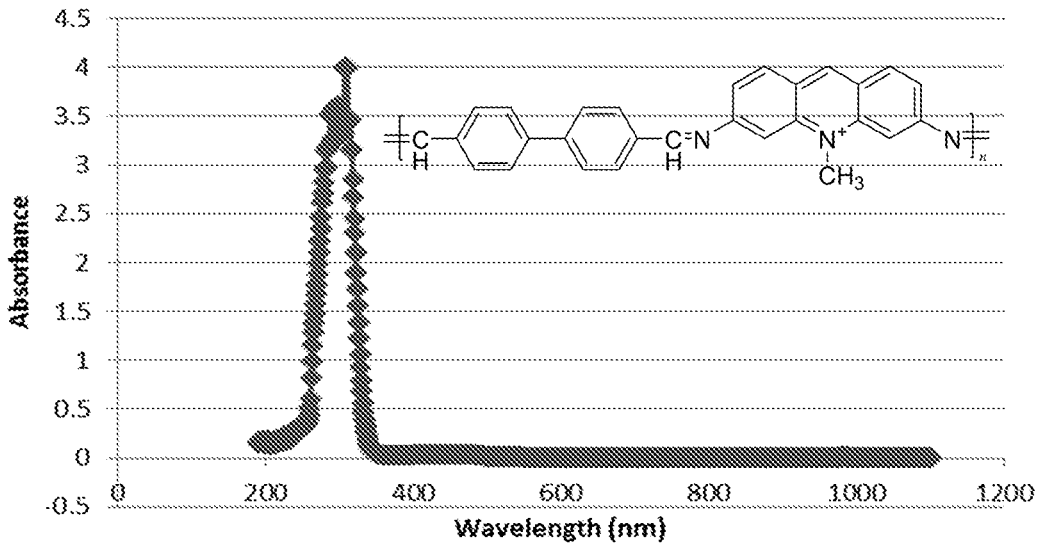
Figure 9E:
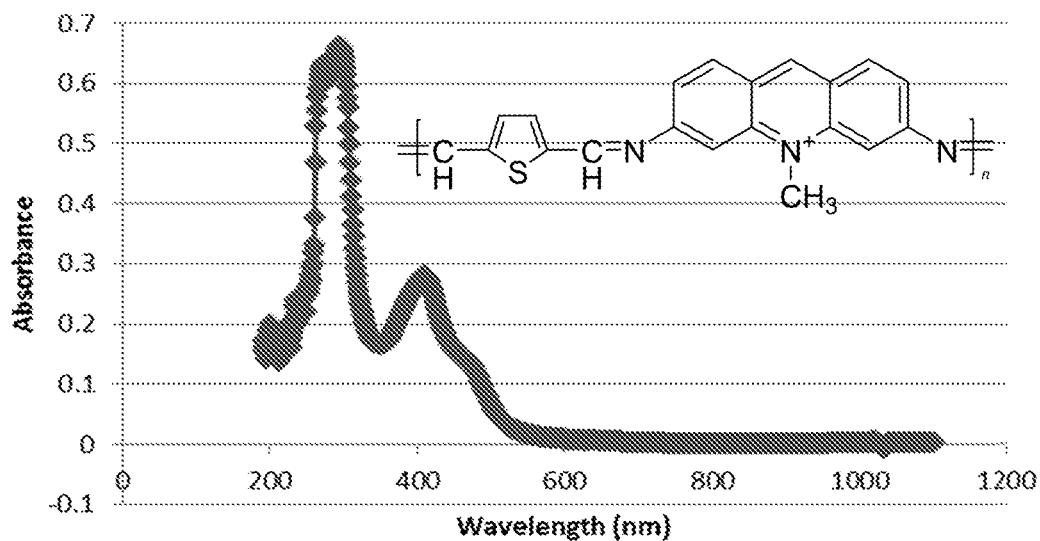
Figure 9F:
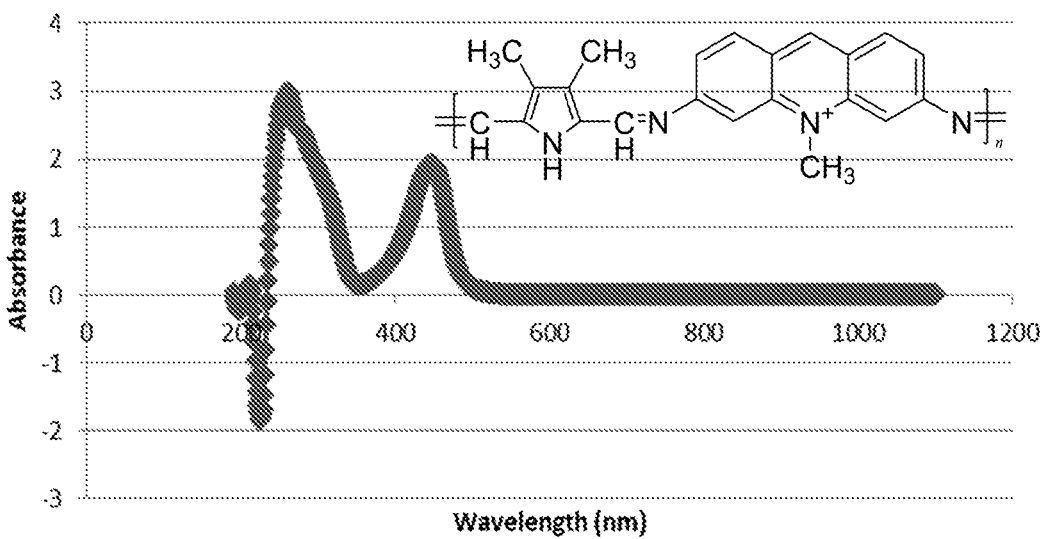
Figure 9G:
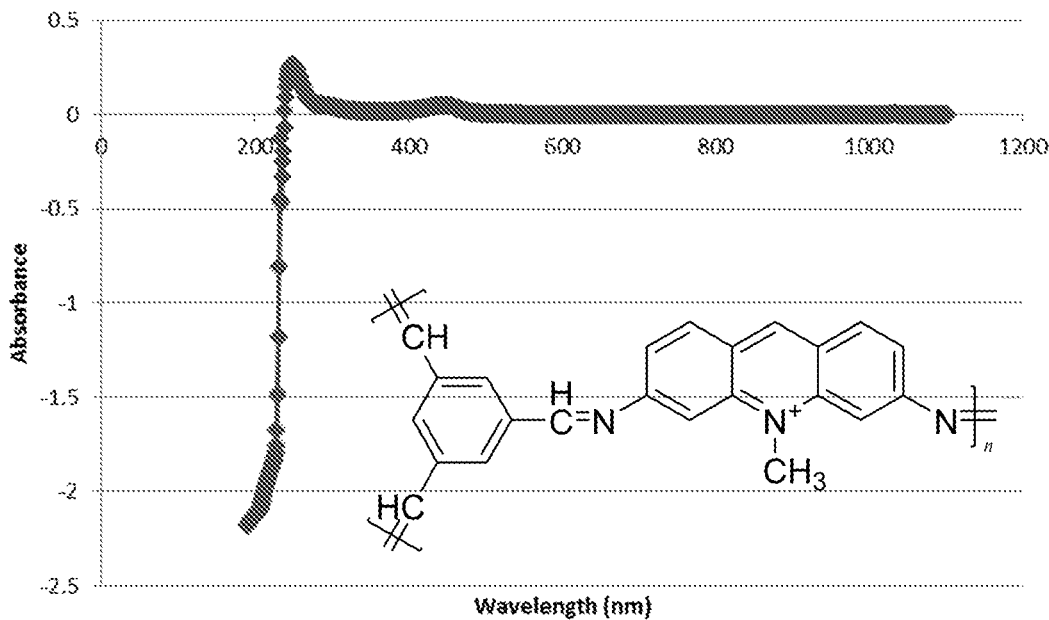
Figure 9H:
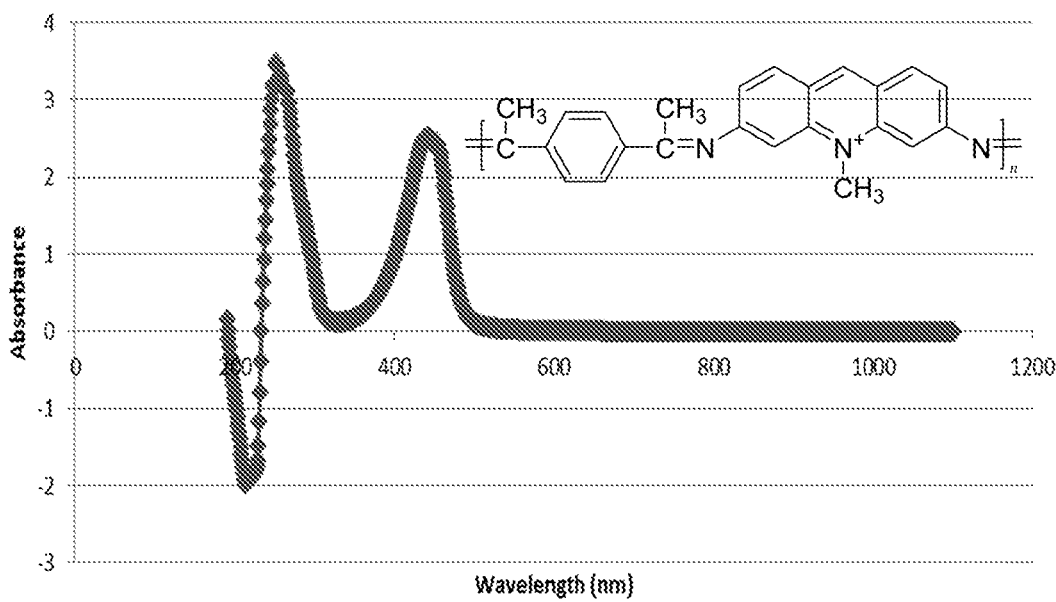
Figure 10A:
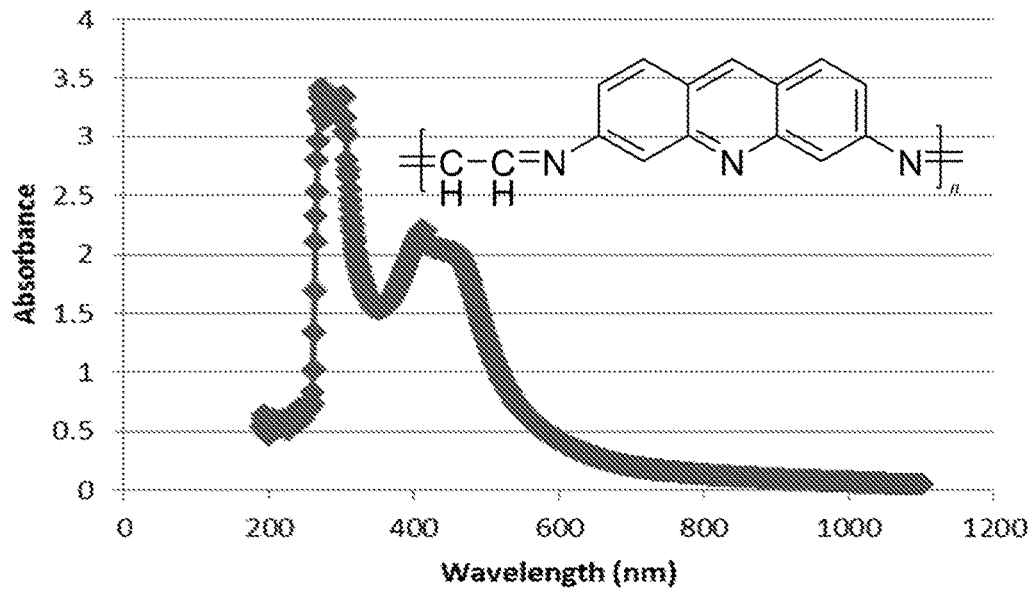
FIGS. 10A-H show absorbance spectra for polymers prepared by reacting 3,6 diamino acridine, polymerized in EtOH, with (A) glyoxol, (B) 2,5-furan dicarboxaldehyde, (C) benzene-1,3-dicarboxaldehyde, (D) 4,4-biphenyl dicarboxaldehyde, (E) 2,5-thiophene dicarboxaldehyde, (F) 3,4-dimethyl-2,5-pyrrole dicarboxaldehyde, (G) benzene-1,3,5-tricarboxaldehyde, or (H) 1,4-diacetyl benzene.
Figure 10B:
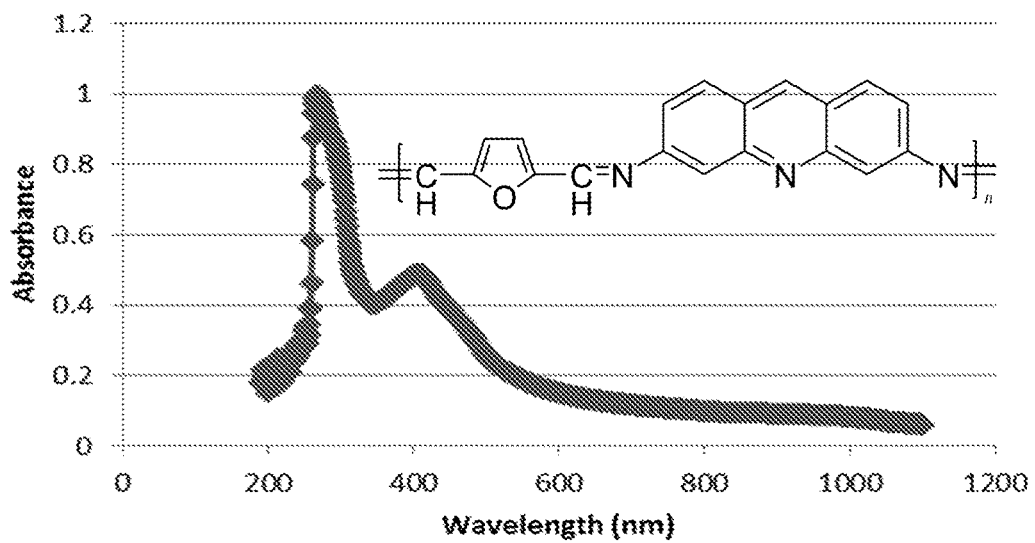
Figure 10C:
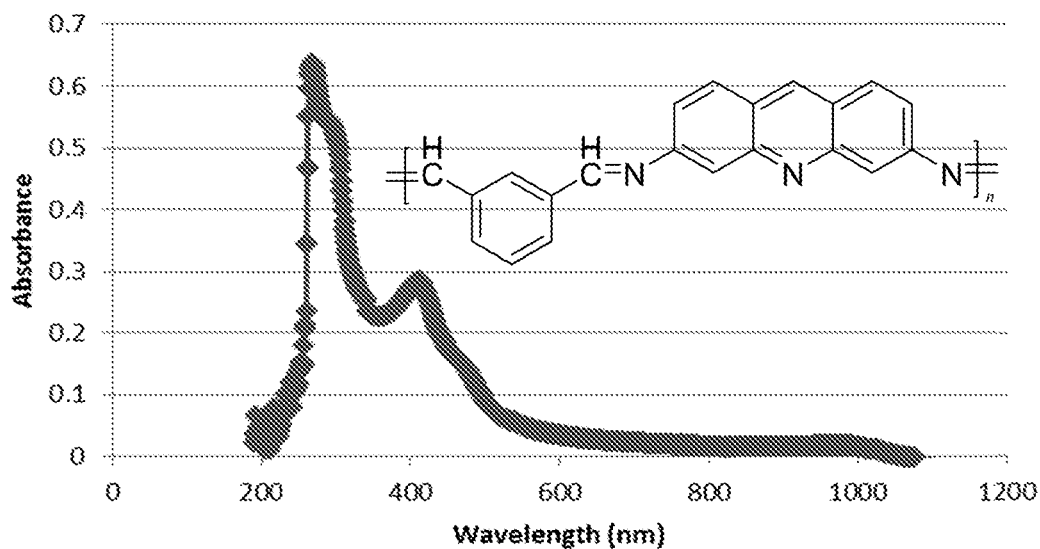
Figure 10D:
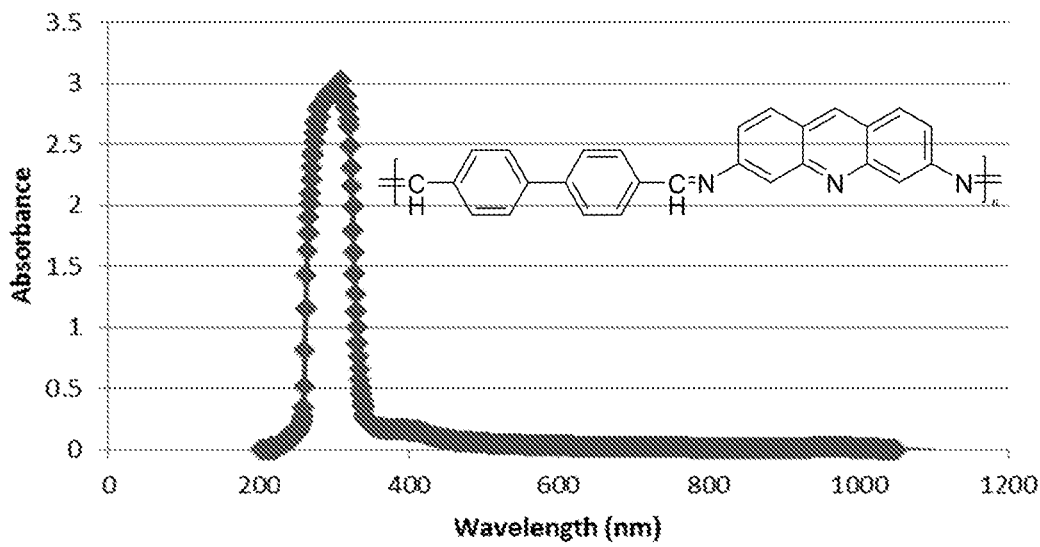
Figure 10E:
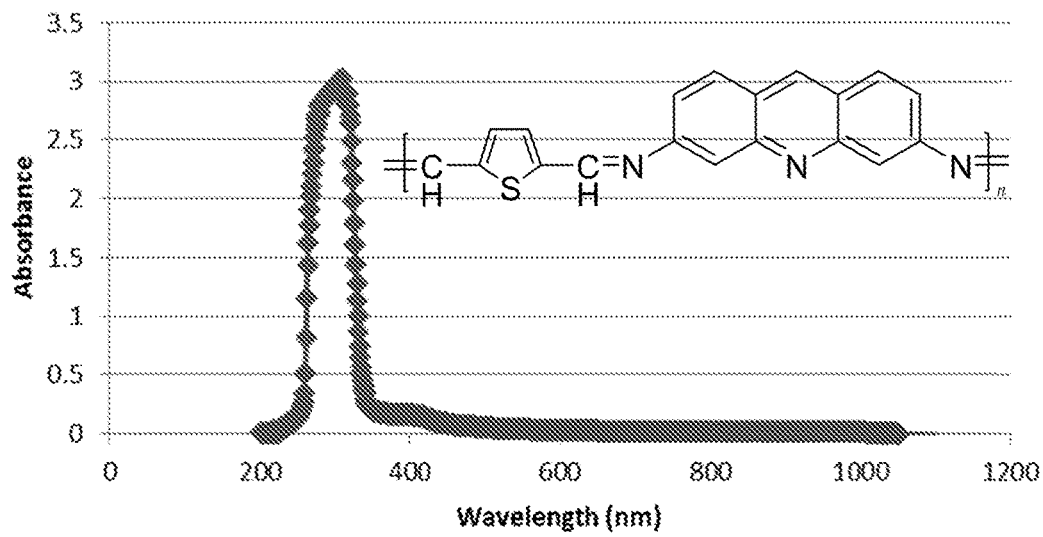
Figure 10F:
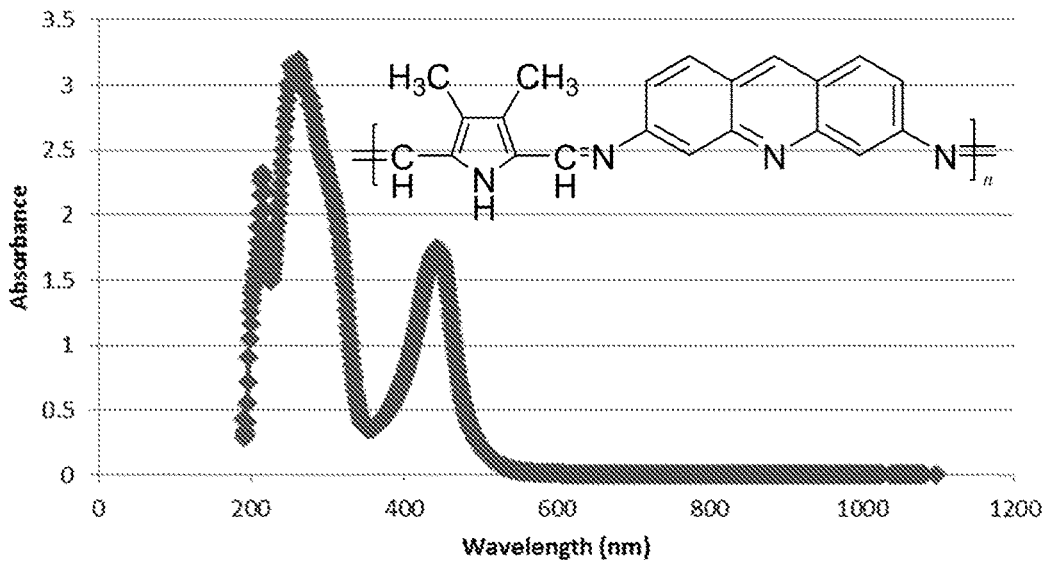
Figure 10G:
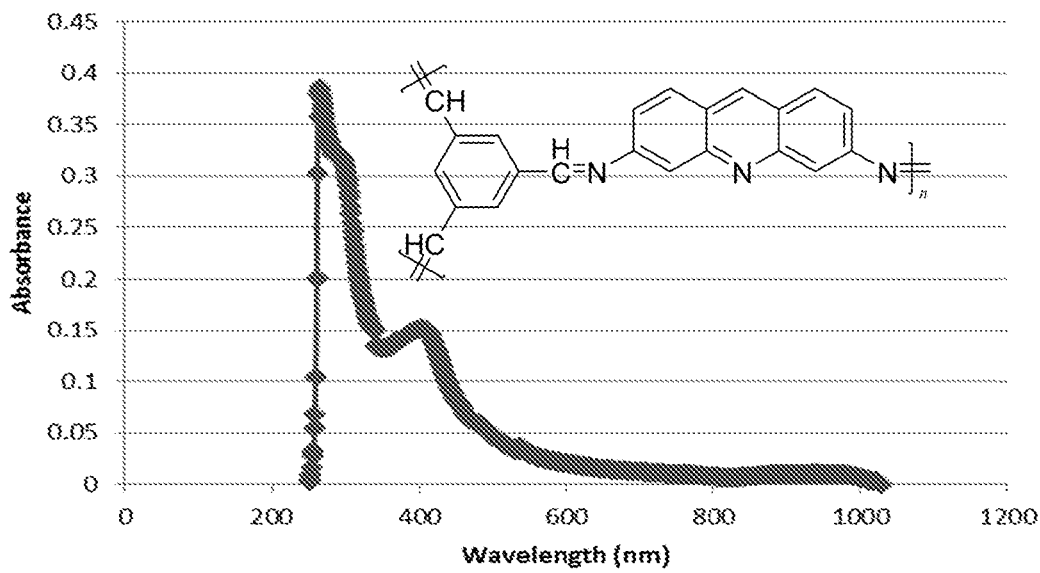
Figure 10H:
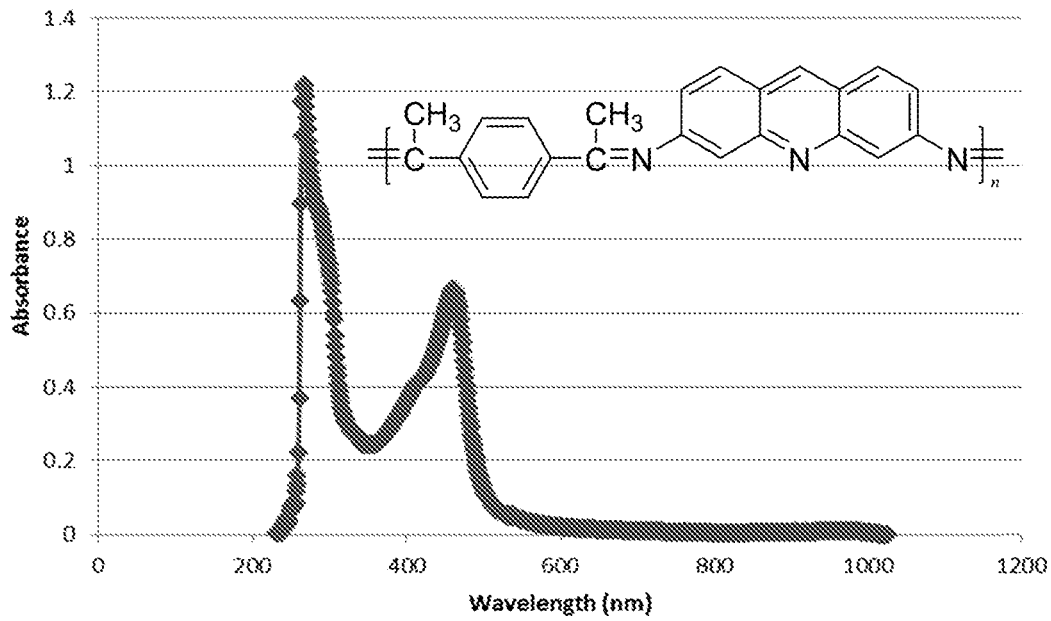
Figure 11A:
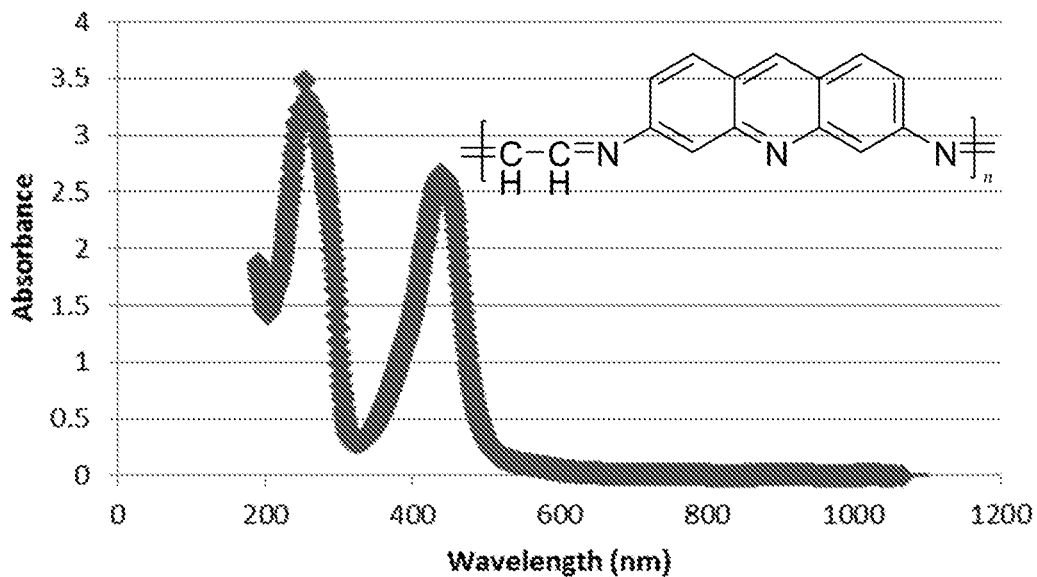
FIGS. 11A-H show absorbance spectra for polymers prepared by reacting 3,6 diamino acridine, polymerized in $H_2O$, with (A) glyoxol, (B) 2,5-furan dicarboxaldehyde, (C) benzene-1,3-dicarboxaldehyde, (D) 4,4-biphenyl dicarboxaldehyde, (E) 2,5-thiophene dicarboxaldehyde, (F) 3,4-dimethyl-2,5-pyrrole dicarboxaldehyde, (G) benzene-1,3,5-tricarboxaldehyde, or (H) 1,4-diacetyl benzene.
Figure 11B:
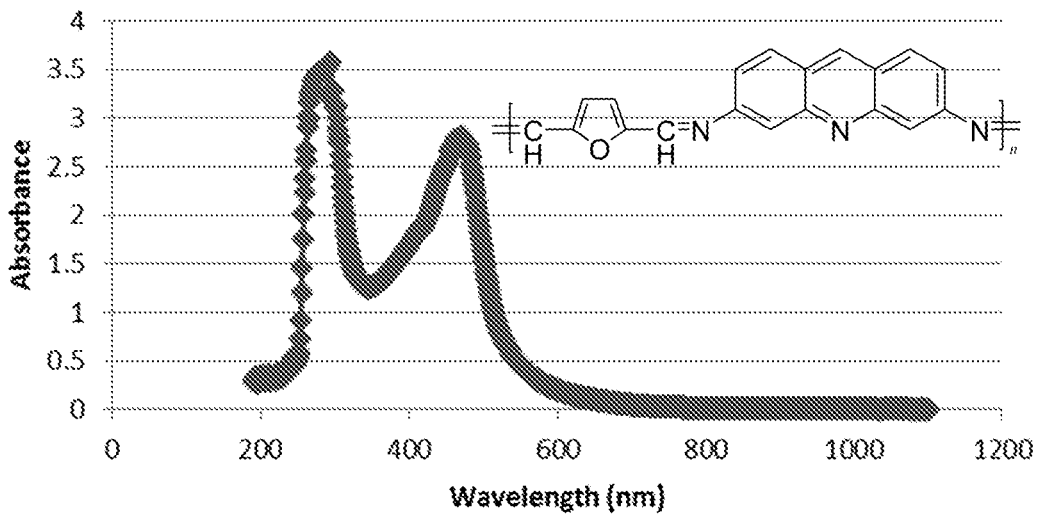
Figure 11C:
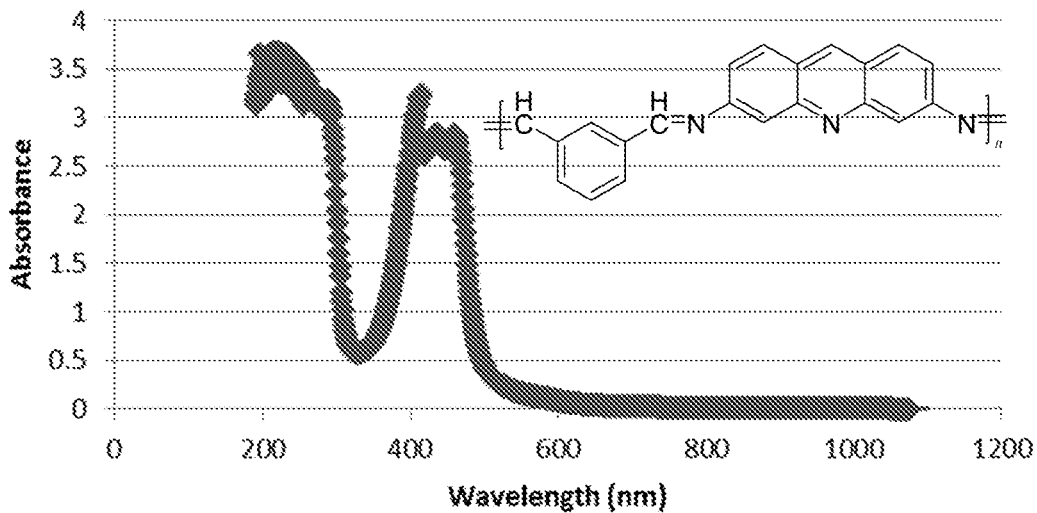
Figure 11D:
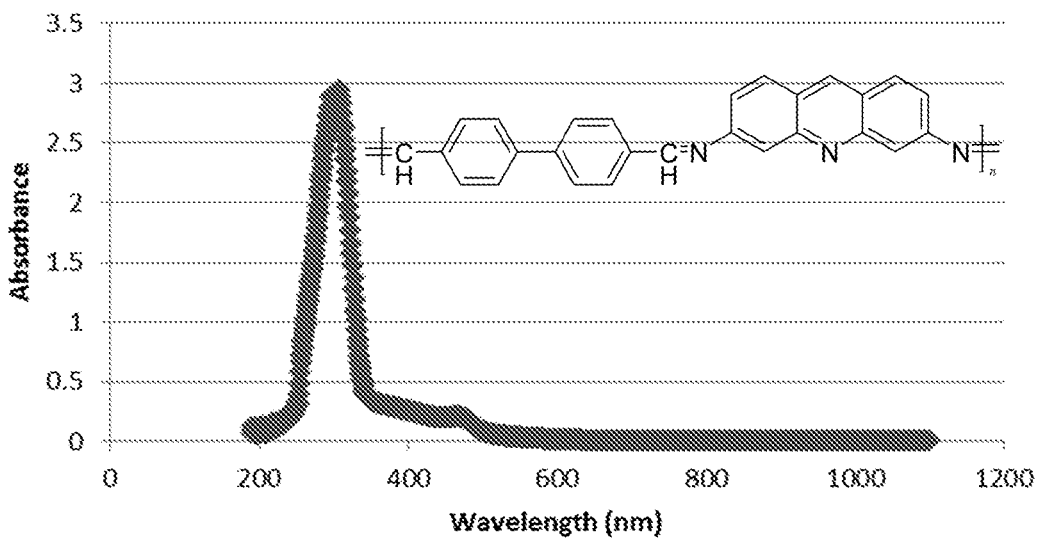
Figure 11E:
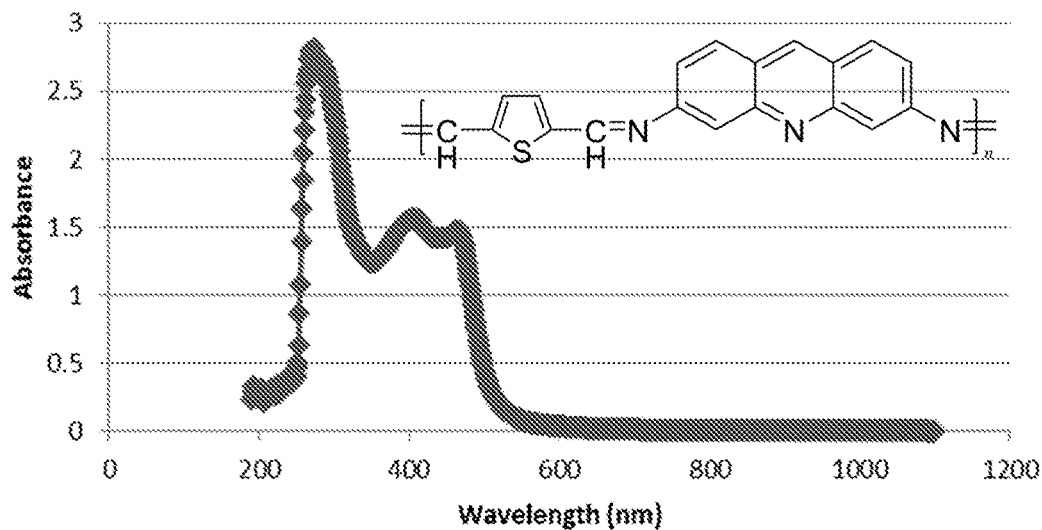
Figure 11F:
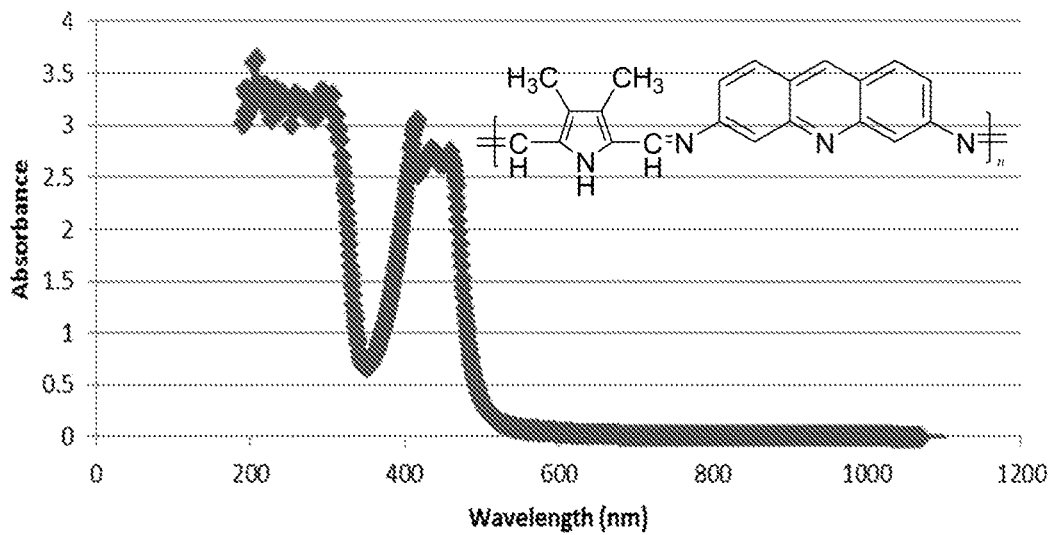
Figure 11G:
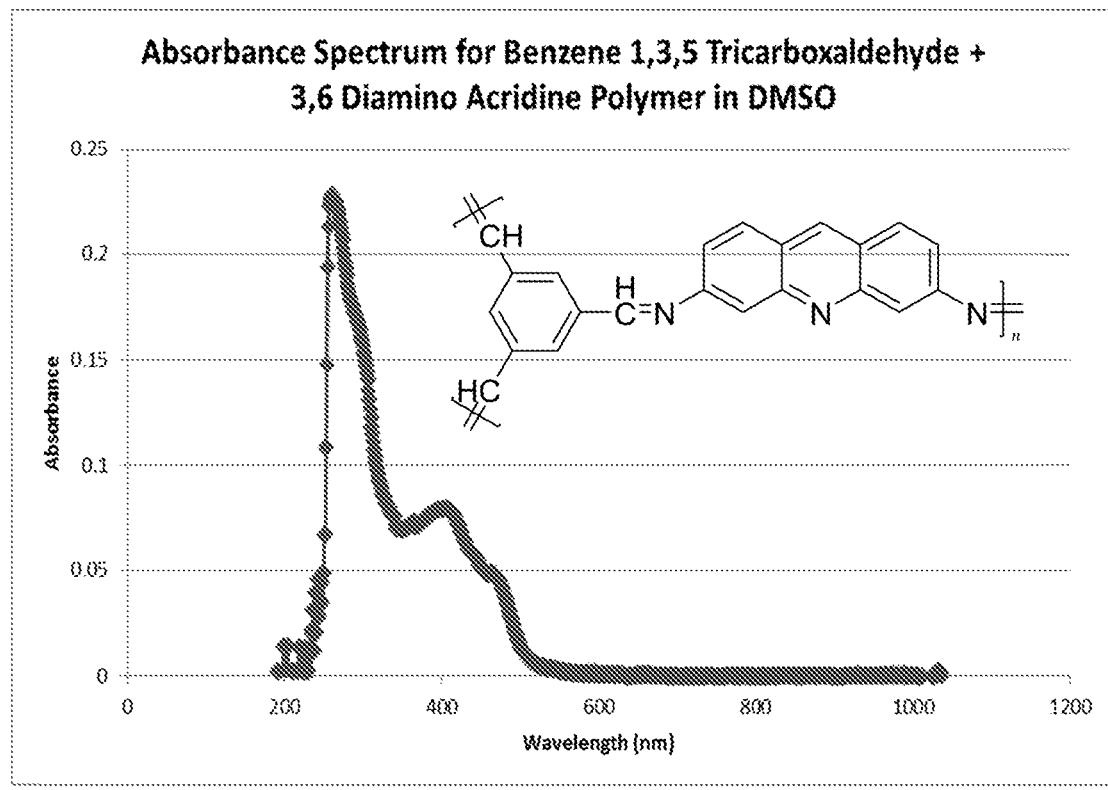
Figure 11H:
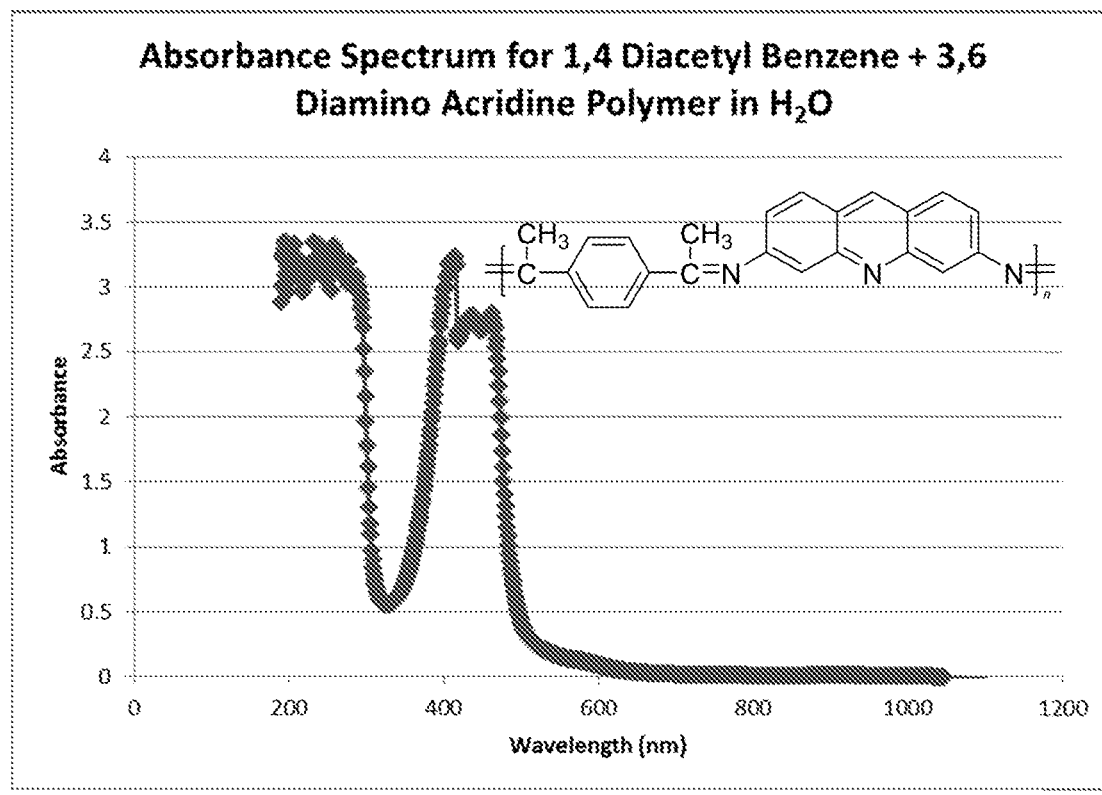
Figure 12A:
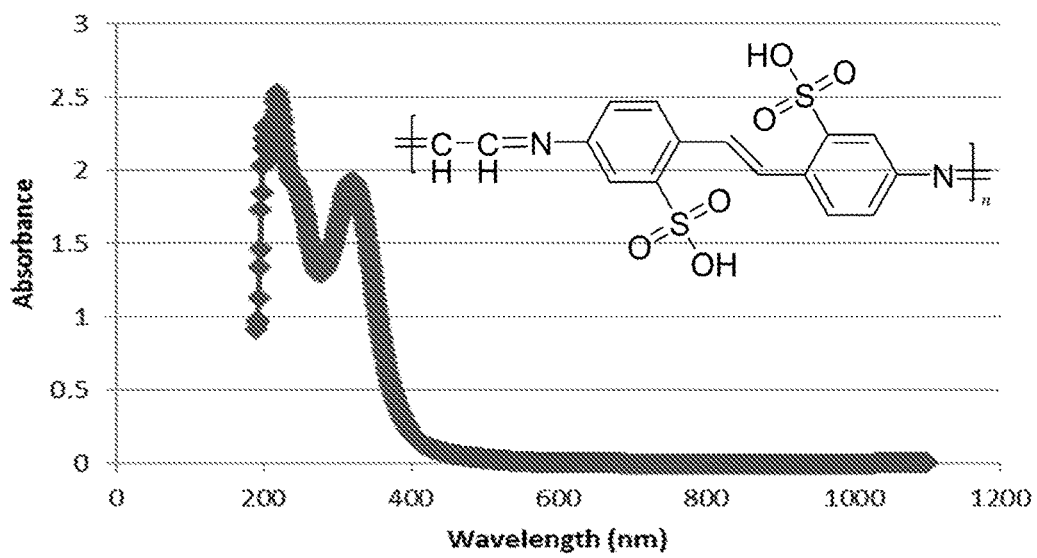
FIGS. 12A-G show absorbance spectra for polymers prepared by reacting 4,4'-diamino-2,2'-stilbenedisulfonic acid with (A) glyoxol, (B) 2,5-furan dicarboxaldehyde, (C) benzene-1,3-dicarboxaldehyde, (D) 4,4-biphenyl dicarboxaldehyde, (E) 2,5-thiophene dicarboxaldehyde, (F) 3,4-dimethyl-2,5-pyrrole dicarboxaldehyde, or (G) benzene-1,3,5-tricarboxaldehyde.
Figure 12B:
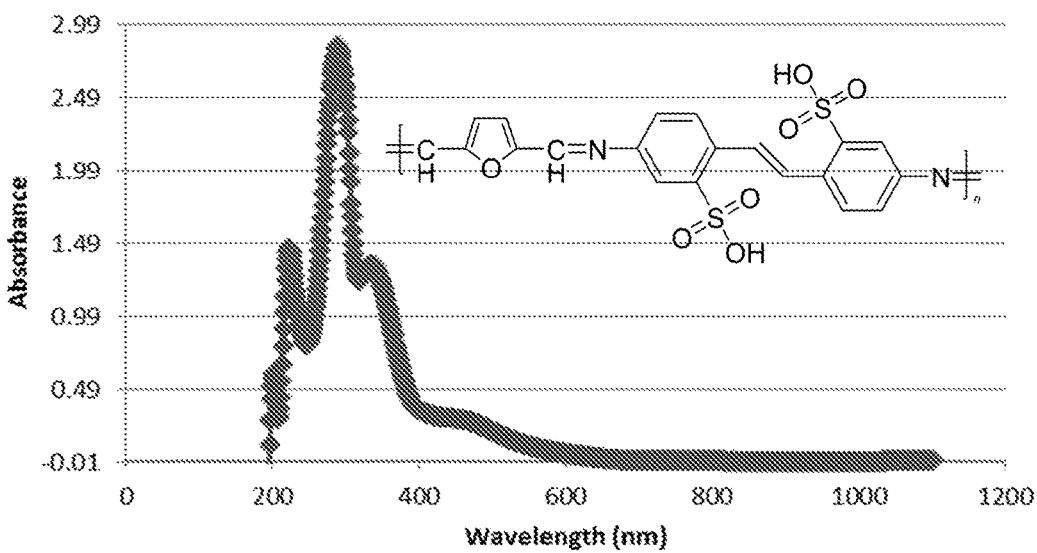
Figure 12C:
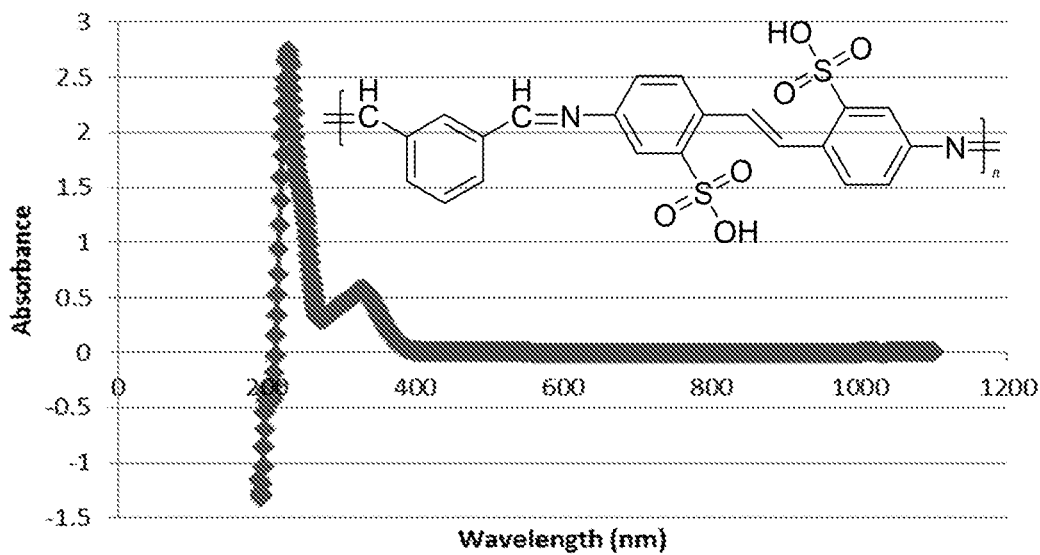
Figure 12D:
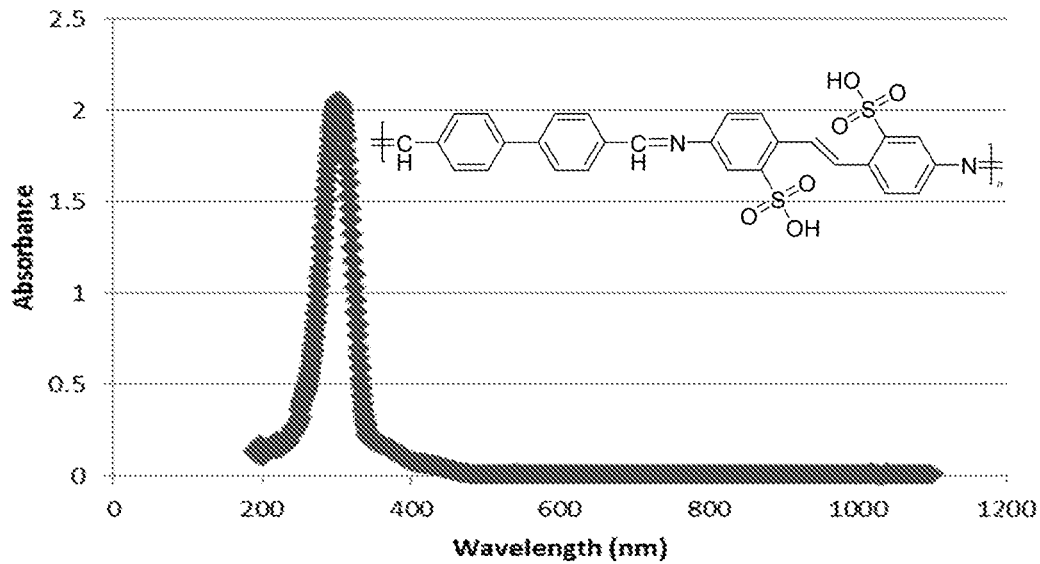
Figure 12E:
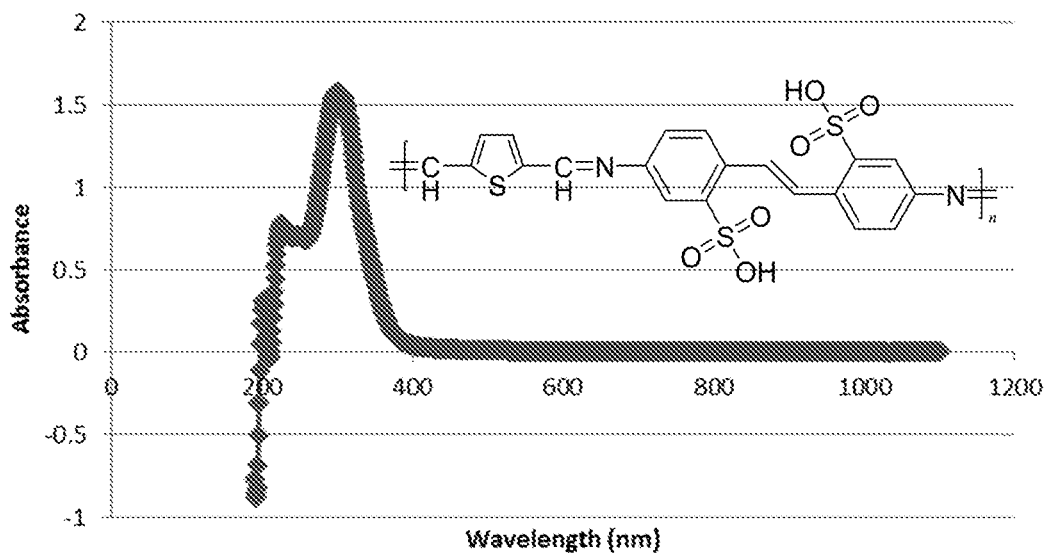
Figure 12F:
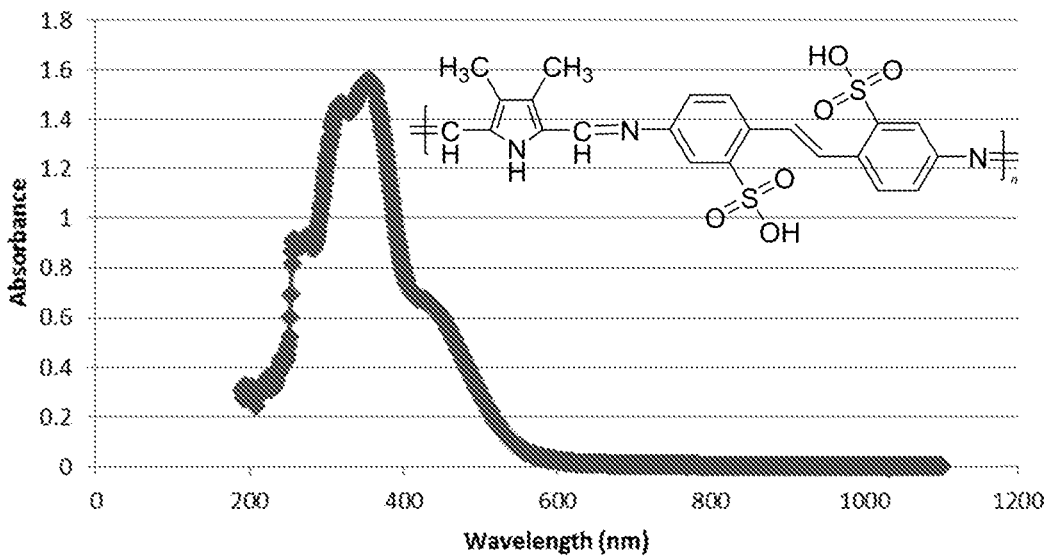
Figure 12G:
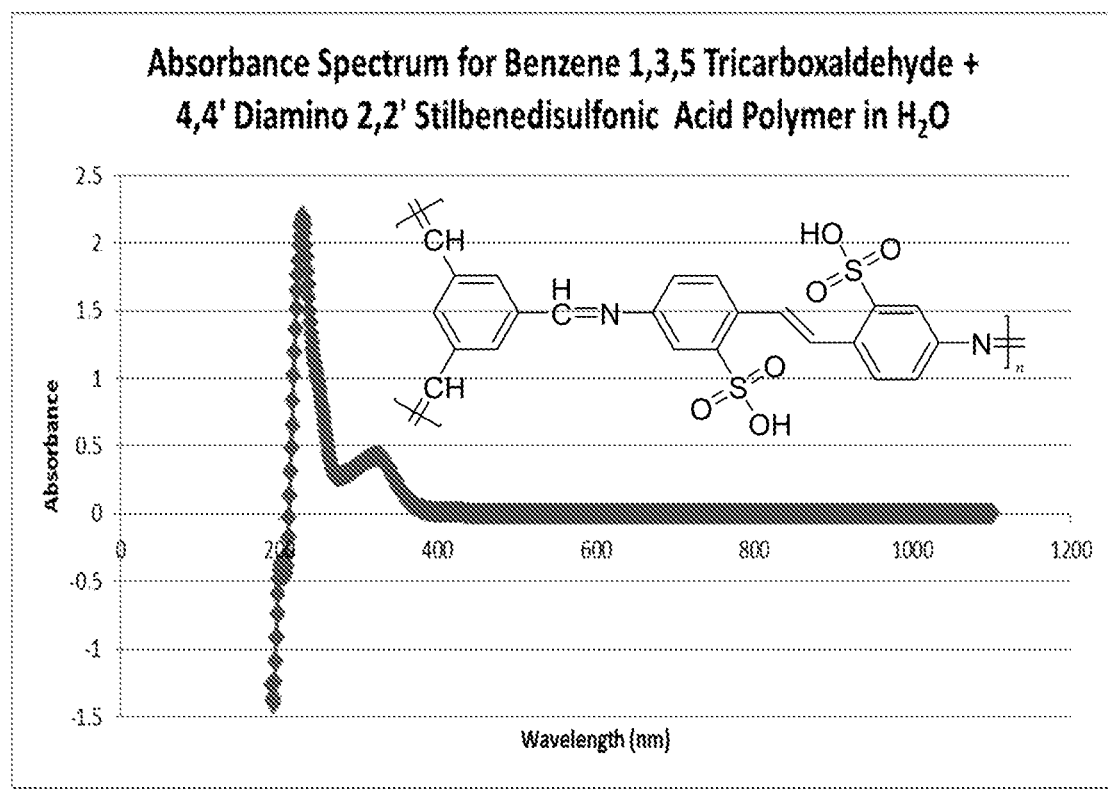
Figure 13A:
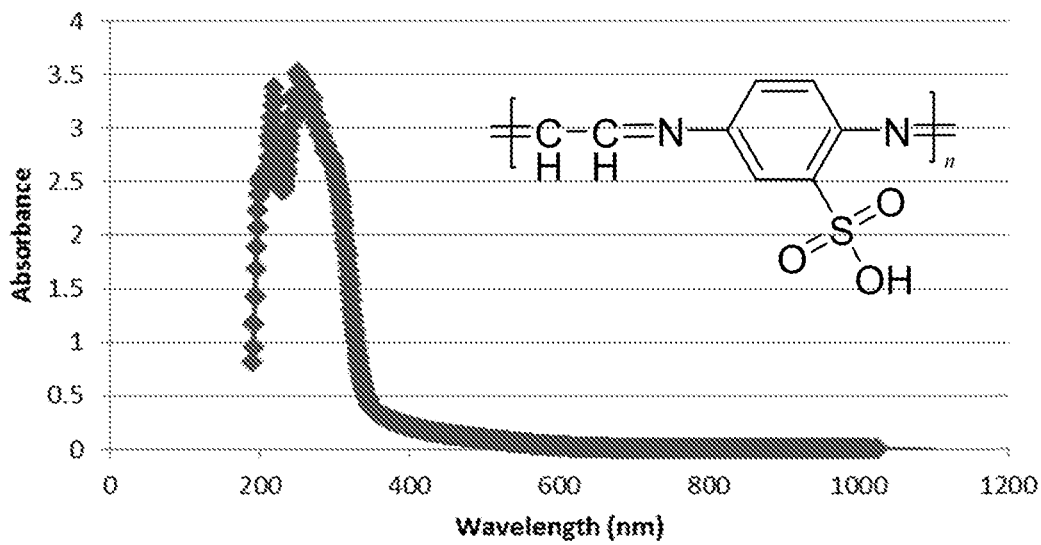
FIGS. 13A-H show absorbance spectra for polymers prepared by reacting 2,5-diaminobenzenesulfonic acid with (A) glyoxol, (B) 2,5-furan dicarboxaldehyde, (C) benzene-1,3-dicarboxaldehyde, (D) 4,4-biphenyl dicarboxaldehyde, (E) 2,5-thiophene dicarboxaldehyde, (F) 3,4-dimethyl-2,5-pyrrole dicarboxaldehyde, (G) benzene-1,3,5-tricarboxaldehyde, or (H) 1,4-diacetyl benzene.
Figure 13B:
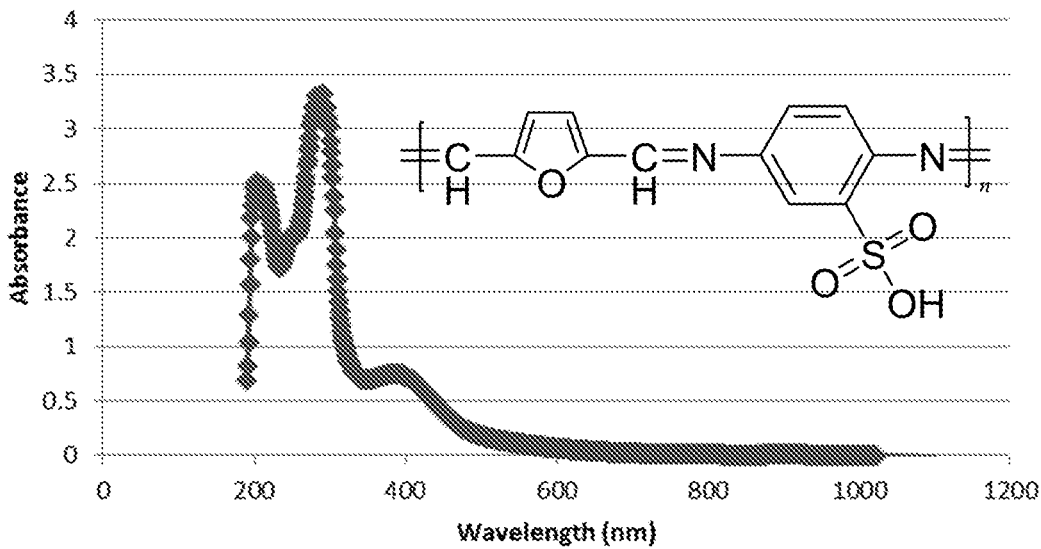
Figure 13C:
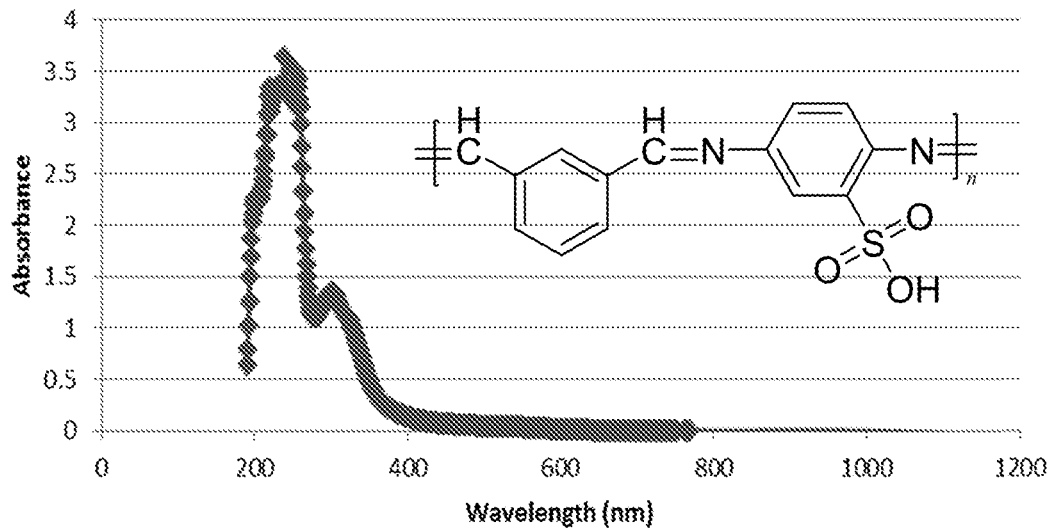
Figure 13D:
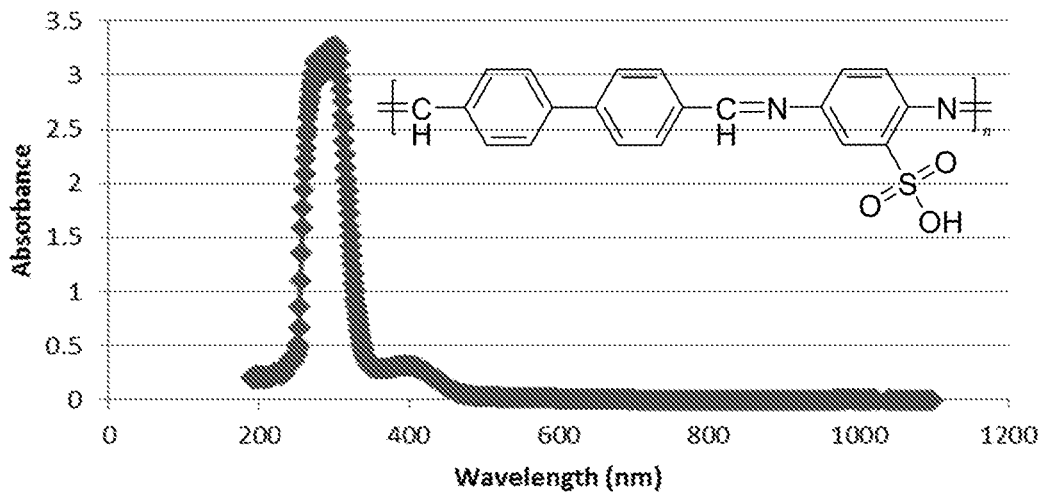
Figure 13E:
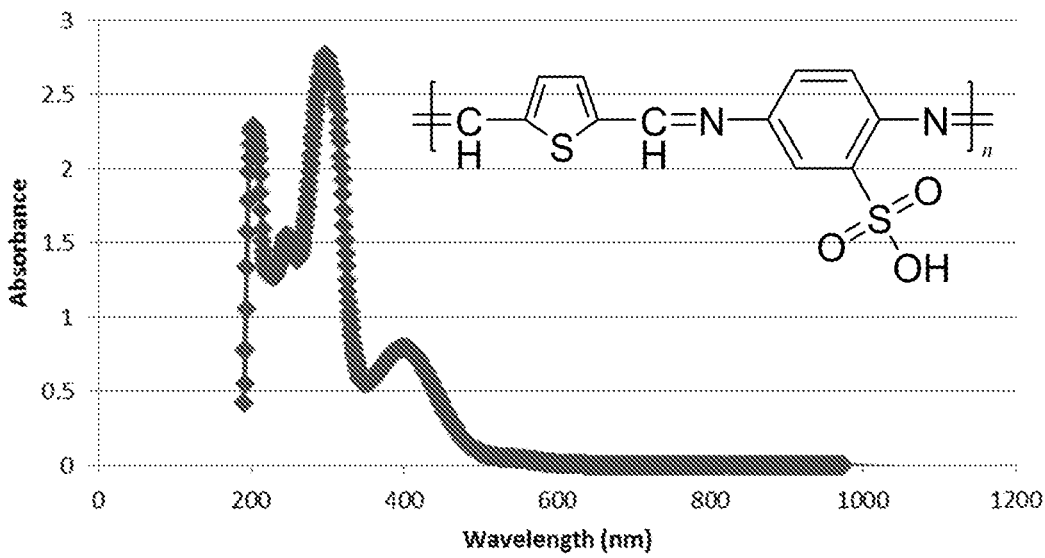
Figure 13F:
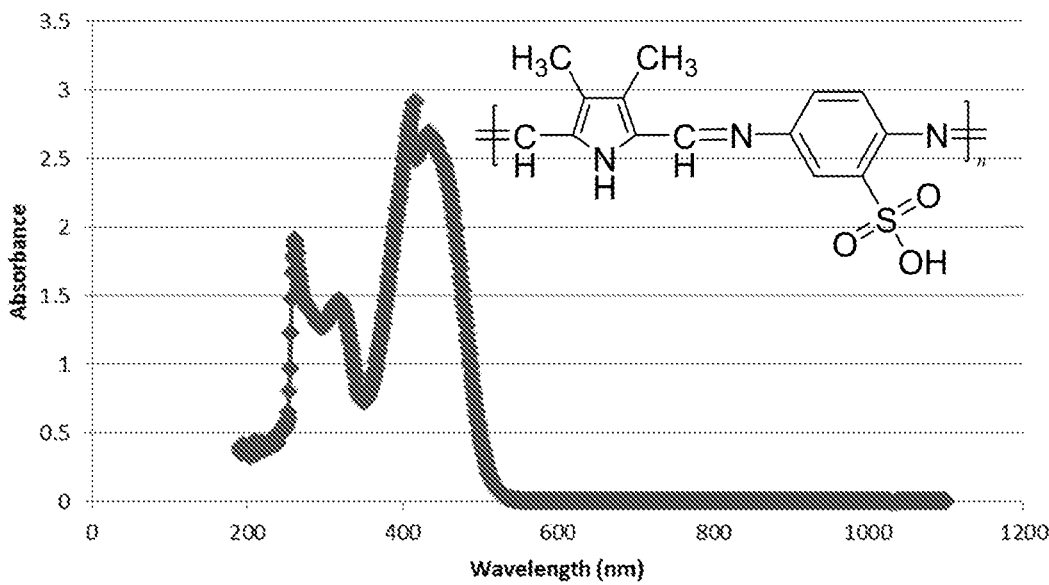
Figure 13G:
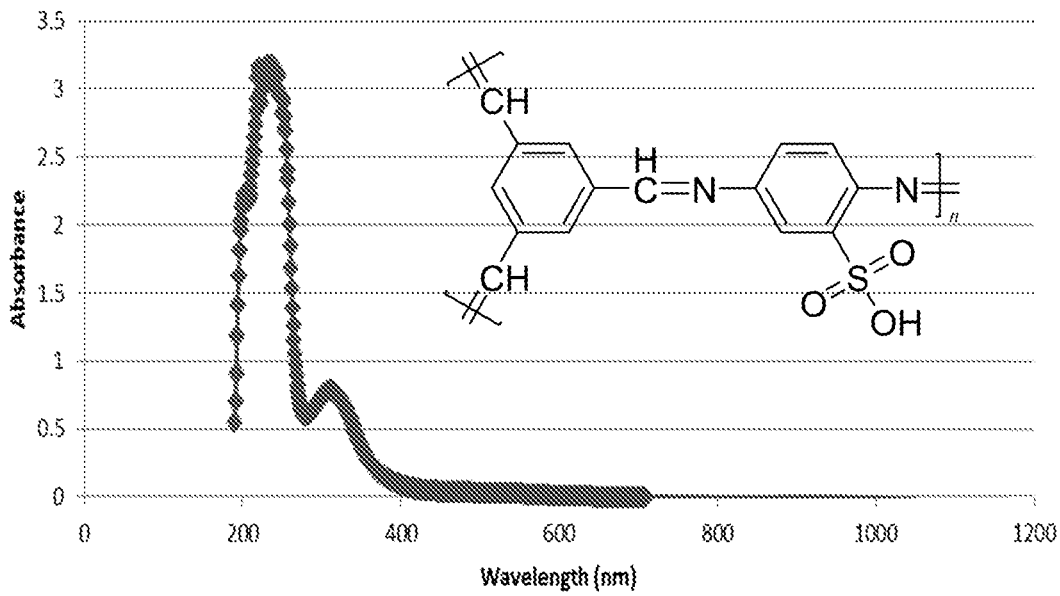
Figure 13H:
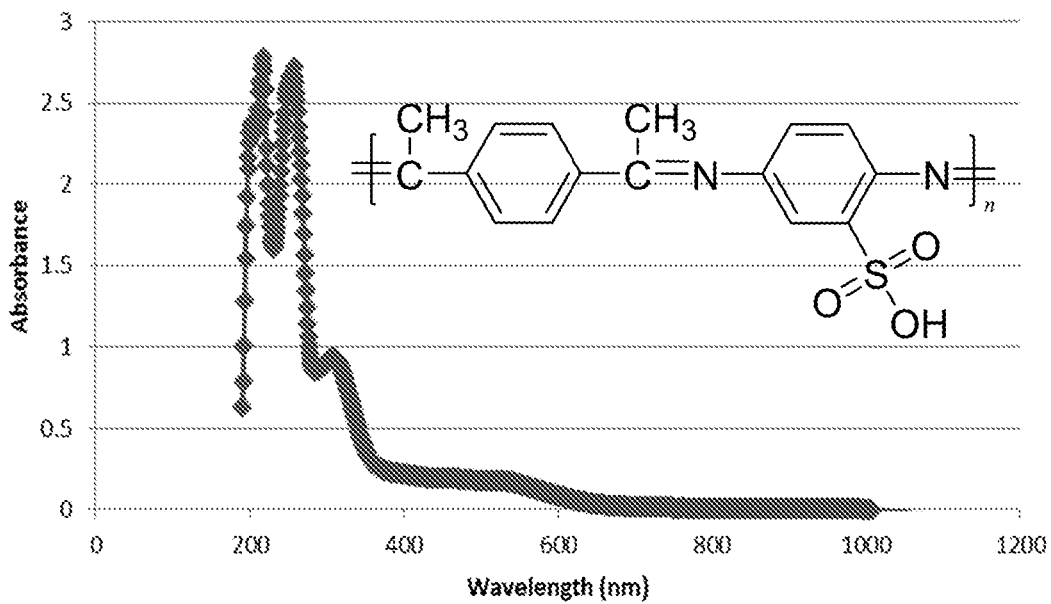
Figure 14A:
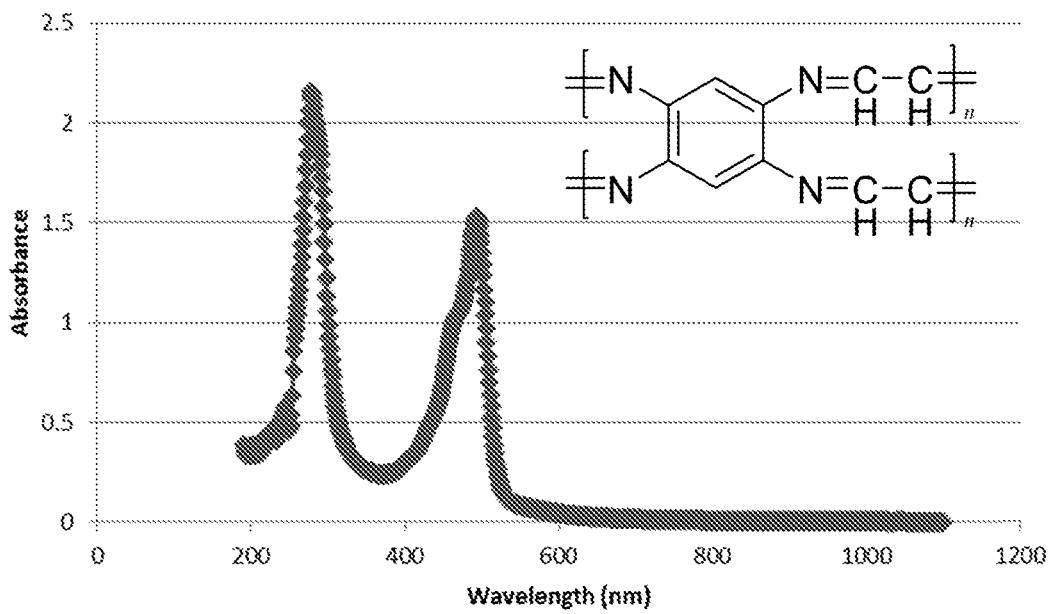
FIGS. 14A-H show absorbance spectra for polymers prepared by reacting 1,2,4,5-benzenetetramine, pH 5, with (A) glyoxol, (B) 2,5-furan dicarboxaldehyde, (C) benzene-1,3-dicarboxaldehyde, (D) 4,4-biphenyl dicarboxaldehyde, (E) 2,5-thiophene dicarboxaldehyde, (F) 3,4-dimethyl-2,5-pyrrole dicarboxaldehyde, (G) benzene-1,3,5-tricarboxaldehyde, or (H) 1,4-diacetyl benzene.
Figure 14B:
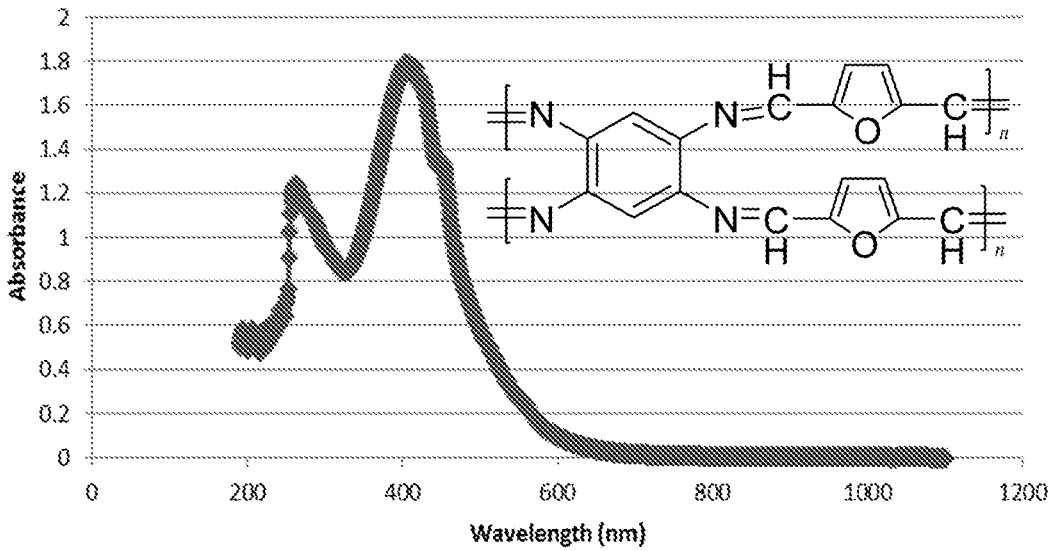
Figure 14C:
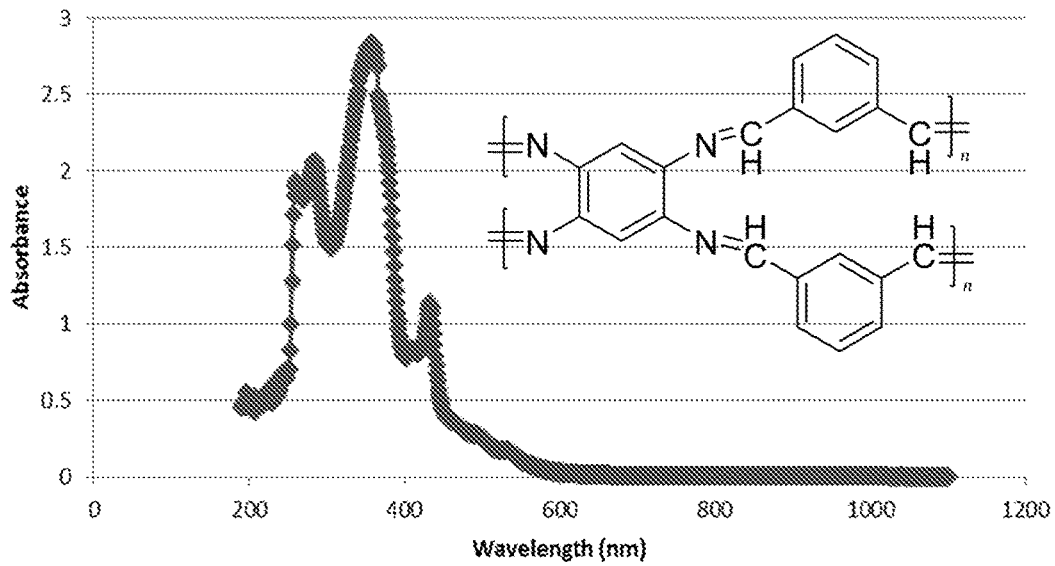
Figure 14D:
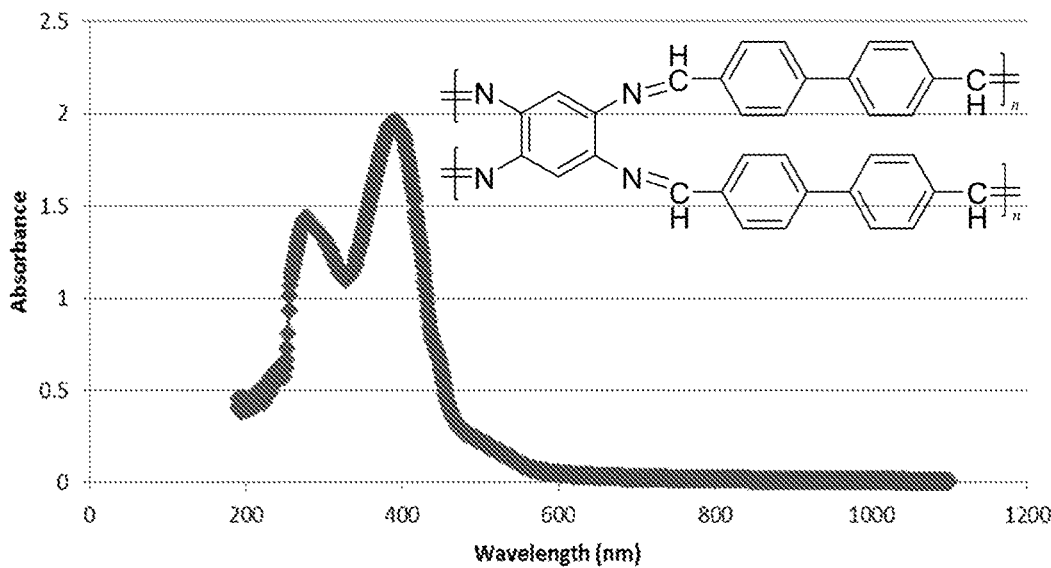
Figure 14E:
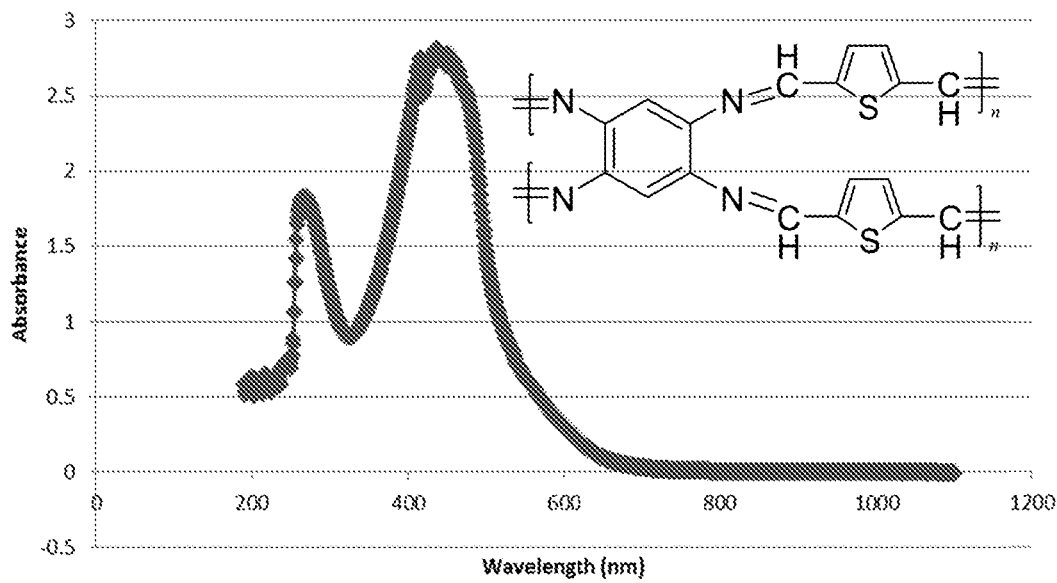
Figure 14F:
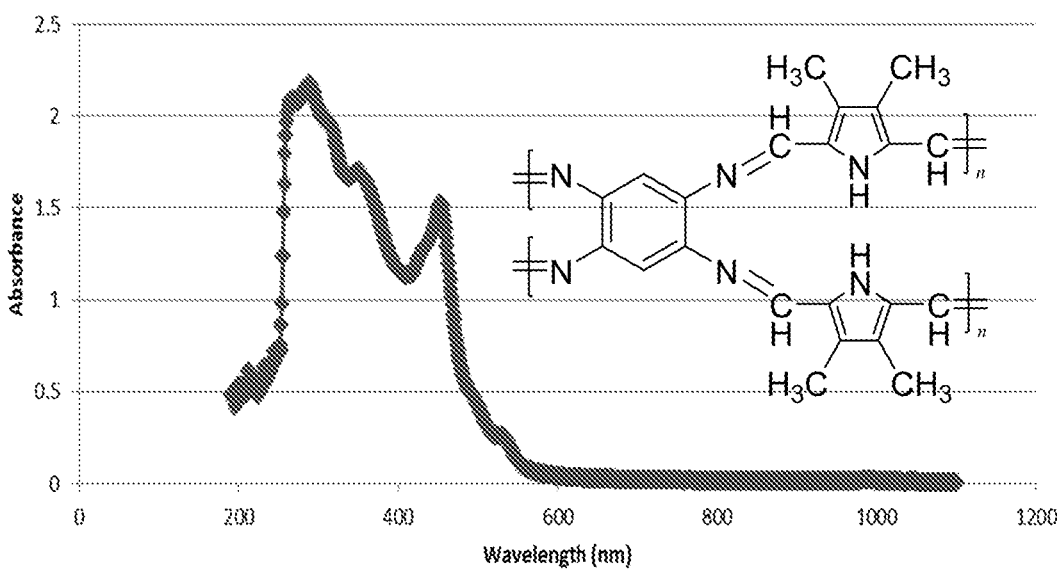
Figure 14G:
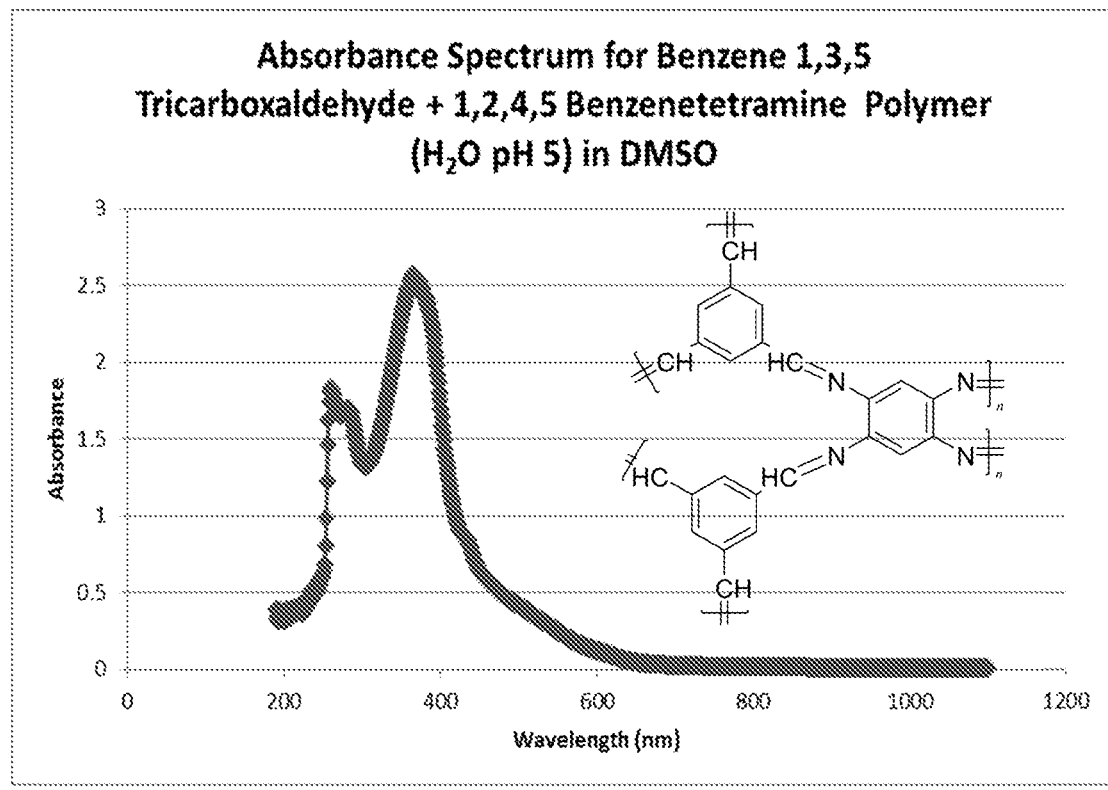
Figure 14H:
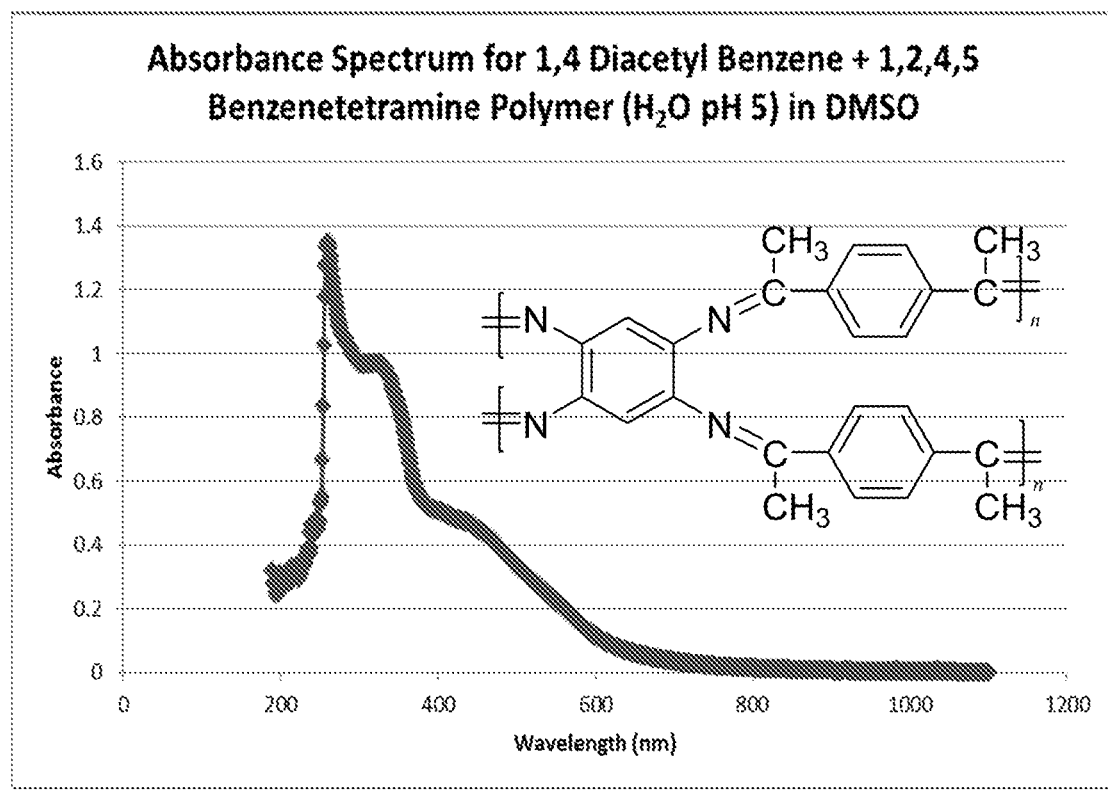
Figure 15A:
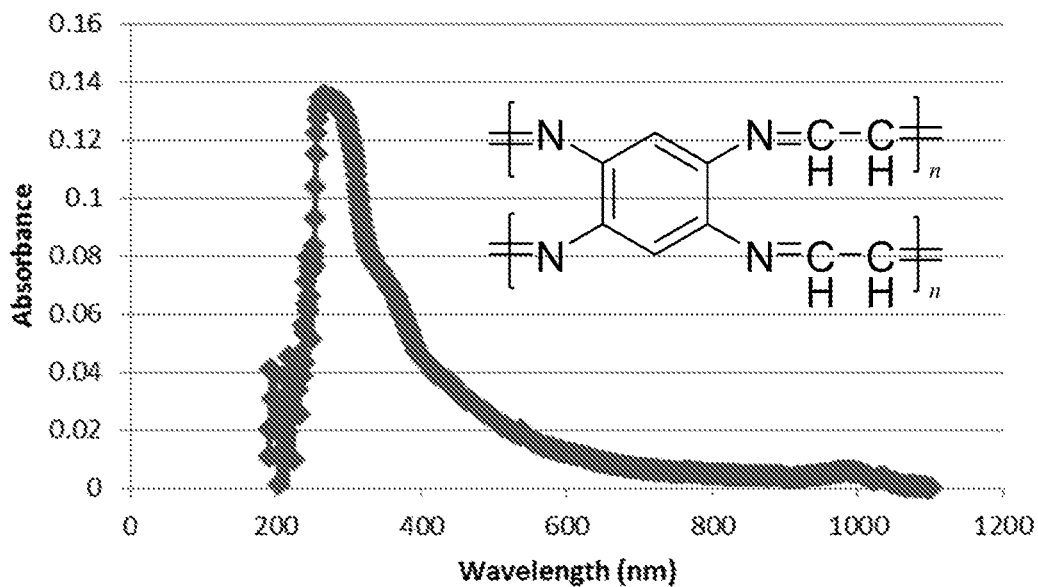
FIGS. 15A-G show absorbance spectra for polymers prepared by reacting 1,2,4,5-benzenetetramine, pH 2-3, with (A) glyoxol, (B) 2,5-furan dicarboxaldehyde, (C) benzene-1,3-dicarboxaldehyde, (D) 4,4-biphenyl dicarboxaldehyde, (E) 2,5-thiophene dicarboxaldehyde, (F) 3,4-dimethyl-2,5-pyrrole dicarboxaldehyde, or (G) benzene-1,3,5-tricarboxaldehyde.
Figure 15B:
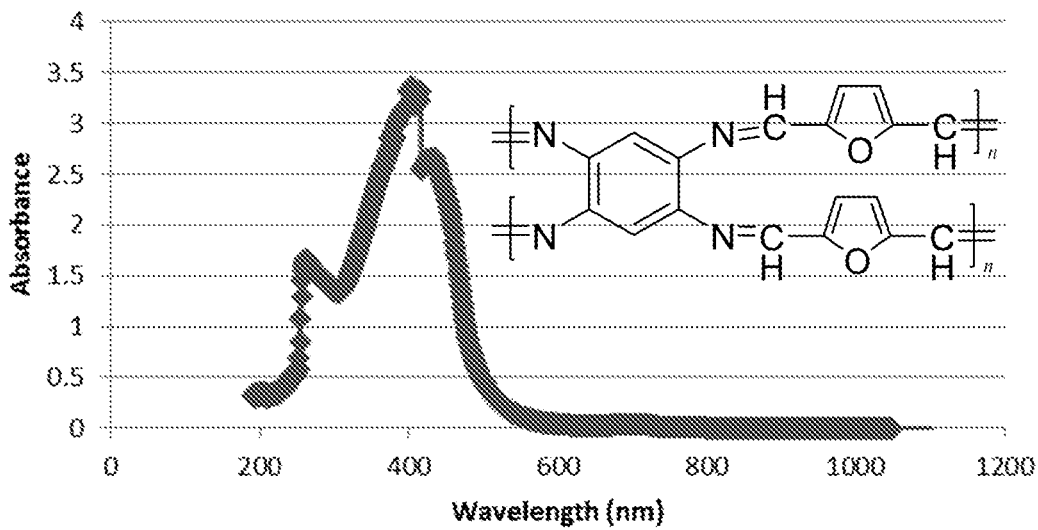
Figure 15C:
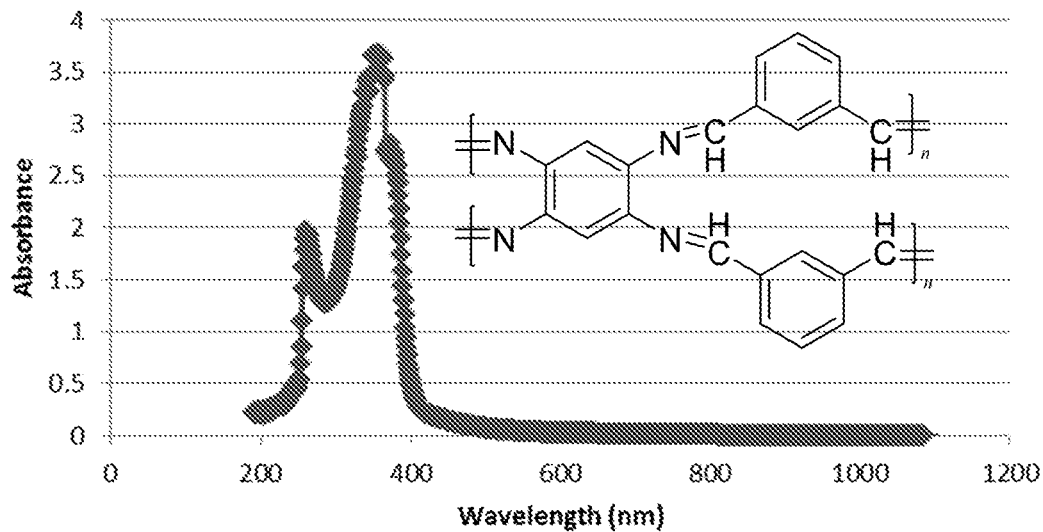
Figure 15D:
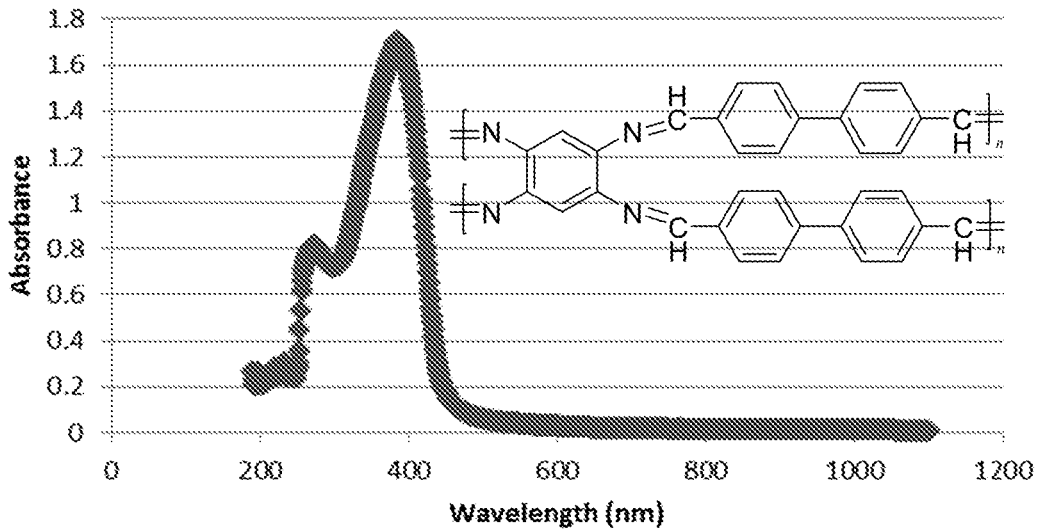
Figure 15E:
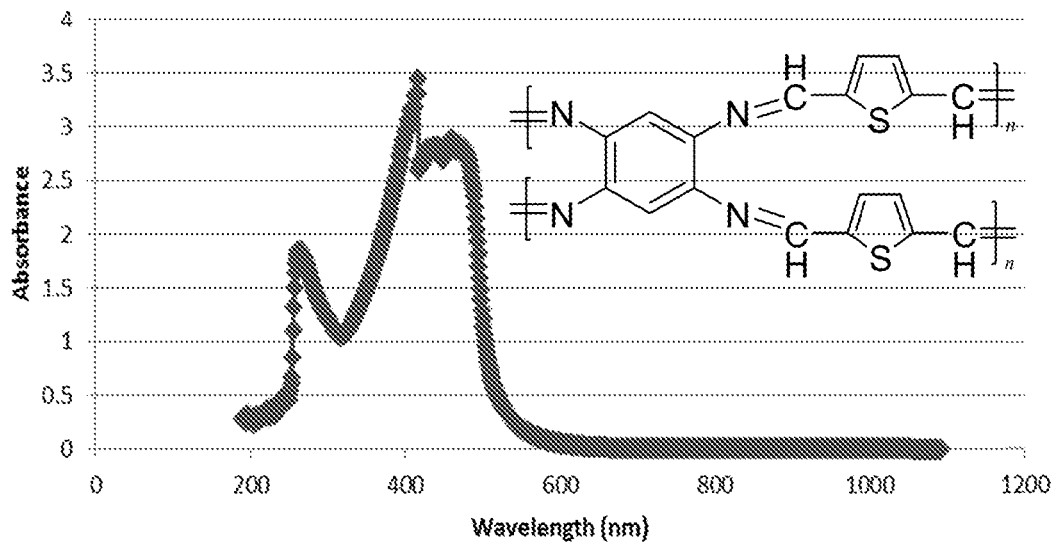
Figure 15F:
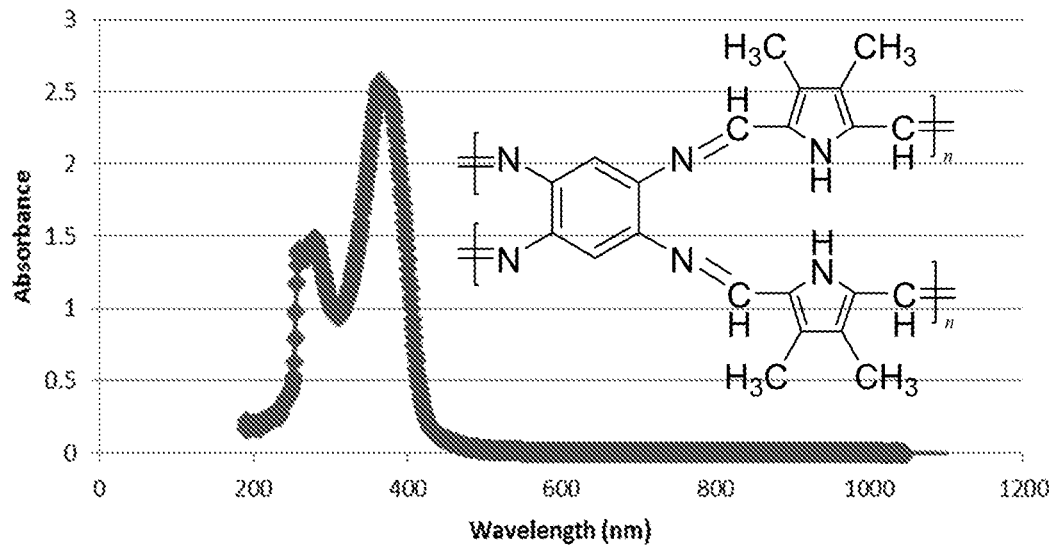
Figure 15G:
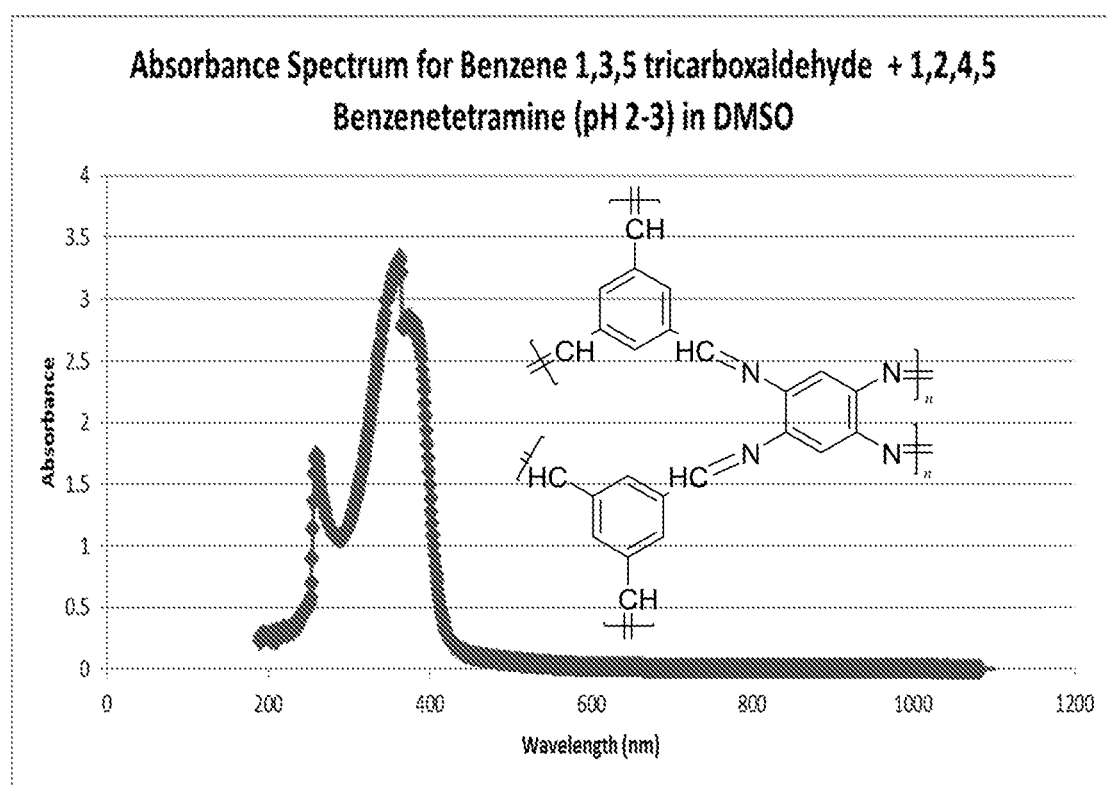

UV-vis absorbance was also measured for some of the polymers and the cutoff wavelength for these polymers is provided in Table 1. The cutoff wavelength was determined as the wavelength where the major downward slope of the absorption spectrum intersects with zero. If the absorption spectrum flattened at the end of the downward slope, then the slope was projected to the y-intercept. Polymers were dissolved in an appropriate solvent(s) including either water ($H_2O$), N,N-dimethyl formamide (DMF), dimethyl sulfoxide (DMSO), cresol, N-methyl-2-pyrrolidone, or acetonitrile. Absorbance was measured with a Shimadzu UV mini 1240 over a range of 200-1100 nm wavelength calibrated with the appropriate solvent for each polymer. Bandgaps for the polymers were determined using the formula: Band Gap Energy (E)=h*C/λ where h is plank's constant, C is the speed of light and lambda is the cutoff wavelength. FIGS. 1-15 show the absorbance spectra for the polymers in Table 1 for which UV-vis absorbance was measured.

TABLE 1

Polyazine polymer products and their reactants.

| Reactant 1 | Reactant 2 | Product | Cut Off λ (nm) | Band gap (eV) |
|---|---|---|---|---|
| glyoxal | 3,4-diaminothiophene | [structure] | 297 | 4.18 |
| Benzene-1,3-dicarboxaldehyde | 3,4-diaminothiophene | [structure] | — | — |
| 4,4-biphenyl dicarboxaldehyde | 3,4-diaminothiophene | [structure] | 410 | 3.02 |

TABLE 1-continued

Polyazine polymer products and their reactants.

| Reactant 1 | Reactant 2 | Product | Cut Off λ (nm) | Band gap (eV) |
|---|---|---|---|---|
| 2,5-thiophene dicarboxaldehyde | 3,4-diaminothiophene | | 615 | 2.02 |
| 3,4-dimethyl-2,5-pyrrole dicarboxaldehyde | 3,4-diaminothiophene | | — | — |
| Benzene-1,3,5-tricarboxaldehyde | 3,4-diaminothiophene | | 492 | 2.52 |
| 1,4-diacetyl benzene | 3,4-diaminothiophene | | — | — |
| 1,3,5-triacetyl benzene | 3,4-diaminothiophene | | — | — |
| glyoxal | 1,3,5-benzene triamine | | 556 | 2.23 |

TABLE 1-continued

Polyazine polymer products and their reactants.

| Reactant 1 | Reactant 2 | Product | Cut Off λ (nm) | Band gap (eV) |
|---|---|---|---|---|
| 2,5-furan dicarboxaldehyde | 1,3,5-benzene triamine | 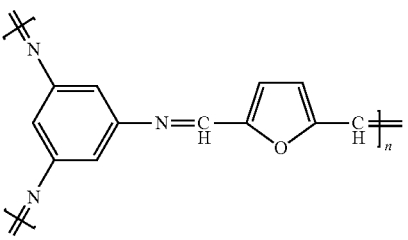 | 542 | 2.29 |
| Benzene-1,3-dicarboxaldehyde | 1,3,5-benzene triamine | 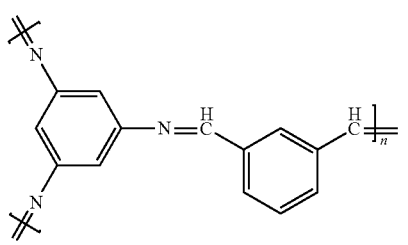 | 420 | 2.95 |
| 4,4-biphenyl dicarboxaldehyde | 1,3,5-benzene triamine | 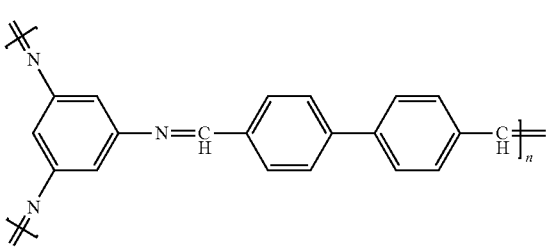 | 410 | 3.02 |
| 2,5-thiophene dicarboxaldehyde | 1,3,5-benzene triamine | 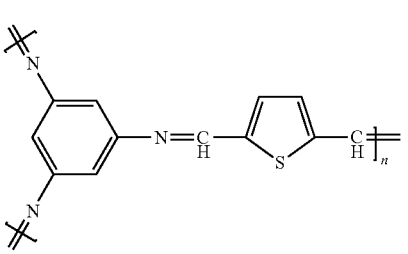 | 470 | 2.64 |
| 3,4-dimethyl-2,5-pyrrole dicarboxaldehyde | 1,3,5-benzene triamine | 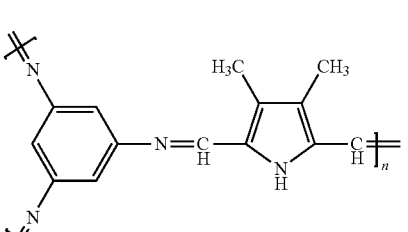 | 473 | 2.62 |
| Benzene-1,3,5-tricarboxaldehyde | 1,3,5-benzene triamine | 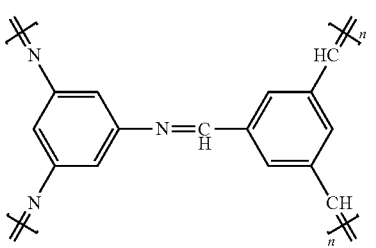 | 423 | 2.93 |

TABLE 1-continued

Polyazine polymer products and their reactants.

| Reactant 1 | Reactant 2 | Product | Cut Off λ (nm) | Band gap (eV) |
|---|---|---|---|---|
| 1,4-diacetyl benzene | 1,3,5-benzene triamine | (structure) | 573 | 2.16 |
| 1,3,5-triacetyl benzene | 1,3,5-benzene triamine | (structure) | — | — |
| glyoxal | 1,4-benzene diamine | (structure) | 608 | 2.04 |
| 2,5-furan dicarboxaldehyde | 1,4-benzene diamine | (structure) | 507 | 2.45 |
| Benzene-1,3-dicarboxaldehyde | 1,4-benzene diamine | (structure) | 426 | 2.91 |
| 4,4-biphenyl dicarboxaldehyde | 1,4-benzene diamine | (structure) | 621 | 2.00 |
| 2,5-thiophene dicarboxaldehyde | 1,4-benzene diamine | (structure) | 541 | 2.29 |
| 3,4-dimethyl-2,5-pyrrole dicarboxaldehyde | 1,4-benzene diamine | (structure) | 600 | 2.07 |
| Benzene-1,3,5-tricarboxaldehyde | 1,4-benzene diamine | (structure) | 697 | 1.78 |

TABLE 1-continued

Polyazine polymer products and their reactants.

| Reactant 1 | Reactant 2 | Product | Cut Off λ (nm) | Band gap (eV) |
|---|---|---|---|---|
| 1,4-diacetyl benzene | 1,4-benzene diamine | 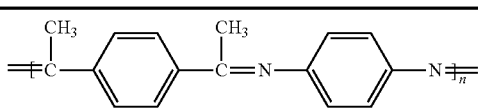 | 780 | 1.59 |
| 1,3,5-triacetyl benzene | 1,4-benzene diamine | 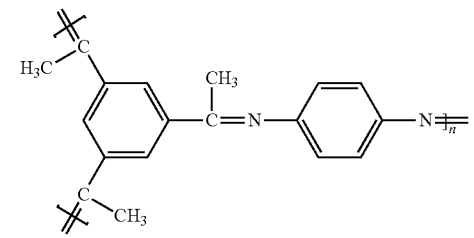 | — | — |
| glyoxal | Safranin O diamine | 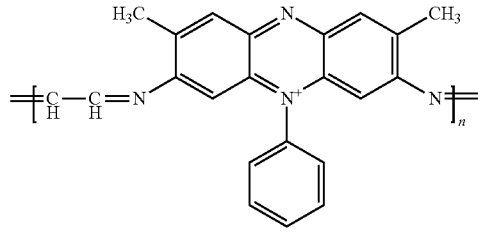 | 585 | 2.12 |
| 2,5-furan dicarboxaldehyde | Safranin O diamine | 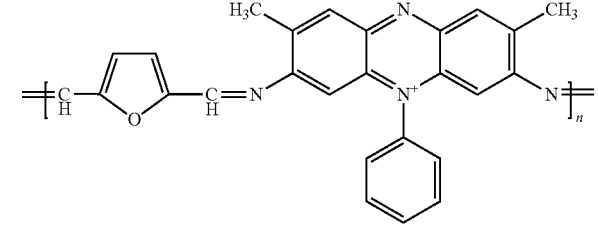 | 593 | 2.09 |
| Benzene-1,3-dicarboxaldehyde | Safranin O diamine | 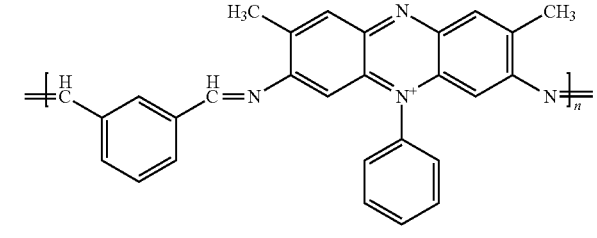 | 575 | 2.16 |
| 4,4-biphenyl dicarboxaldehyde | Safranin O diamine | 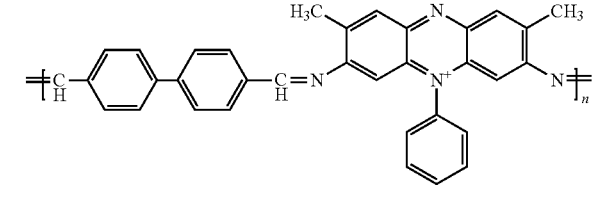 | 566 | 2.19 |
| 2,5-thiophene dicarboxaldehyde | Safranin O diamine | 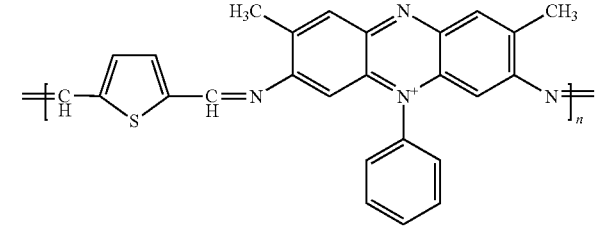 | 575 | 2.16 |

TABLE 1-continued

Polyazine polymer products and their reactants.

| Reactant 1 | Reactant 2 | Product | Cut Off λ (nm) | Band gap (eV) |
|---|---|---|---|---|
| 3,4-dimethyl-2,5-pyrrole dicarboxaldehyde | Safranin O diamine | *[structure]* | 580 | 2.14 |
| Benzene-1,3,5-tricarboxaldehyde | Safranin O diamine | *[structure]* | — | — |
| 1,4-diacetyl benzene | Safranin O diamine | *[structure]* | 590 | 2.10 |
| 1,3,5-triacetyl benzene | Safranin O diamine | *[structure]* | — | — |
| glyoxal | phenosafranin diamine | *[structure]* | 568 | 2.18 |
| 2,5-furan dicarboxaldehyde | phenosafranin diamine | *[structure]* | 570 | 2.18 |

TABLE 1-continued

Polyazine polymer products and their reactants.

| Reactant 1 | Reactant 2 | Product | Cut Off λ (nm) | Band gap (eV) |
|---|---|---|---|---|
| Benzene-1,3-dicarboxaldehyde | phenosafranin diamine | | 569 | 2.18 |
| 4,4-biphenyl dicarboxaldehyde | phenosafranin diamine | | 561 | 2.21 |
| 2,5-thiophene dicarboxaldehyde | phenosafranin diamine | | 570 | 2.18 |
| 3,4-dimethyl-2,5-pyrrole dicarboxaldehyde | phenosafranin diamine | | 571 | 2.17 |
| Benzene-1,3,5-tricarboxaldehyde | phenosafranin diamine | | 563 | 2.20 |
| 1,4-diacetyl benzene | phenosafranin diamine | | 568 | 2.18 |

TABLE 1-continued

Polyazine polymer products and their reactants.

| Reactant 1 | Reactant 2 | Product | Cut Off λ (nm) | Band gap (eV) |
|---|---|---|---|---|
| 1,3,5-triacetyl benzene | phenosafranin diamine | [structure] | — | — |
| glyoxal | 2,4 diamino-6-phenyl-1,3,5-triazine | [structure] | 325 | 3.82 |
| 2,5-furan dicarboxaldehyde | 2,4 diamino-6-phenyl-1,3,5-triazine | [structure] | 342 | 3.63 |
| Benzene-1,3-dicarboxaldehyde | 2,4 diamino-6-phenyl-1,3,5-triazine | [structure] | 326 | 3.80 |
| 4,4-biphenyl dicarboxaldehyde | 2,4 diamino-6-phenyl-1,3,5-triazine | [structure] | 340 | 3.65 |

TABLE 1-continued

Polyazine polymer products and their reactants.

| Reactant 1 | Reactant 2 | Product | Cut Off λ (nm) | Band gap (eV) |
|---|---|---|---|---|
| 2,5-thiophene dicarboxaldehyde | 2,4 diamino-6-phenyl-1,3,5-triazine | *structure* | 355 | 3.49 |
| 3,4-dimethyl-2,5-pyrrole dicarboxaldehyde | 2,4 diamino-6-phenyl-1,3,5-triazine | *structure* | 345 | 3.59 |
| Benzene-1,3,5-tricarboxaldehyde | 2,4 diamino-6-phenyl-1,3,5-triazine | *structure* | 325 | 3.82 |
| 1,4-diacetyl benzene | 2,4 diamino-6-phenyl-1,3,5-triazine | *structure* | — | — |

TABLE 1-continued

Polyazine polymer products and their reactants.

| Reactant 1 | Reactant 2 | Product | Cut Off λ (nm) | Band gap (eV) |
|---|---|---|---|---|
| 1,3,5-triacetyl benzene | 2,4 diamino-6-phenyl-1,3,5-triazine | (structure shown) | — | — |
| glyoxal | 2,4-diamino-6-hydroxy-pyrimidine | (structure shown) | 585 | 2.12 |
| 2,5-furan dicarboxaldehyde | 2,4-diamino-6-hydroxy-pyrimidine | (structure shown) | 325 | 3.82 |
| Benzene-1,3-dicarboxaldehyde | 2,4-diamino-6-hydroxy-pyrimidine | (structure shown) | 324 | 3.83 |
| 4,4-biphenyl dicarboxaldehyde | 2,4-diamino-6-hydroxy-pyrimidine | (structure shown) | — | — |
| 2,5-thiophene dicarboxaldehyde | 2,4-diamino-6-hydroxy-pyrimidine | (structure shown) | 580 | 2.14 |
| 3,4-dimethyl-2,5-pyrrole dicarboxaldehyde | 2,4-diamino-6-hydroxy-pyrimidine | (structure shown) | 493 | 2.52 |

TABLE 1-continued

Polyazine polymer products and their reactants.

| Reactant 1 | Reactant 2 | Product | Cut Off λ (nm) | Band gap (eV) |
|---|---|---|---|---|
| Benzene-1,3,5-tricarboxaldehyde | 2,4-diamino-6-hydroxy-pyrimidine | (structure) | 495 | 2.51 |
| 1,4-diacetyl benzene | 2,4-diamino-6-hydroxy-pyrimidine | (structure) | — | — |
| 1,3,5-triacetyl benzene | 2,4-diamino-6-hydroxy-pyrimidine | (structure) | — | — |
| glyoxal | 2,6-diamino-3,5-difluoropyridine | (structure) | 399 | 3.11 |
| 2,5-furan dicarboxaldehyde | 2,6-diamino-3,5-difluoropyridine | (structure) | 522 | 2.38 |
| Benzene-1,3-dicarboxaldehyde | 2,6-diamino-3,5-difluoropyridine | (structure) | 579 | 2.14 |
| 4,4-biphenyl dicarboxaldehyde | 2,6-diamino-3,5-difluoropyridine | (structure) | 464 | 2.67 |
| 2,5-thiophene dicarboxaldehyde | 2,6-diamino-3,5-difluoropyridine | (structure) | 560 | 2.21 |

TABLE 1-continued

Polyazine polymer products and their reactants.

| Reactant 1 | Reactant 2 | Product | Cut Off λ (nm) | Band gap (eV) |
|---|---|---|---|---|
| 3,4-dimethyl-2,5-pyrrole dicarboxaldehyde | 2,6-diamino-3,5-difluoropyridine | | 484 | 2.56 |
| Benzene-1,3,5-tricarboxaldehyde | 2,6-diamino-3,5-difluoropyridine | | 463 | 2.68 |
| 1,4-diacetyl benzene | 2,6-diamino-3,5-difluoropyridine | | — | — |
| 1,3,5-triacetyl benzene | 2,6-diamino-3,5-difluoropyridine | | — | — |
| glyoxal | acriflavin diamine | | 528 | 2.35 |
| 2,5-furan dicarboxaldehyde | acriflavin diamine | | 565 | 2.19 |
| Benzene-1,3-dicarboxaldehyde | acriflavin diamine | | 488 | 2.54 |
| 4,4-biphenyl dicarboxaldehyde | acriflavin diamine | | 338 | 3.67 |

TABLE 1-continued

Polyazine polymer products and their reactants.

| Reactant 1 | Reactant 2 | Product | Cut Off λ (nm) | Band gap (eV) |
|---|---|---|---|---|
| 2,5-thiophene dicarboxaldehyde | acriflavin diamine | | 531 | 2.34 |
| 3,4-dimethyl-2,5-pyrrole dicarboxaldehyde | acriflavin diamine | | 487 | 2.55 |
| Benzene-1,3,5-tricarboxaldehyde | acriflavin diamine | | — | — |
| 1,4-diacetyl benzene | acriflavin diamine | | 487 | 2.55 |
| 1,3,5-triacetyl benzene | acriflavin diamine | | — | — |
| glyoxal | 3,6 diamino acridine polymerized in EtOH | | 565 | 2.19 |
| 2,5-furan dicarboxaldehyde | 3,6 diamino acridine polymerized in EtOH | | 546 | 2.27 |
| Benzene-1,3- | 3,6 diamino acridine | | 526 | 2.36 |

TABLE 1-continued

Polyazine polymer products and their reactants.

| Reactant 1 | Reactant 2 | Product | Cut Off λ (nm) | Band gap (eV) |
|---|---|---|---|---|
| 4,4-biphenyl dicarboxaldehyde | 3,6 diamino acridine polymerized in EtOH | | 346 | 3.58 |
| 2,5-thiophene dicarboxaldehyde | 3,6 diamino acridine polymerized in EtOH | | 345 | 3.59 |
| 3,4-dimethyl-2,5-pyrrole dicarboxaldehyde | 3,6 diamino acridine polymerized in EtOH | | 495 | 2.51 |
| Benzene-1,3,5-tricarboxaldehyde | 3,6 diamino acridine polymerized in EtOH | | 501 | 2.48 |
| 1,4-diacetyl benzene | 3,6 diamino acridine polymerized in EtOH | | 503 | 2.47 |
| 1,3,5-triacetyl benzene | 3,6 diamino acridine polymerized in EtOH | | — | — |
| glyoxal | 3,6 diamino acridine polymerized in H2O | | 495 | 2.51 |
| 2,5-furan dicarboxaldehyde | 3,6 diamino acridine polymerized in H2O | | 531 | 2.34 |
| Benzene-1,3-dicarboxaldehyde | 3,6 diamino acridine polymerized in H2O | | 497 | 2.49 |

TABLE 1-continued

Polyazine polymer products and their reactants.

| Reactant 1 | Reactant 2 | Product | Cut Off λ (nm) | Band gap (eV) |
|---|---|---|---|---|
| 4,4-biphenyl dicarboxaldehyde | 3,6 diamino acridine polymerized in H2O | [structure] | 509 | 2.44 |
| 2,5-thiophene dicarboxaldehyde | 3,6 diamino acridine polymerized in H2O | [structure] | 512 | 2.42 |
| 3,4-dimethyl-2,5-pyrrole dicarboxaldehyde | 3,6 diamino acridine polymerized in H2O | [structure] | 499 | 2.48 |
| Benzene-1,3,5-tricarboxaldehyde | 3,6 diamino acridine polymerized in H2O | [structure] | 508 | 2.44 |
| 1,4-diacetyl benzene | 3,6 diamino acridine polymerized in H2O | [structure] | 503 | 2.47 |
| 1,3,5-triacetyl benzene | 3,6 diamino acridine polymerized in H2O | [structure] | — | — |
| glyoxal | 4,4'-diamino-2,2'-stilbenedisulfonic acid | [structure] | 388 | 3.20 |
| 2,5-furan dicarboxaldehyde | 4,4'-diamino-2,2'-stilbenedisulfonic acid | [structure] | 416 | 2.98 |

TABLE 1-continued

Polyazine polymer products and their reactants.

| Reactant 1 | Reactant 2 | Product | Cut Off λ (nm) | Band gap (eV) |
|---|---|---|---|---|
| Benzene-1,3-dicarboxaldehyde | 4,4'-diamino-2,2'-stilbenedisulfonic acid | | 382 | 3.25 |
| 4,4-biphenyl dicarboxaldehyde | 4,4'-diamino-2,2'-stilbenedisulfonic acid | | 348 | 3.56 |
| 2,5-thiophene dicarboxaldehyde | 4,4'-diamino-2,2'-stilbenedisulfonic acid | | 373 | 3.32 |
| 3,4-dimethyl-2,5-pyrrole dicarboxaldehyde | 4,4'-diamino-2,2'-stilbenedisulfonic acid | | 548 | 2.26 |
| Benzene-1,3,5-tricarboxaldehyde | 4,4'-diamino-2,2'-stilbenedisulfonic acid | | 379 | 3.27 |
| 1,4-diacetyl benzene | 4,4-diamino-2,2'-stilbenedisulfonic acid | | — | — |

TABLE 1-continued

Polyazine polymer products and their reactants.

| Reactant 1 | Reactant 2 | Product | Cut Off λ (nm) | Band gap (eV) |
| --- | --- | --- | --- | --- |
| 1,3,5-triacetyl benzene | 4,4'-diamino-2,2'-stilbenedisulfonic acid | (structure) | — | — |
| glyoxal | 2,5-diaminobenzenesulfonic acid | (structure) | 341 | 3.64 |
| 2,5-furan dicarboxaldehyde | 2,5-diaminobenzenesulfonic acid | (structure) | 515 | 2.41 |
| Benzene-1,3-dicarboxaldehyde | 2,5-diaminobenzenesulfonic acid | (structure) | 385 | 3.22 |
| 4,4-biphenyl dicarboxaldehyde | 2,5-diaminobenzenesulfonic acid | (structure) | 477 | 2.60 |
| 2,5-thiophene dicarboxaldehyde | 2,5-diaminobenzenesulfonic acid | (structure) | 497 | 2.49 |
| 3,4-dimethyl-2,5-pyrrole dicarboxaldehyde | 2,5-diaminobenzenesulfonic acid | (structure) | 514 | 2.41 |

TABLE 1-continued

Polyazine polymer products and their reactants.

| Reactant 1 | Reactant 2 | Product | Cut Off λ (nm) | Band gap (eV) |
|---|---|---|---|---|
| Benzene-1,3,5-tricarboxaldehyde | 2,5-diaminobenzenesulfonic acid | [structure] | 376 | 3.30 |
| 1,4-diacetyl benzene | 2,5-diaminobenzenesulfonic acid | [structure] | 370 | 3.35 |
| 1,3,5-triacetyl benzene | 2,5-diaminobenzenesulfonic acid | [structure] | — | — |
| glyoxal | 1,2,4,5-benzenetetramine | [structure] | 528 | 2.35 |
| 2,5-furan dicarboxaldehyde | 1,2,4,5-benzenetetramine pH 5 | [structure] | 590 | 2.10 |
| Benzene-1,3-dicarboxaldehyde | 1,2,4,5-benzenetetramine pH 5 | [structure] | 456 | 2.72 |

TABLE 1-continued

Polyazine polymer products and their reactants.

| Reactant 1 | Reactant 2 | Product | Cut Off λ (nm) | Band gap (eV) |
|---|---|---|---|---|
| 4,4-biphenyl dicarboxaldehyde | 1,2,4,5-benzenetetramine pH 5 | | 470 | 2.64 |
| 2,5-thiophene dicarboxaldehyde | 1,2,4,5-benzenetetramine pH 5 | | 522 | 2.38 |
| 3,4-dimethyl-2,5-pyrrole dicarboxaldehyde | 1,2,4,5-benzenetetramine pH 5 | | 528 | 2.35 |
| Benzene-1,3,5-tricarboxaldehyde | 1,2,4,5-benzenetetramine pH 5 | | 480 | 2.58 |
| 1,4-diacetyl benzene | 1,2,4,5-benzenetetramine pH 5 | | 640 | 1.94 |

TABLE 1-continued

Polyazine polymer products and their reactants.

| Reactant 1 | Reactant 2 | Product | Cut Off λ (nm) | Band gap (eV) |
|---|---|---|---|---|
| 1,3,5-triacetyl benzene | 1,2,4,5-benzenetetramine pH 5 | (structure) | — | — |
| glyoxal | 1,2,4,5-benzenetetramine acidic conditions, pH 2-3 | (structure) | 460 | 2.70 |
| 2,5-furan dicarboxaldehyde | 1,2,4,5-benzenetetramine acidic conditions, pH 2-3 | (structure) | 494 | 2.51 |
| Benzene-1,3-dicarboxaldehyde | 1,2,4,5-benzenetetramine acidic conditions, pH 2-3 | (structure) | 404 | 3.07 |
| 4,4-biphenyl dicarboxaldehyde | 1,2,4,5-benzenetetramine acidic conditions, pH 2-3 | (structure) | 445 | 2.79 |

TABLE 1-continued

Polyazine polymer products and their reactants.

| Reactant 1 | Reactant 2 | Product | Cut Off λ (nm) | Band gap (eV) |
|---|---|---|---|---|
| 2,5-thiophene dicarboxaldehyde | 1,2,4,5-benzenetetramine acidic conditions, pH 2-3 | 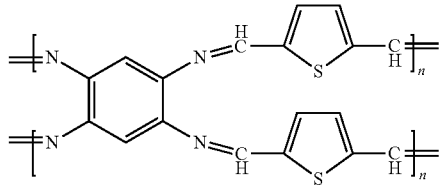 | 515 | 2.41 |
| 3,4-dimethyl-2,5-pyrrole dicarboxaldehyde | 1,2,4,5-benzenetetramine acidic conditions, pH 2-3 | 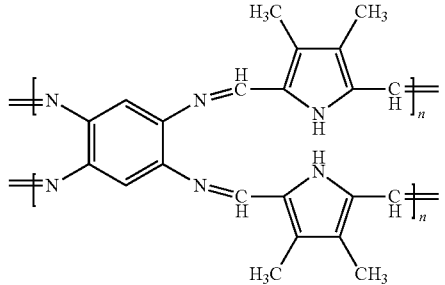 | 429 | 2.89 |
| Benzene-1,3,5-tricarboxaldehyde | 1,2,4,5-benzenetetramine acidic conditions, pH 2-3 | 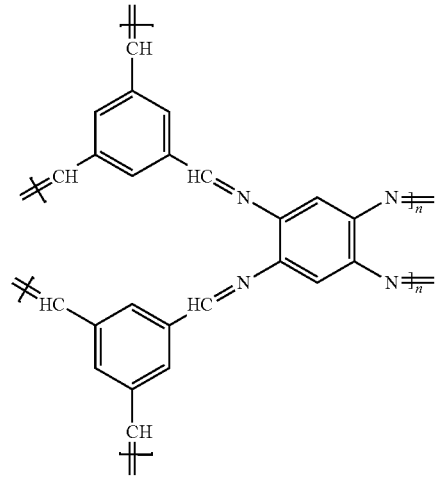 | 418 | 2.97 |
| 1,4-diacetyl benzene | 1,2,4,5-benzenetetramine acidic conditions, pH 2-3 | 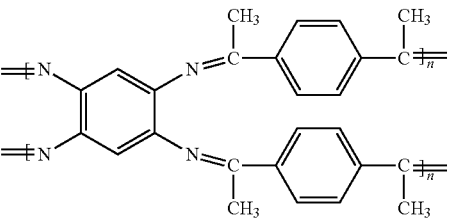 | — | — |

TABLE 1-continued

Polyazine polymer products and their reactants.

| Reactant 1 | Reactant 2 | Product | Cut Off λ (nm) | Band gap (eV) |
|---|---|---|---|---|
| 1,3,5-triacetyl benzene | 1,2,4,5-benzenetetramine acidic conditions, pH 2-3 | (structure shown) | — | — |

TABLE 2

Solvents for aldehyde and acetyl compounds.

| | |
|---|---|
| glyoxal | water |
| 2,5-furan dicarboxaldehyde | ethanol |
| benzene-1,3-dicarboxyaldehyde | ethanol |
| 4,4-biphenyl dicarboxaldehyde | ethanol |
| 2,5-thiophene dicarboxaldehyde | ethanol |
| 3,4-dimethyl-2,5-pyrrole dicarboxaldehyde | ethanol |
| benzene-1,3,5-tricarboxaldehyde | acetonitrile |
| 1,4-diacetyl benzene | ethanol |
| 1,3,5-triacetyl benzene | acetonitrile |

TABLE 3

Solvents for multiamine compounds.

| | |
|---|---|
| Hydrazine | water |
| 3,4-diaminothiophene | ethanol |
| 1,3,5-benzene triamine | water |
| 1,4-benzene diamine | water |
| Safranin O diamine | water |
| phenosafranin diamine | water |
| 2,4 diamino-6-phenyl-1,3,5-triazine | ethanol |
| 2,4-diamino-6-hydroxy-pyrimidine | water |
| 2,6-diamino-3,5-difluoropyridine | ethanol |
| acriflavin diamine | ethanol |
| 3,6 diamino acridine | ethanol |
| 4,4'-diamino-2,2'-stilbenedisulfonic acid | water, ethanol |
| 2,5-diaminobenzenesulfonic acid | water |
| (S,S)-1,2-Bis(4-hydroxyphenyl)-1,2-ethanediamine | water |
| 1,2,4,5-benzenetetramine | water |

Example 2

Heteropolymers with tunable bandgaps and imparting thermoplasticity were created. 0.2 grams of 1,4 diacetyl benzene was combined with 0.03 g of hydrazine monohydrate (65%) to create the benzene-1,4-methyl azadiene polymer which produced a yellow polymer that had a melting point at 275° C. and a bandgap of 3.38 eV. 0.2 grams of 2,5 thiophene dicarboxaldehyde was combined with 0.03 g of hydrazine monohydrate (65%) to create the 2,5 thiophene azadiene polymer, which is red, not thermoplastic, and has a band gap of about 2.0 eV. Heteropolymers were created by combining 0.2 grams of 1,4 diacetyl benzene with either 0.02 grams of 2,5 thiophene dicarboxaldehyde (10% w/w heteropolymer) or 0.01 grams of 2,5 thiophene dicarboxaldehyde (5% w/w heteropolymer) then adding 0.03 g of hydrazine monohydrate (65%). The reaction of the reactants was carried out in 15 mL of ethanol, adjusted to pH 5 by the addition of 0.2 M HCl to create azadiene heteropolymers with benzene-1,4,methyl azadiene monomer subunits and the 2,5 thiophene azadiene subunits. The heteropolymers were collected by filtration. Both heteropolymers were thermoplastic and had bandgaps of 3.2 eV and 3.0 eV, respectively. Thus, the thermoplastic properties of the benzene-1,4,methyl azadiene polymer were imparted to the heteropolymers and the bandgaps were tunable based on the ratios of the different monomers incorporated into the polymers.

The foregoing is illustrative of the present invention, and is not to be construed as limiting thereof. The invention is defined by the following claims, with equivalents of the claims to be included therein. All publications, patent applications, patents, patent publications, and other references cited herein are incorporated by reference in their entireties for the teachings relevant to the sentence and/or paragraph in which the reference is presented.

That which is claimed is:

1. A method of preparing a conjugated polyazine heteropolymer, comprising:
reacting (a) a first organic compound comprising at least two aldehyde and/or ketone groups, (b) a second organic compound comprising at least two aldehyde and/or ketone groups, and (c) a multiamine comprising at least three amines to form said conjugated polyazine heteropolymer.

2. The method of claim 1, further comprising, prior to said reacting step, combining the first organic compound comprising at least two aldehyde and/or ketone groups and the second organic compound comprising at least two aldehyde and/or ketone groups.

3. The method of claim 1, wherein said first organic compound and/or second organic compound comprises a conjugated moiety.

4. The method of claim 1, wherein said first organic compound and/or second organic compound comprises an indole, a pyrrole, a phenol, a thiophene, a furan, a thianaphthene, an acetylene, a catechol, a tyrosyl, a phenyl, a benzene, a naphthalene, a biphenyl, a catecholamine, derivatives thereof, and any combination thereof.

5. The method of claim 1, wherein said first organic compound and/or second organic compound has the structure

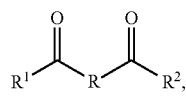

wherein

R is a conjugated moiety; and $R^1$ and $R^2$ each independently selected from the group consisting of hydrogen, alkyl, and alkenyl.

6. The method of claim 1, wherein said first organic compound and/or second organic compound has the structure

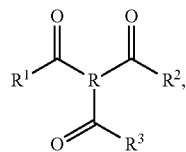

wherein

R is a conjugated moiety; and $R^1$, $R^2$, and $R^3$ are each independently selected from the group consisting of hydrogen, alkyl, and alkenyl.

7. The method of claim 1, wherein said first organic compound and/or second organic compound comprises a metal.

8. The method of claim 1, wherein said conjugated polyazine heteropolymer is thermoplastic.

9. The method of claim 1, further comprising modulating the conjugated polyazine heteropolymer bandgap.

10. The method of claim 1, further comprising oxidizing the conjugated polyazine heteropolymer to form a cross-linked polyazine heteropolymer.

11. The method of claim 10, wherein said, oxidizing step is carried out by enzymatic oxidative polymerization or by chemical oxidative polymerization with an oxidizing agent.

12. An electrochemical device comprising: working electrode; a counter electrode; and said conjugated polyazine heteropolymer of claim 1, wherein said working electrode is in operative communication with said counter electrode, and said conjugated polyazine polymer is in operative communication with said working electrode or said counter electrode.

13. The electrochemical device of claim 12, wherein said conjugated polyazine heteropolymer is disposed on a least a portion of the working electrode.

14. The electrochemical device of claim 12, wherein the electrochemical device is a battery, a fuel cell, a capacitor or a device formed of a combination thereof, a supercapacitor, an ultracapacitor, or an electric double-layer capacitor.

15. The method of claim 1, wherein at least one repeating unit of the conjugated polyazine heteropolymer is selected from the group consisting of:

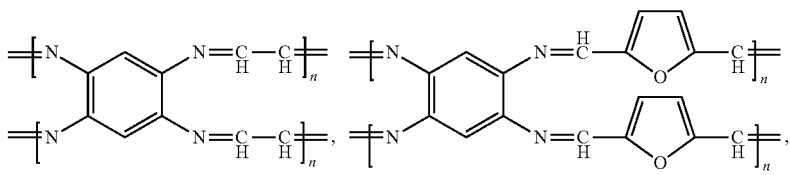

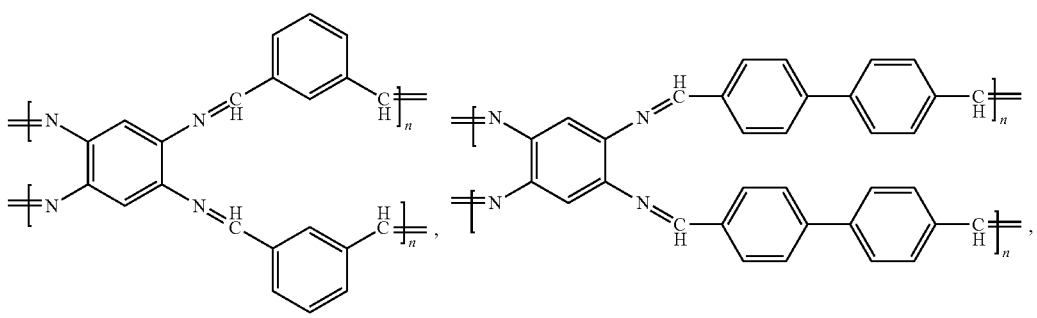

-continued
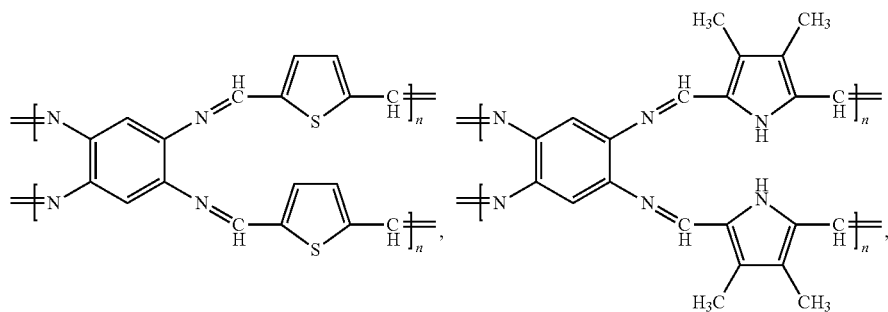
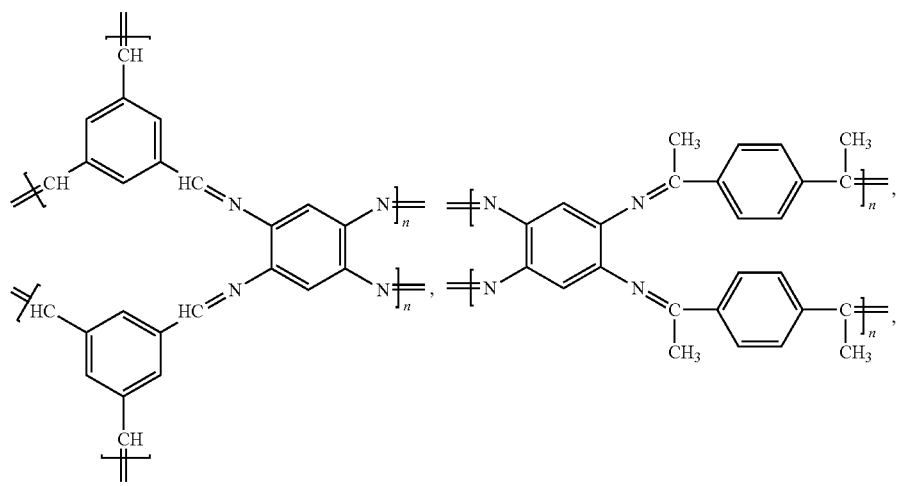
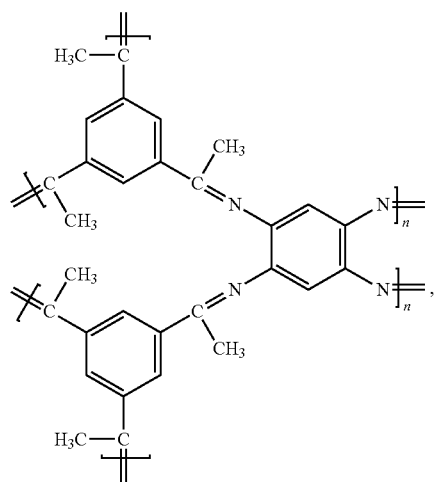
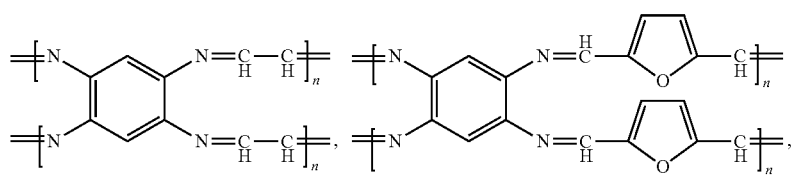

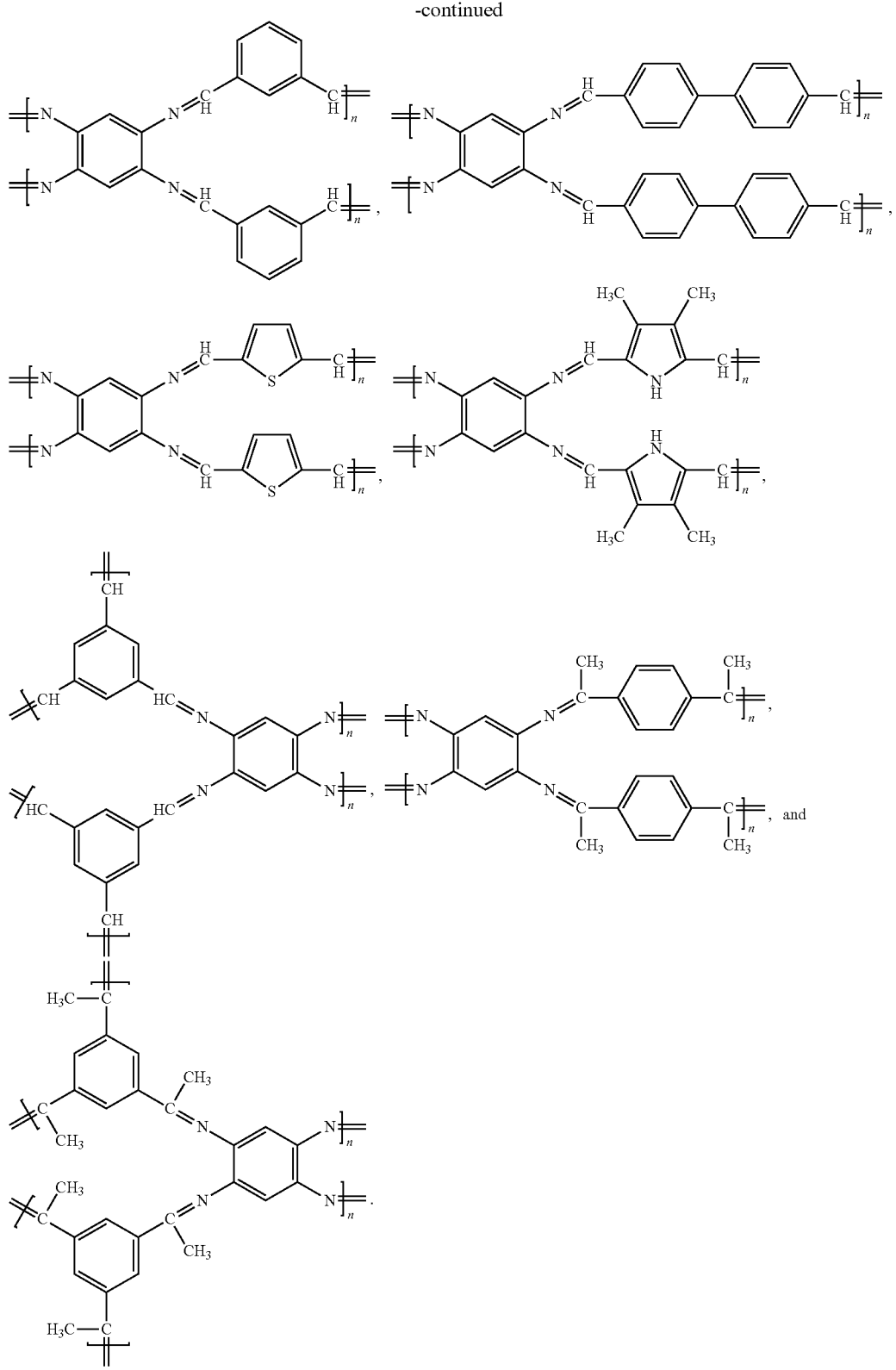
16. The method of claim 1, wherein the first organic compound or second organic compound is selected from the group consisting of glyoxal, benzene-1,3-dicarboxaldehyde, 2,5-furan dicarboxaldehyde, 4,4-biphenyl dicarboxaldehyde, 2,5-thiophene dicarboxaldehyde, 3,4-dimethyl-2,5-pyrrole dicarboxaldehyde, benzene-1,3,5-tricarboxaldehyde, 1,4-diacetyl benzene, and 1,3,5-triacetyl benzene.

17. The method of claim 1, wherein said multiamine is selected from the group consisting of 1,3,5-benzene triamine, 1,2,4,5-benzenetetramine, and 1,2,3,4-benzenetetramine.

18. The method of claim 1, wherein the first organic compound or second organic substrate comprise a substituted moiety selected from the group consisting of a phenyl, biphenyl, thiophene, furan, naphthalene, thianaphthene, acetylene, catechol, tyrosyl and catecholamine.

* * * * *

UNITED STATES PATENT AND TRADEMARK OFFICE
CERTIFICATE OF CORRECTION

PATENT NO. : 10,570,241 B2
APPLICATION NO. : 15/329882
DATED : February 25, 2020
INVENTOR(S) : Nicholas Brendan Duck It is certified that error appears in the above-identified patent and that said Letters Patent is hereby corrected as shown below:

In the Specification

Column 9, Scheme 1, Line 20:
Please correct "NH." to read -- NH --

Column 13, Scheme 4, Lines 6-19:
Please delete the following formula:

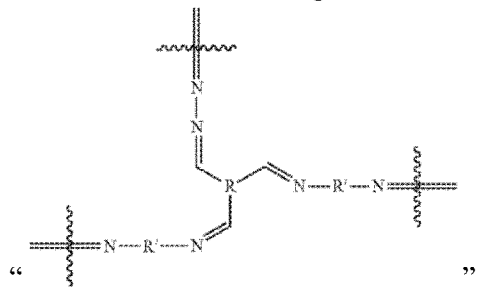

And replace it with the corrected formula:

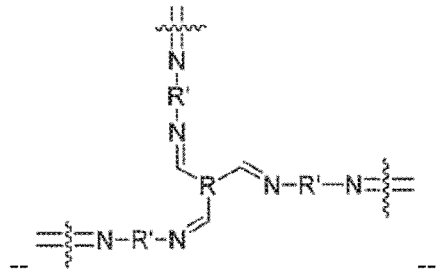

Column 43, final formula, Reactant 1:
Please correct "Benzene-1,3-" to read -- Benzene-1,3-dicarboxaldehyde --

Column 43, final formula, Reactant 2:
Please correct "3,6 diamino acridine" to read -- 3,6 diamino acridine polymerized in EtOH --

Signed and Sealed this
Eighth Day of September, 2020

Andrei Iancu
*Director of the United States Patent and Trademark Office*

Column 53, 4th formula, Reactant 2:
Please correct "1,2,4,5-benzenetetramine" to read -- 1,2,4,5-benzenetetramine pH 5 --

In the Claims

Column 64, Line 17, Claim 11:
Please correct "said, oxidizing" to read -- said oxidizing --

Column 64, Line 21, Claim 12:
Please correct "comprising: working" to read -- comprising: a working --